(12) United States Patent
Higashino

(10) Patent No.: US 11,749,307 B2
(45) Date of Patent: Sep. 5, 2023

(54) SIGNAL PROCESSING DEVICE, SIGNAL PROCESSING METHOD, AND PROGRAM

(71) Applicant: SONY GROUP CORPORATION, Tokyo (JP)

(72) Inventor: Satoru Higashino, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/783,139

(22) PCT Filed: Jan. 15, 2021

(86) PCT No.: PCT/JP2021/001158
§ 371 (c)(1),
(2) Date: Jun. 7, 2022

(87) PCT Pub. No.: WO2021/153260
PCT Pub. Date: Aug. 5, 2021

(65) Prior Publication Data
US 2023/0043380 A1    Feb. 9, 2023

(30) Foreign Application Priority Data

Jan. 30, 2020   (JP) ................................ 2020-013882

(51) Int. Cl.
G11B 20/10    (2006.01)
G11B 7/005    (2006.01)
G11B 20/18    (2006.01)

(52) U.S. Cl.
CPC ........ *G11B 20/10212* (2013.01); *G11B 7/005* (2013.01); *G11B 20/1833* (2013.01)

(58) Field of Classification Search
None
See application file for complete search history.

(56) References Cited

U.S. PATENT DOCUMENTS

| | | | | |
|---|---|---|---|---|
| 4,015,238 A | * | 3/1977 | Davis .................... | H04L 1/0054 714/792 |
| 5,537,382 A | * | 7/1996 | McLaughlin ....... | H04L 25/4975 714/778 |
| 5,719,843 A | * | 2/1998 | Nakajima ......... | H03M 13/6331 369/124.05 |
| 5,805,637 A | * | 9/1998 | Hirosaka .......... | G11B 20/10009 375/230 |
| 5,822,143 A | * | 10/1998 | Cloke ..................... | G11B 5/09 |

(Continued)

FOREIGN PATENT DOCUMENTS

| | | |
|---|---|---|
| JP | H10-233702 A | 9/1998 |
| JP | 2014-175024 A | 9/2014 |

(Continued)

*Primary Examiner* — Peter Vincent Agustin
(74) *Attorney, Agent, or Firm* — Paratus Law Group, PLLC

(57) ABSTRACT

There is provided a signal processing device, a signal processing method, and a program capable of improving noise resistance in high linear density recording. Partial response (PR) equalization of a reproduced signal of multilevel codes of 3<=ML is performed and maximum likelihood decoding of an equalized signal obtained through the PR equalization is performed. The present technology can be applied to, for example, a recording/reproducing device or the like such as an optical disc.

12 Claims, 43 Drawing Sheets

(56) References Cited

U.S. PATENT DOCUMENTS

| | | | | |
|---|---|---|---|---|
| 6,385,255 B1* | 5/2002 | McLaughlin | ...... | G11B 20/1496 |
| | | | | 375/263 |
| 2004/0257955 A1* | 12/2004 | Yamanaka | ......... | G11B 7/24085 |
| 2007/0096950 A1* | 5/2007 | Yang | ................ | G11B 20/10009 |
| | | | | 341/50 |
| 2008/0198720 A1* | 8/2008 | Nakamura | ............. | G11B 7/005 |
| | | | | 369/59.22 |

FOREIGN PATENT DOCUMENTS

| | | | |
|---|---|---|---|
| JP | | 6504245 B2 | 4/2019 |
| WO | WO 2017/135000 A1 | | 8/2017 |
| WO | WO 2019/244550 A1 | | 12/2019 |

* cited by examiner

Fig. 11

| ENCODING LENGTH n (CELL) | NUMBER OF SYMBOLS Ns | $\log_2(N_s)$ | NUMBER OF BINARY DATA BITS B | ENCODING RATIO R (=B/n) | ENCODING EFFICIENCY Ef |
|---|---|---|---|---|---|
| 2 | 24 | 4.584963 | 4 | 2 | 86% |
| 3 | 120 | 6.906891 | 6 | 2 | 86% |
| 4 | 600 | 9.228819 | 9 | 2.25 | 97% |
| 5 | 2996 | 11.54882 | 11 | 2.2 | 95% |
| 6 | 14976 | 13.87036 | 13 | 2.166667 | 93% |
| 7 | 74864 | 16.19198 | 16 | 2.285714 | 98% |
| 8 | 374224 | 18.51354 | 18 | 2.25 | 97% |
| 9 | 1870640 | 20.8351 | 20 | 2.222222 | 96% |
| 10 | 9350800 | 23.15666 | 23 | 2.3 | 99% |
| 11 | 46742016 | 25.47822 | 25 | 2.272727 | 98% |
| 12 | 233650176 | 27.79977 | 27 | 2.25 | 97% |
| 13 | 1167951424 | 30.12133 | 30 | 2.307692 | 99% |

| MULTILEVEL EDGE CODES | INITIAL STATE | | | | FINAL STATE |
|---|---|---|---|---|---|
| 1111 | s0 | s0 | s0 | s0 | s0 |
| 2111 | s0 | s0 | s0 | s0 | s0 |
| 3111 | s0 | s0 | s0 | s0 | s0 |
| 1211 | s0 | s0 | s0 | s0 | |
| ... | ... | | | | |
| 0002 | s0 | s1 | s2 | s3 | s0 |
| 0003 | s0 | s1 | s2 | s3 | s0 |
| 0004 | s0 | s1 | s2 | s3 | s0 |

B

| MULTILEVEL EDGE CODES | INITIAL STATE | | | | FINAL STATE |
|---|---|---|---|---|---|
| 1111 | s1 | s0 | s0 | s0 | s0 |
| 2111 | s1 | s0 | s0 | s0 | s0 |
| 3111 | s1 | s0 | s0 | s0 | s0 |
| 1211 | s1 | s0 | s0 | s0 | |
| ... | ... | | | | |
| 0002 | s1 | s2 | s3 | s4 | s0 |
| 0003 | s1 | s2 | s3 | s4 | s0 |
| 0004 | s1 | s2 | s3 | s4 | s0 |

| MULTILEVEL EDGE CODES | INITIAL STATE | | | | FINAL STATE |
|---|---|---|---|---|---|
| 1110 | s0 | s0 | s0 | s0 | s1 |
| 2110 | s0 | s0 | s0 | s0 | s1 |
| 3110 | s0 | s0 | s0 | s0 | s1 |
| 1210 | s0 | s0 | s0 | s0 | s1 |
| ... | | | | | |
| 0020 | s0 | s1 | s2 | s0 | s1 |
| 0030 | s0 | s1 | s2 | s0 | s1 |
| 0040 | s0 | s1 | s2 | s0 | s1 |

B

| MULTILEVEL EDGE CODES | INITIAL STATE | | | | FINAL STATE |
|---|---|---|---|---|---|
| 1110 | s1 | s0 | s0 | s0 | s1 |
| 2110 | s1 | s0 | s0 | s0 | s1 |
| 3110 | s1 | s0 | s0 | s0 | s1 |
| 1210 | s1 | s0 | s0 | s0 | s1 |
| ... | | | | | |
| 0020 | s1 | s2 | s3 | s0 | s1 |
| 0030 | s1 | s2 | s3 | s0 | s1 |
| 0040 | s1 | s2 | s3 | s0 | s1 |

Fig. 18

| BINARY DATA (DECIMAL) | MULTILEVEL EDGE CODES (4CELL) |
|---|---|
| 0 | 1111 |
| 1 | 2111 |
| 2 | 3111 |
| 3 | 1211 |
| 4 | 2211 |
| 5 | 4211 |
| 6 | 1311 |
| 7 | 3311 |
| 8 | 4311 |
| 9 | 2411 |
| 10 | 3411 |
| 11 | 4411 |
| 12 | 1121 |
| 13 | 2121 |
| 14 | 3121 |
| 15 | 1221 |
| 16 | 2221 |
| 17 | 4221 |
| 18 | 1321 |
| 19 | 3321 |
| 20 | 4321 |
| 21 | 2421 |
| 22 | 3421 |
| 23 | 4421 |
| 24 | 1131 |
| 25 | 2131 |
| 26 | 3131 |
| 27 | 1231 |
| 28 | 2231 |
| 29 | 4231 |
| 30 | 1331 |
| 31 | 3331 |
| 32 | 4331 |
| 33 | 2431 |
| 34 | 3431 |
| 35 | 4431 |
| 36 | 1112 |
| 37 | 2112 |
| 38 | 3112 |
| 39 | 1212 |
| 40 | 2212 |
| 41 | 4212 |
| 42 | 1312 |
| 43 | 3312 |
| 44 | 4312 |
| 45 | 2412 |
| 46 | 3412 |
| 47 | 4412 |
| 48 | 1122 |
| 49 | 2122 |
| 50 | 3122 |
| 51 | 1222 |
| 52 | 2222 |
| 53 | 4222 |
| 54 | 1322 |
| 55 | 3322 |
| 56 | 4322 |
| 57 | 2422 |
| 58 | 3422 |
| 59 | 4422 |
| 60 | 1142 |
| 61 | 2142 |
| 62 | 3142 |
| 63 | 1242 |
| 64 | 2242 |
| 65 | 4242 |
| 66 | 1342 |
| 67 | 3342 |
| 68 | 4342 |
| 69 | 2442 |
| 70 | 3442 |
| 71 | 4442 |
| 72 | 1113 |
| 73 | 2113 |
| 74 | 3113 |
| 75 | 1213 |
| 76 | 2213 |
| 77 | 4213 |
| 78 | 1313 |
| 79 | 3313 |
| 80 | 4313 |
| 81 | 2413 |
| 82 | 3413 |
| 83 | 4413 |
| 84 | 1133 |
| 85 | 2133 |
| 86 | 3133 |
| 87 | 1233 |
| 88 | 2233 |
| 89 | 4233 |
| 90 | 1333 |

Fig. 19

| | |
|---|---|
| 151 | 0421 |
| 152 | 0131 |
| 153 | 0231 |
| 154 | 0331 |
| 155 | 0431 |
| 156 | 0112 |
| 157 | 0212 |
| 158 | 0312 |
| 159 | 0412 |
| 160 | 0122 |
| 161 | 0222 |
| 162 | 0322 |
| 163 | 0422 |
| 164 | 0142 |
| 165 | 0242 |
| 166 | 0342 |
| 167 | 0442 |
| 168 | 0113 |
| 169 | 0213 |
| 170 | 0313 |
| 171 | 0413 |
| 172 | 0133 |
| 173 | 0233 |
| 174 | 0333 |
| 175 | 0433 |
| 176 | 0143 |
| 177 | 0243 |
| 178 | 0343 |
| 179 | 0443 |
| 180 | 0124 |

| | |
|---|---|
| 121 | 2134 |
| 122 | 3134 |
| 123 | 1234 |
| 124 | 2234 |
| 125 | 4234 |
| 126 | 1334 |
| 127 | 3334 |
| 128 | 4334 |
| 129 | 2434 |
| 130 | 3434 |
| 131 | 4434 |
| 132 | 1144 |
| 133 | 2144 |
| 134 | 3144 |
| 135 | 1244 |
| 136 | 2244 |
| 137 | 4244 |
| 138 | 1344 |
| 139 | 3344 |
| 140 | 4344 |
| 141 | 2444 |
| 142 | 3444 |
| 143 | 4444 |
| 144 | 0111 |
| 145 | 0211 |
| 146 | 0311 |
| 147 | 0411 |
| 148 | 0121 |
| 149 | 0221 |
| 150 | 0321 |

| | |
|---|---|
| 91 | 3333 |
| 92 | 4333 |
| 93 | 2433 |
| 94 | 3433 |
| 95 | 4433 |
| 96 | 1143 |
| 97 | 2143 |
| 98 | 3143 |
| 99 | 1243 |
| 100 | 2243 |
| 101 | 4243 |
| 102 | 1343 |
| 103 | 3343 |
| 104 | 4343 |
| 105 | 2443 |
| 106 | 3443 |
| 107 | 4443 |
| 108 | 1124 |
| 109 | 2124 |
| 110 | 3124 |
| 111 | 1224 |
| 112 | 2224 |
| 113 | 4224 |
| 114 | 1324 |
| 115 | 3324 |
| 116 | 4324 |
| 117 | 2424 |
| 118 | 3424 |
| 119 | 4424 |
| 120 | 1134 |

Fig. 20

| | |
|---|---|
| 181 | 0224 |
| 182 | 0324 |
| 183 | 0424 |
| 184 | 0134 |
| 185 | 0234 |
| 186 | 0334 |
| 187 | 0434 |
| 188 | 0144 |
| 189 | 0244 |
| 190 | 0344 |
| 191 | 0444 |
| 192 | 1011 |
| 193 | 2011 |
| 194 | 3011 |
| 195 | 4011 |
| 196 | 1021 |
| 197 | 2021 |
| 198 | 3021 |
| 199 | 4021 |
| 200 | 1031 |
| 201 | 2031 |
| 202 | 3031 |
| 203 | 4031 |
| 204 | 1012 |
| 205 | 2012 |
| 206 | 3012 |
| 207 | 4012 |
| 208 | 1022 |
| 209 | 2022 |
| 210 | 3022 |

| | |
|---|---|
| 211 | 4022 |
| 212 | 1042 |
| 213 | 2042 |
| 214 | 3042 |
| 215 | 4042 |
| 216 | 1013 |
| 217 | 2013 |
| 218 | 3013 |
| 219 | 4013 |
| 220 | 1033 |
| 221 | 2033 |
| 222 | 3033 |
| 223 | 4033 |
| 224 | 1043 |
| 225 | 2043 |
| 226 | 3043 |
| 227 | 4043 |
| 228 | 1024 |
| 229 | 2024 |
| 230 | 3024 |
| 231 | 4024 |
| 232 | 1034 |
| 233 | 2034 |
| 234 | 3034 |
| 235 | 4034 |
| 236 | 1044 |
| 237 | 2044 |
| 238 | 3044 |
| 239 | 4044 |
| 240 | 0011 |

| | |
|---|---|
| 241 | 0021 |
| 242 | 0031 |
| 243 | 0012 |
| 244 | 0022 |
| 245 | 0042 |
| 246 | 0013 |
| 247 | 0033 |
| 248 | 0043 |
| 249 | 0024 |
| 250 | 0034 |
| 251 | 0044 |
| 252 | 1101 |
| 253 | 2101 |
| 254 | 3101 |
| 255 | 1201 |
| 256 | 2201 |
| 257 | 4201 |
| 258 | 1301 |
| 259 | 3301 |
| 260 | 4301 |
| 261 | 2401 |
| 262 | 3401 |
| 263 | 4401 |
| 264 | 1102 |
| 265 | 2102 |
| 266 | 3102 |
| 267 | 1202 |
| 268 | 2202 |
| 269 | 4202 |
| 270 | 1302 |

Fig. 21

| | |
|---|---|
| 331 | 4004 |
| 332 | 0001 |
| 333 | 0002 |
| 334 | 0003 |
| 335 | 0004 |
| 336 | 2223 |
| 337 | 4223 |
| 338 | 2423 |
| 339 | 3423 |
| 340 | 4423 |
| 341 | 1114 |
| 342 | 2114 |
| 343 | 3114 |
| 344 | 1214 |
| 345 | 2214 |
| 346 | 4214 |
| 347 | 1314 |
| 348 | 3314 |
| 349 | 4314 |
| 350 | 0241 |
| 351 | 0341 |
| 352 | 0441 |
| 353 | 0132 |
| 354 | 0332 |
| 355 | 0432 |
| 356 | 0123 |
| 357 | 0223 |
| 358 | 0423 |
| 359 | 0114 |
| 360 | 0214 |

| | |
|---|---|
| 301 | 0201 |
| 302 | 0301 |
| 303 | 0401 |
| 304 | 0102 |
| 305 | 0202 |
| 306 | 0302 |
| 307 | 0402 |
| 308 | 0103 |
| 309 | 0203 |
| 310 | 0303 |
| 311 | 0403 |
| 312 | 0104 |
| 313 | 0204 |
| 314 | 0304 |
| 315 | 0404 |
| 316 | 1001 |
| 317 | 2001 |
| 318 | 3001 |
| 319 | 4001 |
| 320 | 1002 |
| 321 | 2002 |
| 322 | 3002 |
| 323 | 4002 |
| 324 | 1003 |
| 325 | 2003 |
| 326 | 3003 |
| 327 | 4003 |
| 328 | 1004 |
| 329 | 2004 |
| 330 | 3004 |

| | |
|---|---|
| 271 | 3302 |
| 272 | 4302 |
| 273 | 2402 |
| 274 | 3402 |
| 275 | 4402 |
| 276 | 1103 |
| 277 | 2103 |
| 278 | 3103 |
| 279 | 1203 |
| 280 | 2203 |
| 281 | 4203 |
| 282 | 1303 |
| 283 | 3303 |
| 284 | 4303 |
| 285 | 2403 |
| 286 | 3403 |
| 287 | 4403 |
| 288 | 1104 |
| 289 | 2104 |
| 290 | 3104 |
| 291 | 1204 |
| 292 | 2204 |
| 293 | 4204 |
| 294 | 1304 |
| 295 | 3304 |
| 296 | 4304 |
| 297 | 2404 |
| 298 | 3404 |
| 299 | 4404 |
| 300 | 0101 |

Fig. 22

| | |
|---|---|
| 421 | 3203 |
| 422 | 2303 |
| 423 | 1403 |
| 424 | 4104 |
| 425 | 3204 |
| 426 | 2304 |
| 427 | 1404 |
| 428 | 1110 |
| 429 | 2110 |
| 430 | 3110 |
| 431 | 1210 |
| 432 | 2210 |
| 433 | 4210 |
| 434 | 1310 |
| 435 | 3310 |
| 436 | 4310 |
| 437 | 2410 |
| 438 | 3410 |
| 439 | 4410 |
| 440 | 1120 |
| 441 | 2120 |
| 442 | 3120 |
| 443 | 1220 |
| 444 | 2220 |
| 445 | 4220 |
| 446 | 1320 |
| 447 | 3320 |
| 448 | 4320 |
| 449 | 2420 |
| 450 | 3420 |

| | |
|---|---|
| 391 | 3242 |
| 392 | 2342 |
| 393 | 1442 |
| 394 | 4113 |
| 395 | 3213 |
| 396 | 2313 |
| 397 | 4133 |
| 398 | 2333 |
| 399 | 1433 |
| 400 | 3243 |
| 401 | 2343 |
| 402 | 1443 |
| 403 | 4124 |
| 404 | 3224 |
| 405 | 1424 |
| 406 | 4134 |
| 407 | 2334 |
| 408 | 1434 |
| 409 | 3244 |
| 410 | 2344 |
| 411 | 1444 |
| 412 | 4101 |
| 413 | 3201 |
| 414 | 2301 |
| 415 | 1401 |
| 416 | 4102 |
| 417 | 3202 |
| 418 | 2302 |
| 419 | 1402 |
| 420 | 4103 |

| | |
|---|---|
| 361 | 0314 |
| 362 | 1041 |
| 363 | 2041 |
| 364 | 3041 |
| 365 | 4041 |
| 366 | 1032 |
| 367 | 2032 |
| 368 | 3032 |
| 369 | 4032 |
| 370 | 1023 |
| 371 | 2023 |
| 372 | 3023 |
| 373 | 4023 |
| 374 | 1014 |
| 375 | 2014 |
| 376 | 3014 |
| 377 | 4014 |
| 378 | 0041 |
| 379 | 0032 |
| 380 | 0023 |
| 381 | 0014 |
| 382 | 4131 |
| 383 | 2331 |
| 384 | 1431 |
| 385 | 4112 |
| 386 | 3212 |
| 387 | 2312 |
| 388 | 4122 |
| 389 | 3222 |
| 390 | 1422 |

Fig. 23

| 451 | 4420 |
| 452 | 1130 |
| 453 | 2130 |
| 454 | 3130 |
| 455 | 1230 |
| 456 | 2230 |
| 457 | 4230 |
| 458 | 1330 |
| 459 | 3330 |
| 460 | 4330 |
| 461 | 2430 |
| 462 | 3430 |
| 463 | 4430 |
| 464 | 1140 |
| 465 | 2140 |
| 466 | 3140 |
| 467 | 1240 |
| 468 | 2240 |
| 469 | 4240 |
| 470 | 1340 |
| 471 | 3340 |
| 472 | 4340 |
| 473 | 2440 |
| 474 | 3440 |
| 475 | 4440 |
| 476 | 0110 |
| 477 | 0210 |
| 478 | 0310 |
| 479 | 0410 |
| 480 | 0120 |

| 481 | 0220 |
| 482 | 0320 |
| 483 | 0420 |
| 484 | 0130 |
| 485 | 0230 |
| 486 | 0330 |
| 487 | 0430 |
| 488 | 0140 |
| 489 | 0240 |
| 490 | 0340 |
| 491 | 0440 |
| 492 | 1010 |
| 493 | 2010 |
| 494 | 3010 |
| 495 | 4010 |
| 496 | 1020 |
| 497 | 2020 |
| 498 | 3020 |
| 499 | 4020 |
| 500 | 1030 |
| 501 | 2030 |
| 502 | 3030 |
| 503 | 4030 |
| 504 | 1040 |
| 505 | 2040 |
| 506 | 3040 |
| 507 | 4040 |
| 508 | 0010 |
| 509 | 0020 |
| 510 | 0030 |
| 511 | 0040 |

Fig. 32

| STATE | PROVISIONAL DECODING RESULT | | | | | | $b_{7-(88k-1)}$ | | EQUALIZED REFERENCE ADDRESS | INITIAL VALUE | WHITENED REFERENCE ADDRESS | INITIAL VALUE | BRANCH METRIC | | STATE METRIC | | PATH METRIC |
|---|---|---|---|---|---|---|---|---|---|---|---|---|---|---|---|---|---|
| STATE 10 | $b_1+PM_{10}$ | 3 | 1 | 0 | 2 | 3 | 1 | ... | 31023 | -1.5 | 31023 | -1.445 | $bm_{10}$ | 8.673025 | $sm_{10}$ | 2.1341 | 10.807125 |
| STATE 11 | $b_1+PM_{11}$ | 3 | 1 | 1 | 3 | 1 | 0 | ... | 31131 | 0.5 | 31310 | 0.505 | $bm_{11}$ | 0.990025 | $sm_{11}$ | 4.6109 | 5.600025 |
| STATE 12 | $b_1+PM_{12}$ | 3 | 1 | 2 | 1 | 0 | 1 | ... | 31210 | 1.5 | 31101 | 1.507 | $bm_{12}$ | 4.9E-05 | $sm_{12}$ | 0.0221 | 0.022149 |
| STATE 13 | $b_1+PM_{13}$ | 3 | 1 | 3 | 1 | 2 | 0 | ... | 31012 | 3.9 | 31120 | 3.861 | $bm_{13}$ | 5.574321 | $sm_{13}$ | 3.2319 | 8.806221 |

SIGNAL PROCESSING DEVICE, SIGNAL PROCESSING METHOD, AND PROGRAM

CROSS REFERENCE TO PRIOR APPLICATION

This application is a National Stage Patent Application of PCT International Patent Application No. PCT/JP2021/001158 (filed on Jan. 15, 2021) under 35 U.S.C. § 371, which claims priority to Japanese Patent Application No. 2020-013882 (filed on Jan. 30, 2020), which are all hereby incorporated by reference in their entirety.

TECHNICAL FIELD

The present technology relates to a signal processing device, a signal processing method, and a program, and more particularly to a signal processing device, a signal processing method, and a program capable of improving noise resistance, for example, in high linear density recording.

BACKGROUND ART

For example, PTL 1 discloses a technology for combining a noise predictive maximum likelihood (NPML) and a crosstalk canceler effectively exhibiting decoding performance of Viterbi decoding which is maximum likelihood decoding by whitening noise of a reproduced signal from an optical disc while canceling out crosstalk from an adjacent track on a binary recording optical disc.

CITATION LIST

Patent Literature

[PTL 1]
JP 6504245 B2

SUMMARY

Technical Problem

In recent years, in high linear density recording, an improvement in noise resistance has been requested.

The present technology has been devised in view of such circumstances and is capable of improving noise resistance in high linear density recording.

Solution to Problem

A signal processing device or a program according to the present technology is a signal processing device including an equalization unit configured to perform partial response (PR) equalization of a reproduced signal of multilevel codes of $3<=ML$ and a decoding unit configured to perform maximum likelihood decoding of an equalized signal obtained through the PR equalization or a program causing a computer to function as the signal processing device.

A signal processing method according to the present technology is a signal processing method that includes performing partial response (PR) equalization of a reproduced signal of multilevel codes of $3<=ML$; and performing maximum likelihood decoding of an equalized signal obtained through the PR equalization.

In the signal processing device, the signal processing method, and the program according to the present technology, partial response (PR) equalization of a reproduced signal of multilevel codes of $3<=ML$ is performed and maximum likelihood decoding of an equalized signal obtained through the PR equalization is performed.

The signal processing device may be an independent device or may be an internal block included in one device.

The program can be provided by transmitting the program via a transmission medium or recording the program on a recording medium.

BRIEF DESCRIPTION OF DRAWINGS

FIG. 11 is a diagram illustrating specifications of a block code configured with multilevel codes of ML=5 in the case of the maximum consecutive number k=4.

FIG. 13 is a diagram illustrating some of 500 s0→s0 codes and 500 s1→s0 codes and state transition in generation of the s0→s0 codes and the s1→s0 codes.

FIG. 14 is a diagram illustrating some of 100 s0→s1 codes and 100 s1→s1 codes and state transition in generation of the s0→s1 codes and the s1→s1 codes.

FIG. 18 is a diagram illustrating an example of a code lookup table (LUT) in which 512 block codes which are 9-bit/4-cell codes of k=4 and ML=5 are associated with binary data which are user data obtained by encoding the block codes.

FIG. 19 is a diagram illustrating an example of a code lookup table (LUT) in which 512 block codes which are 9-bit/4-cell codes of k=4 and ML=5 are associated with binary data which are user data obtained by encoding the block codes.

FIG. 20 is a diagram illustrating an example of a code lookup table (LUT) in which 512 block codes which are 9-bit/4-cell codes of k=4 and ML=5 are associated with binary data which are user data obtained by encoding the block codes.

FIG. 21 is a diagram illustrating an example of a code lookup table (LUT) in which 512 block codes which are 9-bit/4-cell codes of k=4 and ML=5 are associated with binary data which are user data obtained by encoding the block codes.

FIG. 22 is a diagram illustrating an example of a code lookup table (LUT) in which 512 block codes which are 9-bit/4-cell codes of k=4 and ML=5 are associated with binary data which are user data obtained by encoding the block codes.

FIG. 23 is a diagram illustrating an example of a code lookup table (LUT) in which 512 block codes which are 9-bit/4-cell codes of k=4 and ML=5 are associated with binary data which are user data obtained by encoding the block codes.

FIG. 32 is a diagram illustrating an example of an operation of a Viterbi decoder 320.

DESCRIPTION OF EMBODIMENTS

<Embodiment of Optical Disc Recording/Reproducing Device to which Present Technology is Applied>

Figure 1:
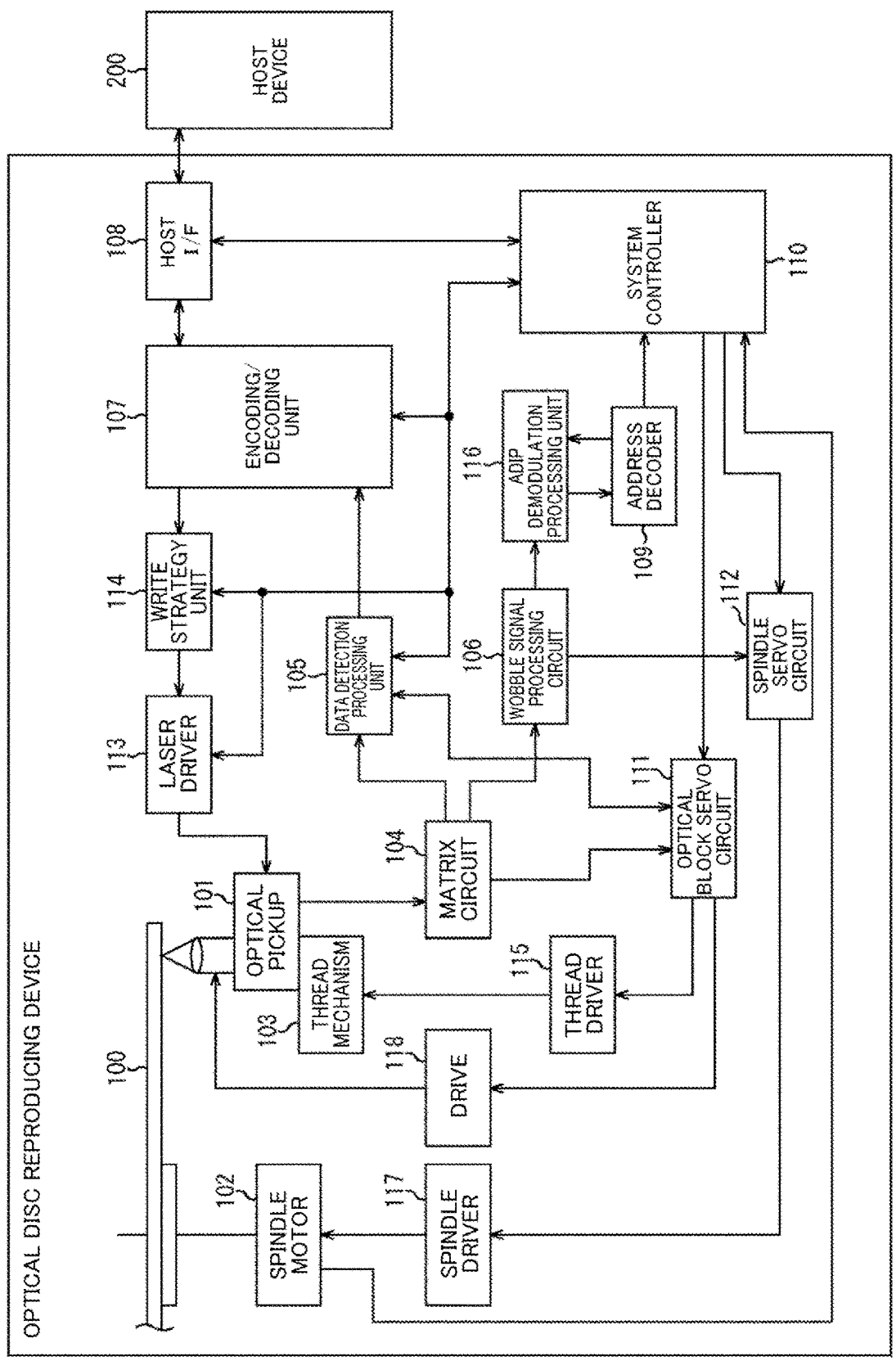
FIG. 1 is a block diagram illustrating an exemplary configuration of an embodiment of an optical disc recording/reproducing device to which the present technology is applied.

FIG. 1 is a block diagram illustrating an exemplary configuration of an embodiment of an optical disc recording/reproducing device (hereinafter referred to as a "recording/reproducing device") to which the present technology is applied.

The recording/reproducing device includes an optical pickup 101 that records and reproduces information on the optical disc 100 which is an optical recording medium and a spindle motor 102 that rotates the optical disc 100, as illustrated in FIG. 1. To move the optical pickup 101 in a radial direction of the optical disc 100, a thread mechanism (a thread feed motor) 103 is provided.

As the optical disc 100, a high density optical disc such as a Blu-ray disc (BD ((registered trademark)) can be adopted. A BD is a high density optical disc that has a recording capacity with a single-side monolayer of about 25 giga byte (GB) and single-side dual layers of about 50 GB. In a BD specification, to make a beam spot diameter small, a light source wavelength is set to 405 nm and a numerical aperture NA of an objective lens is set to a large value of 0.85. In a CD specification, a light source wavelength is 780 nm, NA is 0.45, and a spot diameter is 2.11 μm. In a DVD specification, a light source wavelength is 650 nm, NA is 0.6, and a spot diameter is 1.32 μm. In a BD specification, a spot diameter can be narrowed down as far as 0.58 μm.

Further, with regard to a BD, by shortening a channel bit length, that is, a mark length, and achieving high density in a linear density direction, BDXL (registered trademark) in which a large capacity with 100 GB in three layers and 128 GB of four layers is implemented has been put to practical use.

To increase a new recording capacity, data is recorded in both a groove track and a land track. For example, an optical disc called an archival disc (AD) can be adopted as the optical disc 100. An engraved portion is called a groove and a track formed by grooves is called a groove track. When an optical disc is manufactured, a groove is defined as a portion irradiated with laser light, an area interposed between adjacent grooves is called a land, and a track formed by the land is called a land track. Further, when a multi-layer optical disc has a plurality of laminated information recording layers, a recording capacity can be further increased.

When the optical disc 100 capable of performing high-density recording is loaded on a recording/reproducing device, the optical disc 100 is rotated and driven at a constant linear velocity (CLV) or a constant angular velocity (CAV) by the spindle motor 102 during recording/reproducing. During reproducing, marks formed in the tracks on the optical disc 100 are read by the optical pickup (an optical head) 101. During recording of data on the optical disc 100, user data is recorded as a phase change mark or a pigment change mark in a track on the optical disc 100 by the optical pickup 101.

When the optical disc 100 is a recordable disc, for example, a recording mark is recorded with a phase change mark on a track formed by a wobbling groove. A phase change mark is recorded at a linear density of 0.12 μm/bit and 0.08 μm/channel bit in the case of a BD with 23.3 GB for each layer in accordance with, for example, an RLL (1, 7) PP modulation scheme (RLL: Run Length Limited and PP: Parity preserve/Prohibit repeated minimum transition run length (rmtr)). When the optical disc 100 is a BD with 25 GB/layer, a BDXL with 32 GB/layer, and a BDXL with 33.4 GB/layer, recording is performed at a density corresponding to a channel bit length in accordance with a type of disc like, such as 0.0745 μm/channel bit, 0.05826 μm/channel bit, and 0.05587 μm/channel bit, respectively. When a channel clock period is "T," a mark length is changed from 2T to 8T. When the optical disc 100 is a disc for only recording, for example, no groove is formed, but data modulated in accordance with an RLL (1, 7) PP modulation scheme is recorded as emboss pit arrays.

In an inner circumferential area of the optical disc 100, for example, physical information or the like of the optical disc 100 is recorded with an emboss pit or a wobbling groove as management information for only reproduction. The management information or the like is read by the optical pickup 101. Further, ADIP information embedded as wobbling of a groove track on the optical disc 100 is also read by the optical pickup 101.

In the optical pickup 101, a laser diode that serves as a laser light source, a photodetector that detects reflected light, an objective lens that serves as an output end of laser light, and an optical system that irradiates a disc recording surface of the optical disc 100 via the objective lens with the laser light and guides reflected light of the laser light to the photodetector are configured. The objective lens in the optical pickup 101 is held to be movable in a tracking direction and a focus direction with a biaxial mechanism. The entire optical pickup 101 is considered to be movable in a disc radial direction by the thread mechanism 103. When a driving current is supplied from the laser driver 113 to the laser diode of the optical pickup 101, the laser diode generates a laser.

When light reflected from the optical disc 100 is detected (received) by the photodetector, an electric signal in accordance with a light reception amount of the reflected light in the photodetector is supplied to the matrix circuit 104. The matrix circuit 104 includes a current-voltage conversion circuit and a matrix calculation/amplification circuit and generates a necessary signal by performing matrix calculation processing using output currents serving as electric signals from a plurality of light-receiving elements which are photodetectors. The current-voltage conversion circuit may be formed in the photodetector rather than the matrix circuit 104 in consideration of signal transmission quality. The matrix circuit 104 generates a reproduced signal (RF signal) corresponding to information recorded on the optical disc 100 and a focus error signal and a tracking error signal for servo control from the output currents from the photodetectors. Further, the matrix circuit 104 generates a push-pull signal as a signal related to wobbling of a groove, that is, a signal for detecting wobbling.

The reproduced signal generated by the matrix circuit 104 is supplied to a data detection processing unit 105, the focus error signal and the tracking error signal are supplied to an optical block servo circuit 111, and the push-pull signal is supplied to a wobble signal processing circuit 106.

The data detection processing unit 105 performs multilevel processing for the reproduced signal. For example, the data detection processing unit 105 performs A/D conversion for the RF signal, produced clock generation by phase locked loop (PLL), partial response (PR) equalization, Viterbi decoding serving as maximum likelihood decoding, or the like to reproduce (decode) multilevel codes recorded on the optical disc 100 in accordance with partial response maximum likelihood decoding (a PRML detection scheme). The data detection processing unit 105 supplies the multilevel codes as information reproduced from the optical disc 100 to an encoding/decoding unit 107 at a rear stage. The multilevel codes are codes that take a value of ML (=>3) equal to or greater than a ternary value. The details of the multilevel codes will be described below. The multilevel codes are disclosed in JP 2018-202533 A, the application of which was filed earlier by the present applicants.

The encoding/decoding unit 107 performs modulation on the information at the time of decoding and recording of multilevel codes at the time of reproducing. That is, the encoding/decoding unit 107 performs decoding (channel decoding), deinterleaving, ECC decoding, address decoding, and the like during producing and performs ECC encoding, interleaving, encoding (channel encoding) during producing.

In reproducing, the multilevel codes decoded by the data detection processing unit 105 are supplied to the encoding/decoding unit 107. The encoding/decoding unit 107 performs decoding for a multilevel code, ECC decoding for performing error correction, and the like to reproduce information as user data recorded on the optical disc 100.

The information produced by the encoding/decoding unit 107 is transmitted to a host I/F 108 and is transmitted to the host device 200 based on an instruction from a system controller 110. The host device 200 is, for example, a computer device or an audio-visual (AV) system device.

During recording/reproducing on the optical disc 100, processing for ADIP information is performed. That is, the push-pull signal generated as the signal related to wobbling of a groove by the matrix circuit 104 is considered to be wobble data digitized in the wobble signal processing circuit 106. A clock synchronized with the push-pull signal is generated by the PLL. The wobble data is demodulated into a data stream including an ADIP address by an ADIP demodulation processing unit 116 and the data stream is supplied to an address decoder 109. The address decoder 109 decodes the data stream including the ADIP address to obtain an ADIP address and supplies the ADIP address to the system controller 110.

During recording, information which is user data is supplied from the host device 200 to the encoding/decoding unit 107 via the host I/F 108. The encoding/decoding unit 107 performs adding (ECC encoding) of an error correction code, interleaving, adding of a sub-code, encoding into a multilevel code, or the like on the information which is user data. Here, multilevel codes can be recorded and binary codes can also be recorded on the optical disc 100. As a scheme for encoding (modulation) into binary codes, for example, there is a run length limited code modulation such as an RLL (1, 7) PP modulation scheme.

Multilevel codes obtained by the encoding/decoding unit 107 are supplied to a write strategy unit 114. The write strategy unit 114 performs waveform adjustment of a laser driving pulse on a feature of a recording layer, a spot shape of laser light, recording linear velocity, and the like as recording compensation processing. Then, the write strategy unit 114 outputs a laser driving pulse corresponding to multilevel codes to the laser driver 113.

The laser driver 113 flows a current to a laser diode in the optical pickup 101 based on the laser driving pulse subjected to the recording compensation processing and performs laser radiation. Thus, a mark in accordance with multilevel codes (information which is user data encoded at the multilevel code) is formed on the optical disc 100.

The optical block servo circuit 111 generates various servo drive signals for focusing, tracking, and threading from a focus error signal and a tracking error signal generated by the matrix circuit 104 and performs a servo operation. That is, the optical block servo circuit 111 generates a focus drive signal and a tracking drive signal in accordance with a focus error signal and a tracking error signal and the driver 118 drives a focus coil and a tracking coil of the biaxial mechanism in the optical pickup 101. Thus, a tracking servo loop and a focus servo loop are formed by the optical pickup 101, the matrix circuit 104, the optical block servo circuit 111, the driver 118, and the biaxial mechanism.

Further, the optical block servo circuit 111 performs a track jump operation by turning off a tracking servo loop in accordance with a track jump instruction from the system controller 110 and outputting a pump drive signal. Further, the optical block servo circuit 111 generates a thread drive signal based on the thread error signal obtained as a lowpass component of the tracking error signal, access execution control from the system controller 110, and the like. The thread driver 115 drives the thread mechanism 103 in accordance with the thread drive signal generated by the optical block servo circuit 111.

The spindle servo circuit 112 performs control for CLV rotation of the spindle motor 102. The spindle servo circuit 112 generates a spindle error signal by obtaining a clock generated from the wobble signal by the PLL as present rotation velocity information of the spindle motor 102 and comparing the rotational velocity information with predetermined CLV reference velocity information. The spindle servo circuit 112 generates the spindle error signal by comparing the rotational velocity information with the predetermined CLV reference velocity information since a reproduced clock by the PLL in the data detection processing unit 105 during data reproducing serves as the present rotational velocity information of the spindle motor 102. The spindle servo circuit 112 generates a spindle drive signal in accordance with the spindle error signal, supplies the spindle drive signal to a spindle driver 117, and performs the CLV rotation of the spindle motor 102 in accordance with the spindle drive signal.

The spindle servo circuit 112 generates a spindle drive signal in accordance with a spindle kick/brake control signal from the system controller 110 and performs a starting, stopping, accelerating, or decelerating operation of the spindle motor 102 in accordance with the spindle drive signal.

As described above, the various operations of the servo system and the recording/reproducing system are controlled by the system controller 110 formed by a microcomputer. The system controller 110 performs various types of processing in accordance with commands given via the host I/F 108 from the host device 200. For example, when a write command is output from the host device 200, the system controller 110 moves the optical pickup 101 to an address to be written first. The system controller 110 causes the encoding/decoding unit 107 to modulate information (for example, video data or audio data) which is user data transmitted from the host device 200. Then, when the laser driver 113 drives laser radiation in accordance with multilevel codes obtained through the modulation, information which is user data is recorded as the multilevel codes.

Further, for example, when a read command for making a request for transmission of information recorded on the optical disc 100 is supplied from the host device 200, the system controller 110 performs seek operation control for a purpose of an address at which information is recorded. That is, the system controller 110 outputs a seek command designating an address to the optical block servo circuit 111 and performs an access operation of the optical pickup 101 for targeting the address designated by the seek command. Thereafter, the system controller 110 performs operation control necessary to transmit information (a multilevel code) requested in accordance with the read command to the host device 200. That is, the system controller 110 reads information from the optical disc 100, causes the data detection processing unit 105 and the encoding/decoding unit 107 to perform necessary processing, and transmits the information requested in accordance with the read command to the host device 200.

The recording/reproducing device in FIG. 1 is a recording/reproducing device connected to the host device 200. However, a type of recording and reproduced device which is not connected to other devices can be adopted. When a type of recording/reproducing device which is not connected to other devices is adopted, a configuration in which a manipulation unit or a display unit is provided or a configuration of an input/output interface unit for the outside is different from the configuration of FIG. 1. For example, in the recording/reproducing device, terminal units that perform recording or reproducing in accordance with a user manipulation and input and output various kinds of information are formed. Of course, any of other various configurations can be considered as an exemplary configuration of the recording/reproducing device.

Figure 2:
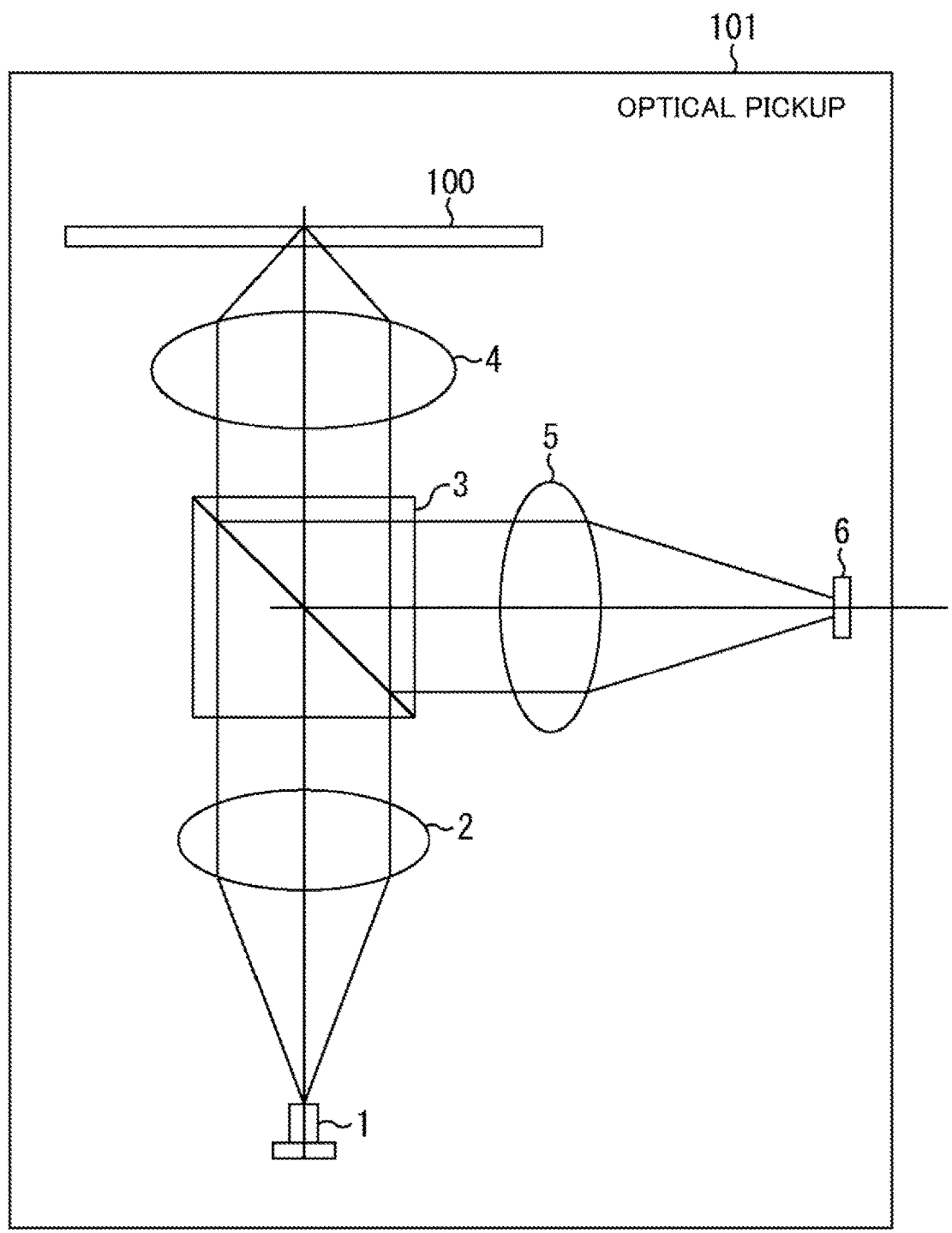
FIG. 2 is a sectional view illustrating an exemplary configuration of an optical pickup 101.

FIG. 2 is a sectional view illustrating an exemplary configuration of the optical pickup 101.

The optical pickup 101 uses laser light (beam) with, for example, a wavelength λ of 405 nm to record information on the optical disc 100 and reproduce information from the optical disc 100. The laser light is emitted from a semiconductor laser (a laser diode (LD)) 1.

The laser light passes through a collimator lens 2, a polarizing beam splitter (PBS) 3, and an objective lens 4 and is radiated to the optical disc 100. The polarizing beam splitter 3 has, for example, a separation surface that passes about 100% of P-polarized light and reflects about 100% of S-polarized light. In the optical disc 100, the laser light is reflected in a recording layer. The light reflected from the recording layer of the optical disc 100 returns to the same optical path and is incident on the polarizing beam splitter 3. About 100% of the reflected light incident on the polarizing beam splitter 3 is reflected by interposing a λ/4 element (not illustrated).

The reflected light reflected from the polarizing beam splitter 3 is condensed on a light reception surface of the photodetector 6 via a lens 5. The photodetector 6 receives the reflected light on the light reception surface, perform photoelectric conversion, and outputs an output current corresponding to a light reception amount of the reflected light.

Figure 3:
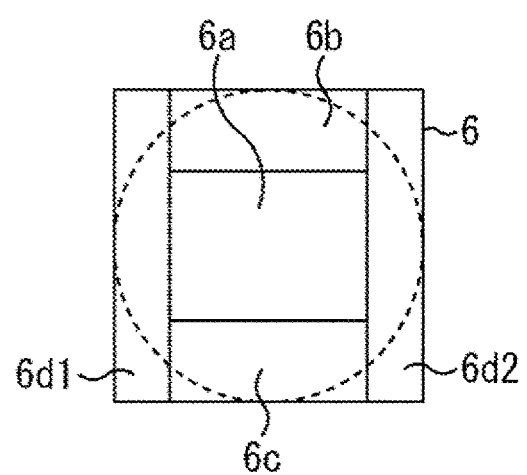
FIG. 3 is a plan view illustrating an exemplary configuration of a light reception surface of a photodetector 6.

FIG. 3 is a plan view illustrating an exemplary configuration of a light reception surface of the photodetector 6.

For example, as illustrated in FIG. 3, the light reception surface is divided into five regions 6a, 6b, 6c, 6d1, 6d2 along two division lines dividing the surface into three regions in a tangential direction (track direction) of the optical disc 100 and two division lines dividing the surface into three regions in a radial direction.

In the photodetector 6, the reflected light is received in the regions 6a, 6b, 6c, 6d1, and 6d2 of the light reception surface and output currents corresponding to five systems are output.

The division of the light reception surface in FIG. 3 is merely exemplary. As a method of dividing the light reception surface, various division examples can be assumed in addition to the division of FIG. 3.

Figure 4:
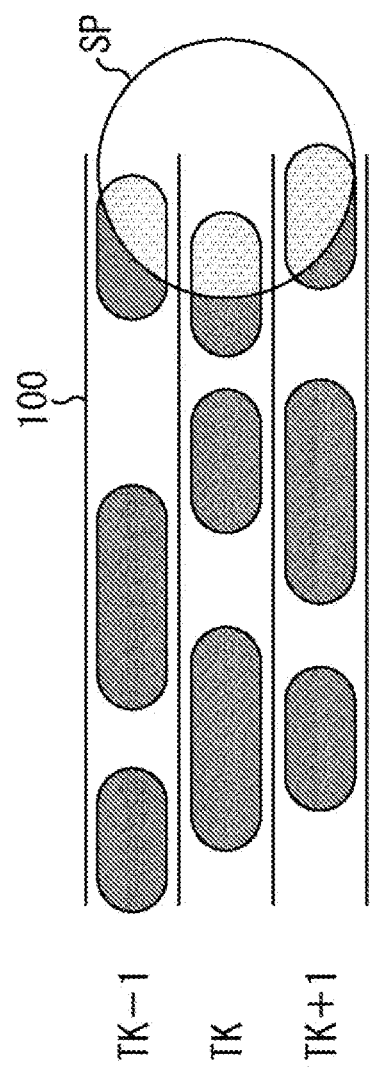
FIG. 4 is a diagram illustrating an example of radiation of laser light to an optical disc 100.

FIG. 4 is a diagram illustrating an example of radiation of laser light to the optical disc 100.

When a track TK of the optical disc 100 is a reproduction target track, the laser light is radiated to a plurality of adjacent tracks including the track TK. For example, as illustrated in FIG. 4, the laser light is radiated so that a spot SP is formed in the track TK, an adjacent track TK−1 adjacent on the inner circumferential side to the track TK, and an adjacent track TK+1 adjacent on the outer circumferential side of the track TK. Therefore, reflected light of the laser light includes reflected light of the laser light from each of the tracks TK, TK−1, and TK+1. The reflected light is received in the regions 6a, 6b, 6c, 6d1, and 6d2 of the photodetector 6.

FIG. 2 illustrates constituent elements of the optical pickup 101 for obtaining a reproduced signal corresponding to information recorded on the optical disc 100. In FIG. 2, signals for generating the focus error signal and the tracking error signal output to the optical block servo circuit 111 via the matrix circuit 104 or the push-pull signal output to the wobble signal processing circuit 106 via the matrix circuit 104 are omitted. Any of various configurations other than the configuration illustrated in FIG. 2 can be adopted as the configuration of the optical pickup 101.

In the embodiment, as described in FIG. 3, the light reception surface of the photodetector 6 is divided into the regions 6a to 6d2, a cross section of the reflected light from the optical disc 100 is divided into a plurality of regions corresponding to the regions 6a to 6d2, and an output current serving as an electric signal corresponding to the light reception amount of each region is obtained. Here, as a method of obtaining an electric signal of each of the regions divided from the cross section of the reflected light, a method other than the method of dividing the light reception surface of the photodetector 6 can be adopted.

For example, a method of disposing an optical path conversion element that divides the reflected light into a plurality of pieces of light by dividing the cross section of the reflected light into a plurality of regions on an optical path passing through the objective lens 4 and reaching the photodetector 6 and causing a plurality of photodetectors to receive a plurality of pieces of light divided from the reflected light by the optical path conversion element can be adopted. As the optical path conversion element, a diffraction element such as a holographic optical element or a reflection element such as a microlens array, or a microprism can be adopted.

In the embodiment, laser light is radiated so that the spot SP is formed on the plurality of tracks TK, TK−1, and TK+1, as in FIG. 4. Thus, the reflected light of the laser light includes reflected light of the laser light from each of the tracks TK, TK−1, and TK+1. Accordingly, a reproduced signal generated from the reflected light includes not only a reproduced signal of a plurality of signal channels, that is, a reproduced signal of the track TK (a reproduced signal obtained when the laser light is radiated to only the track TK) but also reproduced signals of the adjacent tracks TK−1 and TK+1.

<Decoding Performance of Binary Codes and Multilevel Codes>

Figure 5:
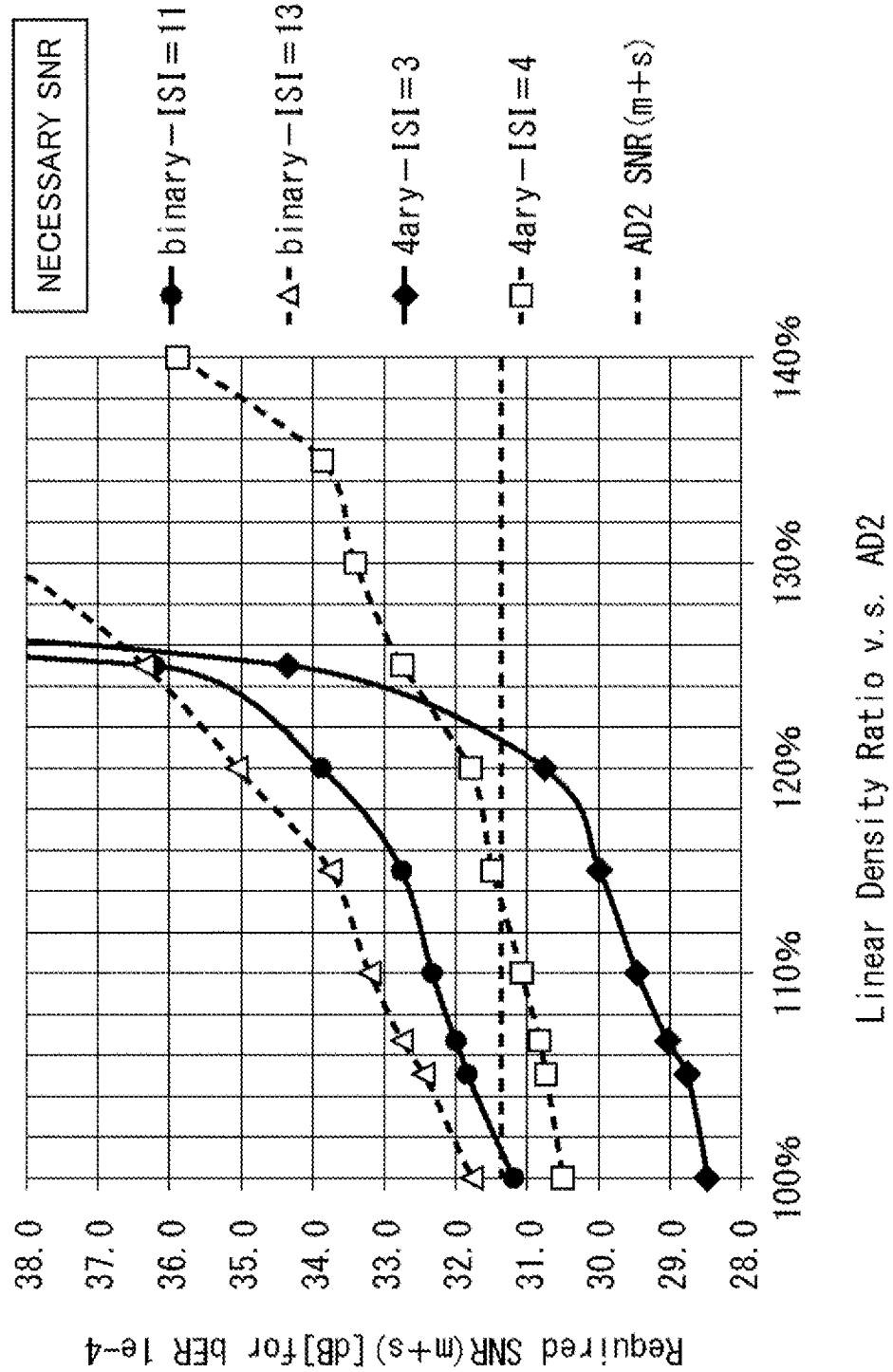
FIG. 5 is a diagram illustrating decoding performances of binary codes and multilevel codes when the binary codes and the multilevel codes are recorded on the optical disc 100 at a high linear density.

FIG. 5 is a diagram illustrating decoding performances of binary codes and multilevel codes when the binary codes and the multilevel codes are recorded on the optical disc 100 at a high linear density.

The inventors of the present specification have found that decoding (detection) performance of information is further improved when multilevel recording is performed than when binary recording is performed. The present technology is based on the finding.

The binary recording is recording of binary codes on the optical disc 100 and the multilevel recording is recording of multilevel codes on the optical disc 100.

In FIG. 5, the horizontal axis represents a linear density of recording on the optical disc 100 and is expressed as a ratio of an AD2 with a capacity of 500 giga byte (GB) to a linear density The AD2 is an optical disc on which data can be recorded with a high linear density and is described in, for example, "White Paper: Archival Disc Technology 2nd Edition," July 2018.

In FIG. 5, the vertical axis represents a signal to noise ratio (SNR) necessary to obtain a cell error rate (cER) of 1e-4 (0.0001) which is referred to as a necessary SNR. A cell (c) at the cER means one (one value) of multilevel codes and is equivalent to a bit of a binary code. An n cell is n lines of a multilevel code. A code length of the multilevel codes is expressed in units of cells.

As the necessary SNR is smaller, a desired cER can be obtained even from a crude noisy signal (a signal with a lot of noise). Accordingly, a small necessary SNR means that decoding performance of codes (information) is good.

In FIG. 5, a necessary SNR obtained by a simulation carried out by the inventors of the present specification is plotted in binary codes and quaternary codes which are multilevel codes of ML=4.

In FIG. 5, binary-ISI=11 indicates a necessary SNR of binary codes when an inter-symbol interference (ISI) length (K to be described below) is 11T. A binary-ISI=13 indicates a necessary SNR of binary codes when an ISI length is 13T. 4-ary-ISI=3 indicates a necessary SNR of quaternary codes when an ISI length is 3T. 4-ary-ISI=4 indicates a necessary SNR of quaternary codes when an ISI length is 4T.

In FIG. 5, a necessary SNR of the AD2 is expressed with a dotted line.

In FIG. 5, for example, a binary-ISI=11 of a linear density of 110% is about 32.3 dB and 4-ary-ISI=3 is about 29.5 dB. Accordingly, it can be confirmed that quaternary codes have stronger resistance against noise (SNR) by 32.3−29.5=2.8 dB than binary codes and decoding performance is good.

That is, by adopting a multilevel code, it is possible to further improve noise resistance than when binary codes are adopted, and thus it is possible to improve decoding performance.

<Method of Representing Multilevel Codes>

Figure 6:
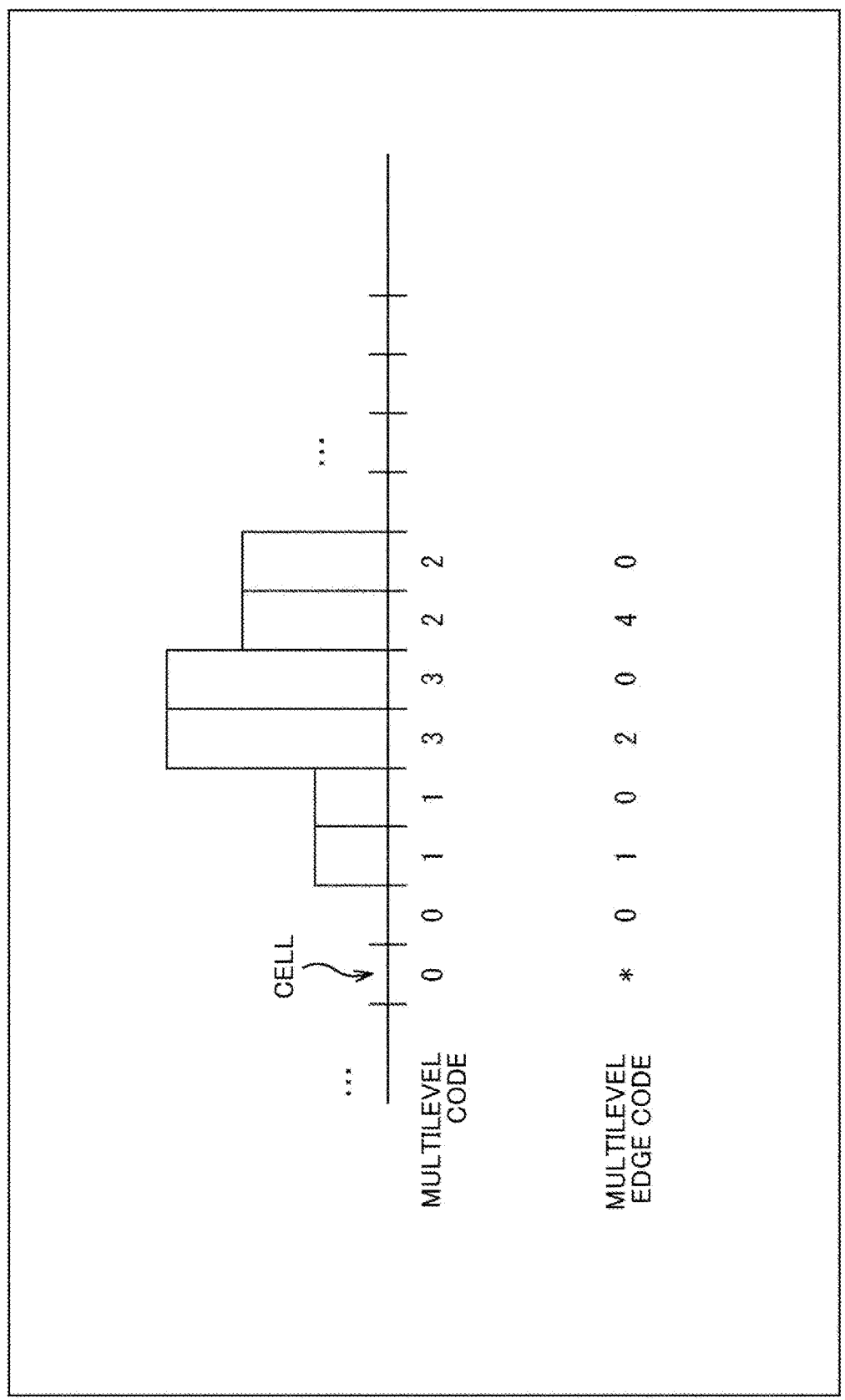
FIG. 6 is a diagram illustrating a representation method of representing multilevel codes.

FIG. 6 is a diagram illustrating a representation method of representing multilevel codes.

As described above, one (one value) of multilevel codes of 3=<ML value is assumed to be a cell. Here, n cells are n lines of multilevel codes. A code length of multilevel codes is represented as a cell.

The multilevel codes of an ML value can be expressed as multilevel edge codes of an ML value.

The multilevel edge codes are codes for expressing a value (level) of multilevel codes at edges. An edge indicates a change amount from a previous value of multilevel codes and is counted so that 0 to ML−1 serving as multilevel codes of an ML value is rotated.

For example, when two cells in which multilevel codes of ML=5 are consecutive are 00, a change amount from 0 of the first cell (from the head) to 0 of the second cell is 0. Therefore, an edge between the two cells is 0.

For example, when two cells in which multilevel codes of ML=5 continue are 01, a change amount from 0 of the first cell to 1 of the second cell is 1. Therefore, an edge between the two cells is 1.

For example, when two cells in which multilevel codes of ML=5 continue are 13, a change amount from 1 of the first cell to 3 of the second cell is 2. Therefore, an edge between the two cells is 2.

For example, when two cells in which multilevel codes of ML=5 continue are 32, a change amount from 3 of the first cell to 2 of the second cell is 4 at the time of counting so that 0 to 4=ML−1 is rotated. Therefore, an edge between the two cells is 4.

Accordingly, for example as illustrated in FIG. 6, a multilevel edge code expressing a multilevel code 0011-3322 . . . of ML=5 is *0102040 . . . * represents a value determined in accordance with a previous value of head 0 of the multilevel code 00113322 . . . .

When a multilevel code (a value (level) of the multilevel code) at a time t (t-th) is expressed as l(t) and a multilevel edge code at the time t is expressed as c(t), the multilevel edge code c(t) satisfies an expression l(t)=(l(t−1)+c(t))% ML. % represents a modulus operator and A % B represents a remainder when A is divided by B.

Information which is user data is encoded (modulated) into multilevel edge codes expressing multilevel codes, as described above. A multilevel code in which a value changes in accordance with a multilevel edge code, that is, the multilevel code l(t) obtained by the expression l(t)=(l(t−1)+c(t))% ML is recorded on the optical disc 100. The multilevel code recorded in this way (a multilevel code in which a value changes in accordance with a multilevel edge code) is reproduced from the optical disc 100.

<Code Generation Model>

Figure 7:
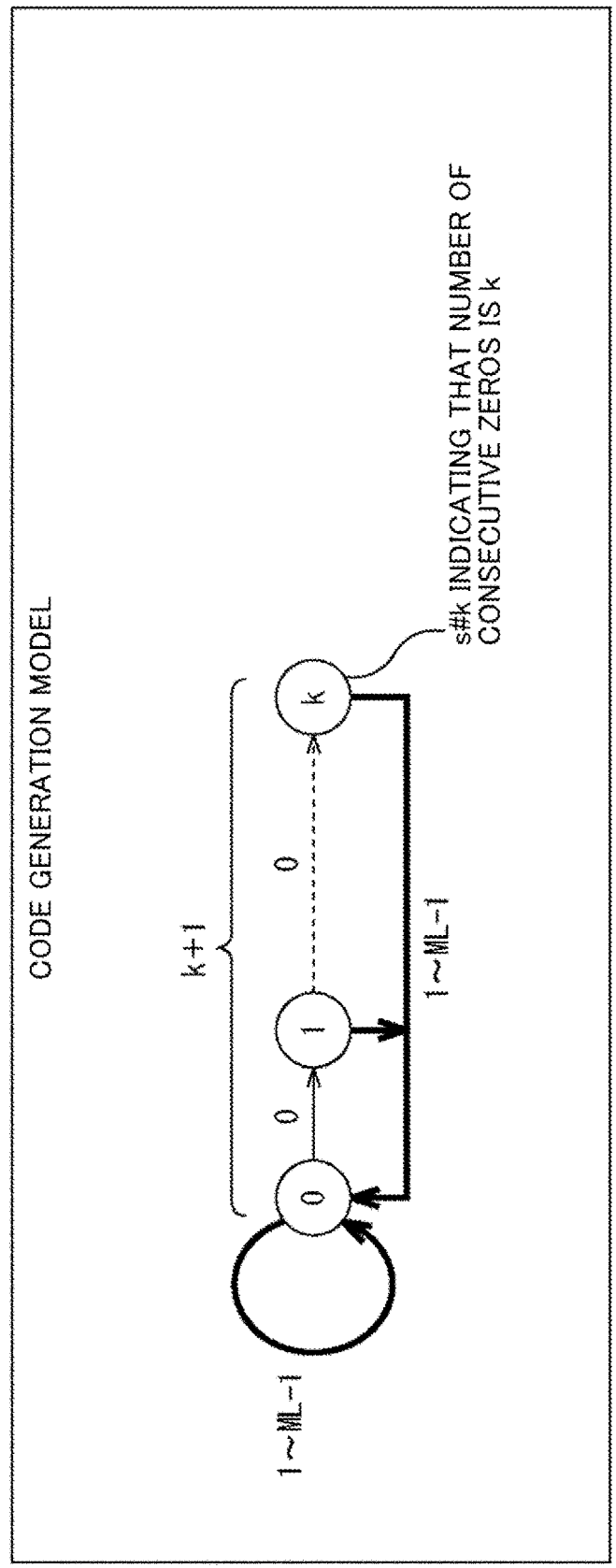
FIG. 7 is a diagram illustrating a code generation model generating multilevel edge codes (multilevel codes represented with multilevel edge codes).

FIG. 7 is a diagram illustrating a code generation model generating multilevel edge codes (multilevel codes represented with multilevel edge codes).

The code generation model has a state indicating the number of consecutive zeros in only the number of cases in which the number of consecutive zeros of edges of 0 are consecutive. Accordingly, when a maximum consecutive number which is a maximum value of the number of consecutive zeros is represented by k, the code generation model has a total of k+1 states, a state s0 indicating that the number of consecutive zeros is 0, a state s1 indicating that the number of consecutive zeros is 1, . . . , and a state s #k indicating that the number of consecutive zeros is k.

When 0 is output as a multilevel edge code, the code generation model transitions to a state s #k' indicating the number of consecutive zeros k' (<=k) of the edges of 0 are consecutive including 0. When any of 1 to ML−1 is output as a multilevel edge code, the code generation model transitions to the state s0 indicating that the number of consecutive zeros is 0. In the state s #k indicating that the number of consecutive zeros is the maximum consecutive number k, only one of 1 to ML−1 is output as multilevel edge codes except for 0. After one multilevel edge code of 1 to ML−1 is output, the code generation model transitions to the state s0.

The multilevel edge codes are generated through the foregoing state transitions of the code generation model.

In general, for a channel code (a recording modulation code) recorded on a recording medium, in order to guarantee a frequency at which information for detecting a phase error in the PLL or the like that generates a channel clock, that is, to guarantee a frequency of transition (change) of a value of a channel code, so-called k limitation for restricting a maximum value of the number of times the same values are consecutive is performed.

Figure 8:
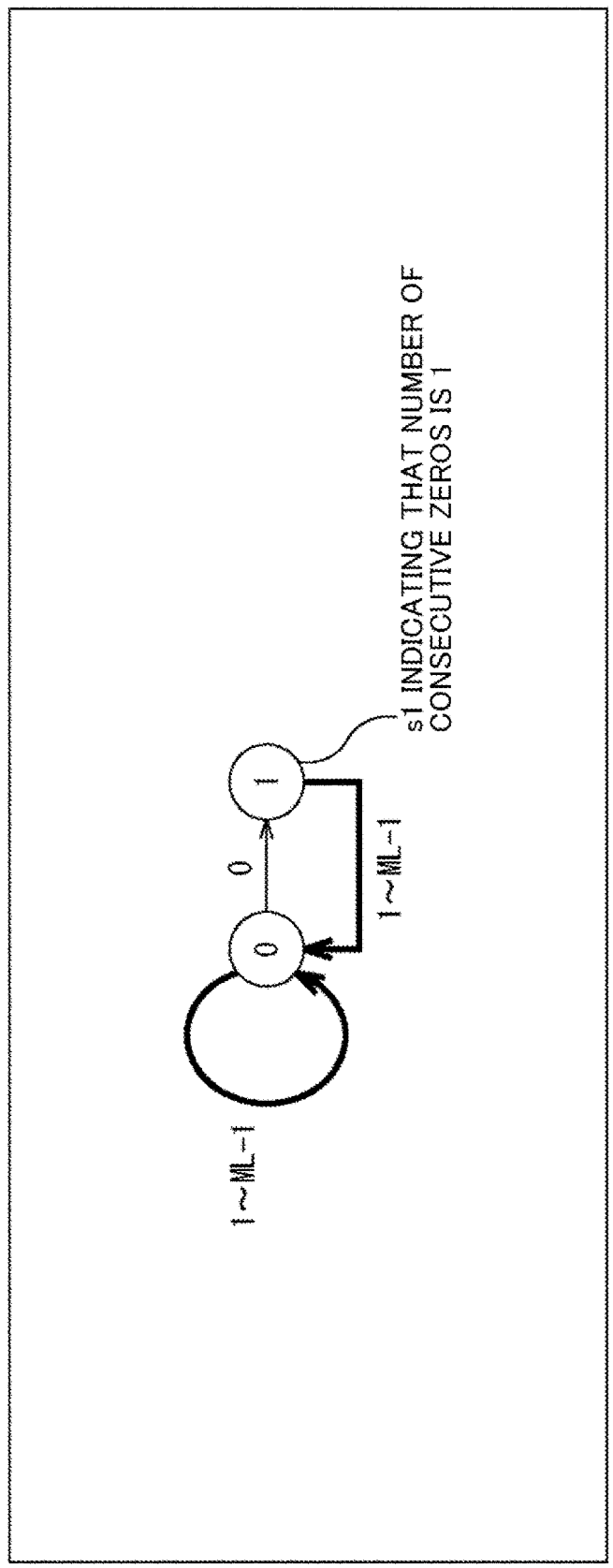
FIG. 8 is a diagram illustrating a code generation model when a maximum consecutive number k is limited to 1.

FIG. 8 is a diagram illustrating a code generation model when a maximum consecutive number k is limited to 1.

In the case of the maximum consecutive number k=1, the code generation model is configured at the state s0 indicating the number of consecutive zeros is 0 and a state s1 indicating that the number of consecutive zeros is 1.

In the case of the state s0, one of 0 to ML−1 can be output as a multilevel edge code. When 0 is output as a multilevel edge code in the state s0, the state of the code generation model transitions from the state s0 to the state s1. When one of 1 to ML−1 is output as a multilevel edge code, the state of the code generation model transitions from the state s0 to the state s0.

In the case of the state s1, 0 is not output as multilevel edge codes and one of 1 to ML−1 can be output except for 0. In the case of the state s1, one of 1 to ML−1 is output as the multilevel edge code and the state of the code generation model transitions from the state s1 to the state s0.

Hereinafter, generation of multilevel edge codes (multilevel codes expressed with the multilevel edge codes) by the code generation model exemplifying multilevel edge code of the number ML=5 of values taken by multilevel codes will be described.

<Multilevel Edge Codes of ML=5>

Figure 9:
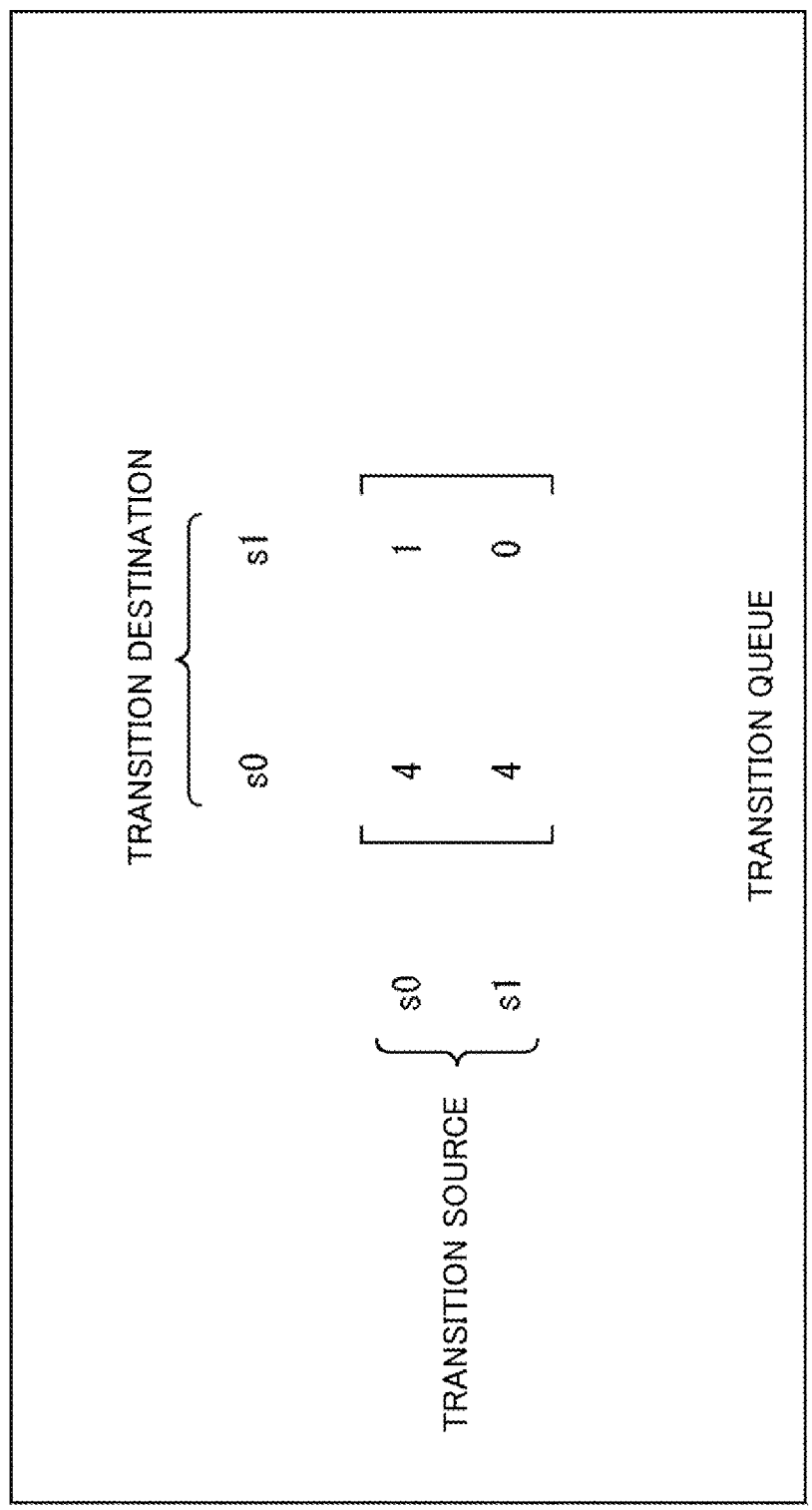
FIG. 9 is a diagram illustrating a transition matrix indicating state transition of a code generation model generating multilevel edge codes of ML=5 and a maximum consecutive number k=1.

FIG. 9 is a diagram illustrating a transition matrix indicating state transition of a code generation model generating multilevel edge codes of ML=5 and the maximum consecutive number k=1.

In the transition matrix of FIG. 9, each row indicates a state of a transition source of state transition and each column indicates a state of a transition destination of the state transition. Elements in i rows and j columns indicate the number of cases of the number of state transitions from a state s #i to a state s #j in the code generation model.

In a code generation model that generates multilevel edge codes ML=5 and the maximum consecutive number k=1 (hereinafter also referred to as a code generation model of k=1 and ML=5), as state transitions from the state 80 to the state s0, there are four state transitions in which multilevel edge codes 1, 2, 3, and 4 are output. As state transition from the state s0 to the state s1, there is one state transition in which multilevel edge code 0 is output. As state transitions from the state s1 to the state s0, there are four state transitions in which multilevel edge codes 1 to 4 are output. There is no state transition from the state s1 to the state s1.

A theoretical limitation of an encoding ratio of multilevel edge codes (multilevel codes expressed with the multilevel edge codes) generated by the code generation model (the state transition) of k=1 and ML=5 can be obtained as a Shannon capacity. The Shannon capacity can be obtained with an eigenvalue of a transition matrix indicating the state transition of the code generation model.

The transition matrix of FIG. 9 is a matrix in two rows and two columns. Therefore, two eigenvalues are obtained (at most). An eigenvalue takes a complex number in some cases. However, a maximum value of eigenvalues taking positive values in eigenvalues of a transition matrix is a theoretical limitation of an encoding ratio called the Shannon capacity.

When j is an imaginary unit in two eigenvalues EV[0] and EV[1] of the transition matrix in FIG. 9, EV[0]≈4.828427+j0 and EV[1]≈−0.82843+j0. Accordingly, the Shannon capacity of the multilevel edge codes (the multilevel codes expressed with the multilevel edge codes) generated by the code generation model of k=1 and ML=5 is (about) 4.828427 which is a maximum value in the eigenvalues of values of positive real numbers between two eigenvalues EV[0] and EV[1].

The Shannon capacity indicates the number of symbols (symbol number) in which multilevel codes generated by the code generation model (expressed with the multilevel edge codes) can be expressed per cell and is a value less than ML because of the limitation of the maximum consecutive number k. The Shannon capacity that is 4.828427 means that 4.828427 (symbols) values can be expressed per cell of the multilevel code.

In encoding into multilevel codes (multilevel encoding), for example, binary data of a certain number of bits is converted into multilevel codes (a sequence of multilevel codes) which are the rows of cells with values equal to or greater than 1. Accordingly, an encoding ratio should be expressed using bit/cell as a unit.

By calculating a binary logarithm of the Shannon capacity of 4.828427, a maximum number of bits of binary data that can be theoretically assigned to an encoding ratio of the theoretical limitation of multilevel codes (a theoretical limitation encoding ratio), that is, one cell of multilevel codes can be obtained as (about) $2.271553=\log_2 4.828427$.

Figure 10:
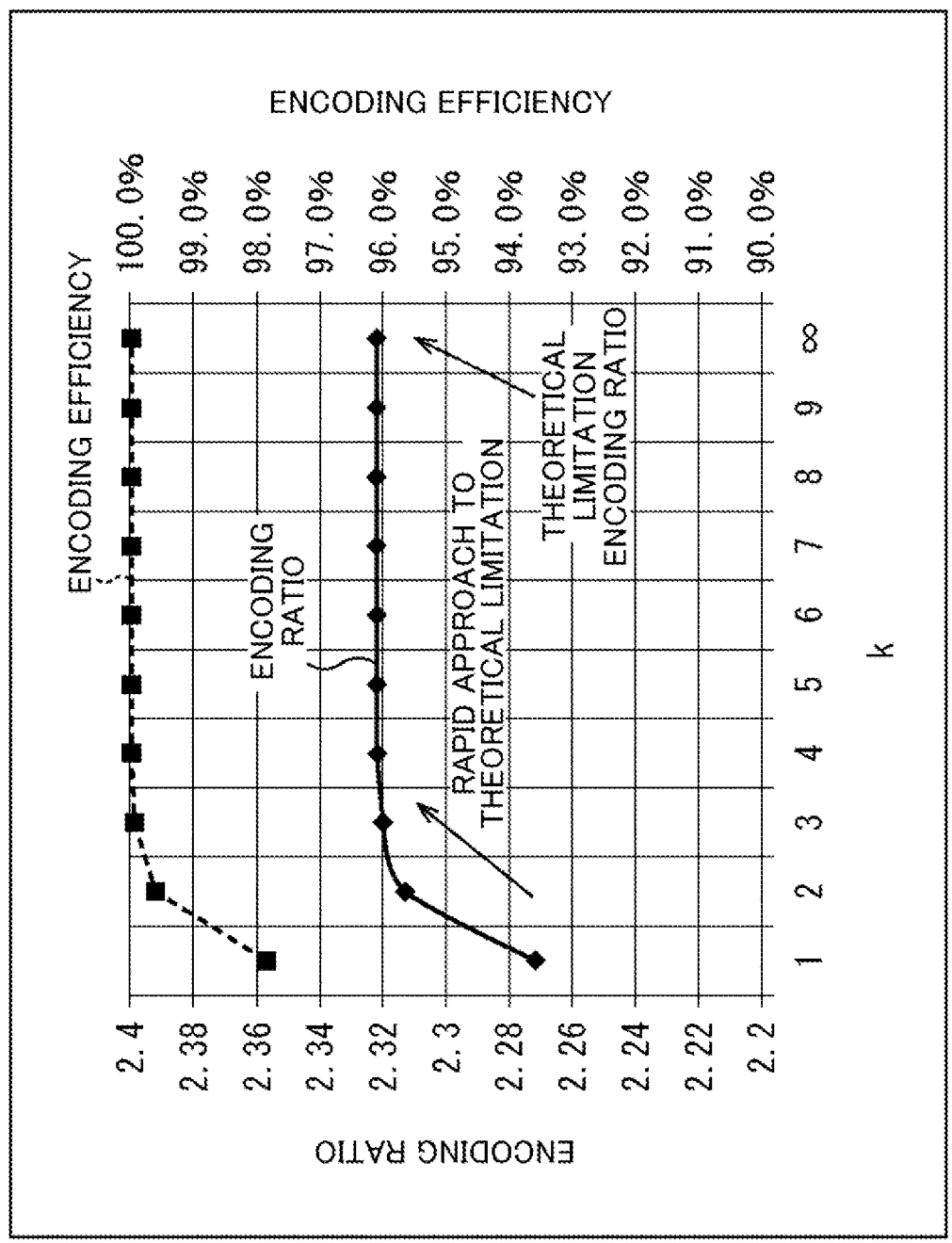
FIG. 10 is a diagram illustrating a relation between an encoding ratio and encoding efficiency, and the maximum consecutive number k in multilevel codes of ML=5.

FIG. 10 is a diagram illustrating a relation between an encoding ratio and encoding efficiency, and the maximum consecutive number k in the multilevel codes of ML=5.

Here, a theoretical limitation encoding ratio of the maximum consecutive number k=∞ in the multilevel codes of ML=5 is (about) $2.32 \approx \log_2 5$, but an encoding efficiency of FIG. 10 indicates a ratio of the encoding ratio to the theoretical limitation encoding ratio 2.32 in the case of the maximum consecutive number k=∞.

From FIG. 10, it can be confirmed that, with regard to the multilevel codes of ML=5, when the maximum consecutive number k is equal to or greater than 2, the encoding ratio rapidly approaches the theoretical limitation encoding ratio, and thus the encoding efficiency becomes 99% or more.

Here, as an encoding scheme of multilevel encoding, for example, a scheme of converting in-bit binary data into block codes with a fixed length (n cells) configured as a sequence of multilevel codes of the n cells (a sequence of multilevel edge codes expressing the block codes) is assumed to be adopted so that the encoding scheme can be mounted as a circuit. Hereinafter, block codes configured with the multilevel codes of ML=5 (expressed as a multilevel edge code) among block codes with a fixed length configured in a sequence of multilevel codes of n cells will be described.

<Block Code>

FIG. 11 is a diagram illustrating specifications of block codes configured with the multilevel codes of ML=5 in the case of the maximum consecutive number k=4.

In FIG. 11, a code length n indicates the number of cells of multilevel codes (a sequence of multilevel codes) configuring a code length of block codes with a fixed length, that is, block codes. The number of symbols Ns is the number of symbols which can be expressed with the multilevel codes of ML=5 of n cells, that is, the number of code words of the block codes configured with the multilevel codes of ML=5 of n cells, and is a value equal to or less than n-th power of 5 because of the limitation of the maximum consecutive number k=4. The number of binary data bits B is one block code, that is, the number of bits of binary data which can be encoded (assigned) into the multilevel codes of ML=5 of n cells and a maximum integer value equal to or less than $\log_2(Ns)$. An encoding ratio R indicates a value obtained by dividing the number of binary data bits B by the code length n. Encoding efficiency Ef indicates a ratio of the encoding ratio R to the theoretical limitation encoding ratio (about 2.32) of the multilevel codes of k=4 and ML=5 (generated by the code generation model).

Hereinafter, generation of, for example, highly efficient block codes which has encoding efficiency of 97% and have the code length n of four cells among block codes configured with the multilevel codes (multilevel edge codes expressing the multilevel codes) of k=4 and ML=5 illustrated in FIG. 11 will be described.

In the block codes which are configured with the multilevel codes of k=4 and ML=5 and have the code length n of four cells, binary data of B=9 bits is encoded into block codes configured with multilevel codes of four cells. The block codes are also referred to as 9-bit/4-cell codes of k=4 and ML=5.

Figure 12:
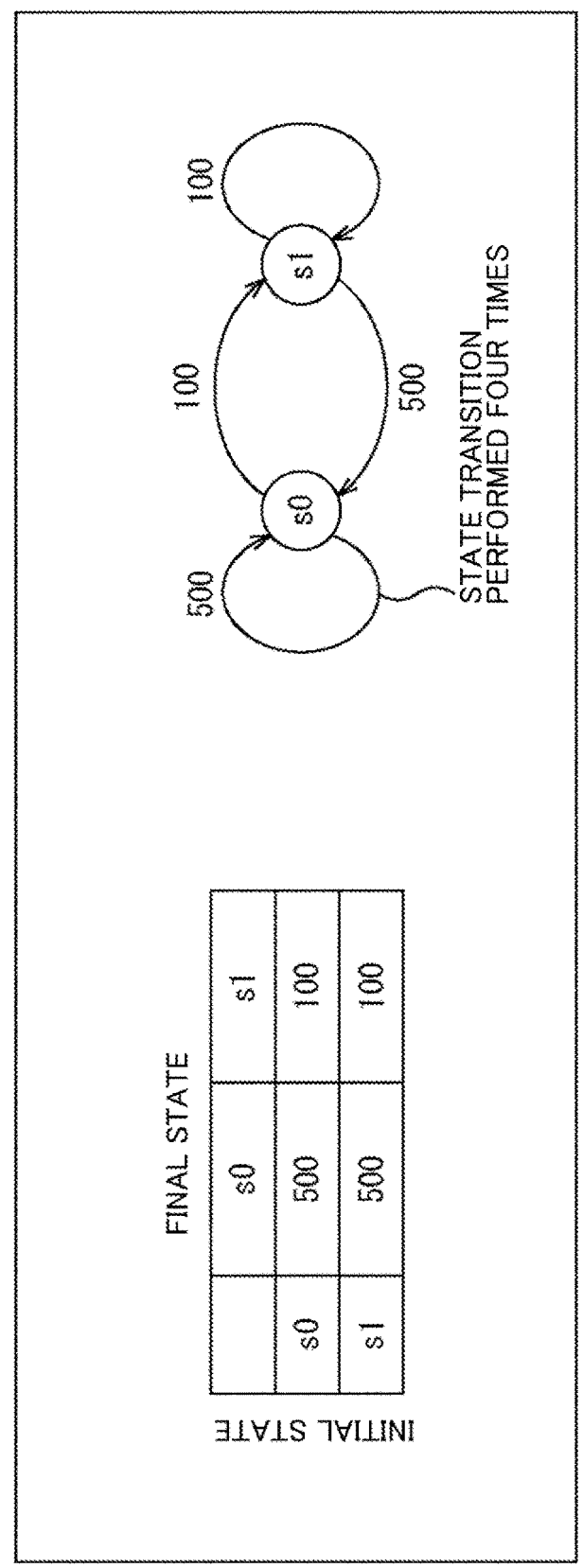
FIG. 12 is a diagram illustrating 9-bit/4-cell codes of k=4 and ML=5.

FIG. 12 is a diagram illustrating 9-bit/4-cell codes of k=4 and ML=5.

The multilevel edge codes (a sequence of the multilevel edge codes) configuring the 9-bit/4-cell codes of k=4 and ML=5 (expressing the multilevel codes) can be generated by starting a certain state as an initial state and performing state transitions four times in the code generation model of k=4 and ML=5. Here, a state arrived after the state transition performed four times is assumed to be a final state.

FIG. 12 illustrates the number of block codes: block codes configured with a sequence of multilevel edge codes generated in the state transitions performed four times by using the states s0 as the initial and final states, respectively (hereinafter also referred to as s0→s0 codes), block codes configured with a sequence of multilevel edge codes generated in the state transitions performed four times by using the states s0 and s1 as the initial and final states, respectively (hereinafter also referred to as s0→s1 codes), block codes configured with a sequence of multilevel edge codes generated in the state transitions performed four times by using the states s1 and s0 as the initial and final states, respectively (hereinafter also referred to as s1→s0 codes), and block codes configured with a sequence of multilevel edge codes generated in the state transitions performed four times by using the states s1 as the initial and final states, respectively (hereinafter also referred to as s1→s1 codes).

The number of s0→s0 codes is 500 and the number of s0→s1 codes is 100. The number of s1→s0 codes is 500 and the number of s1→s1 codes is 100.

FIG. 13 is a diagram illustrating some of 500 s0→s0 codes and 500 s1→s0 codes and state transition in generation of the s0→s0 codes and the s1→s0 codes.

A of FIG. 13 illustrates some of the 500 s0→s0 codes and the state transitions in the generation of the s0→s0 codes and B of FIG. 13 illustrates some of the 500 s1→s0 codes and the state transitions in the generation of the s1→s0 codes The inventors of the present specification have confirmed that the same codes can be obtained although the method for the state transition is not matched between the 500 s0→s0 codes and the 500 s1→s0 codes.

That is, the 500 s0→s0 codes which is a first set of the block codes configured with the sequence of the multilevel edge codes generated in the state transitions performed four times by using the state s0 and state 0 (first and second states) as the initial and final states, respectively, are common to the 500 s1→s0 codes which is a second set of the block codes configured with the sequence of the multilevel edge codes generated in the state transitions performed four times by using the states s1 and s0 (third and fourth states) as the initial and final states, respectively.

FIG. 14 is a diagram illustrating some of 100 s0→s1 codes and 100 s1→s1 codes and state transition in generation of the s0→s1 codes and the s1→s1 codes.

A of FIG. 14 illustrates some of the 100 s0→s1 codes and the state transitions in the generation of the s0→s1 codes and B of FIG. 14 illustrates some of the 100 s1→s1 codes and the state transitions in the generation of the s1→s1 codes.

The inventors of the present specification have confirmed that the same codes can be obtained although the method for the state transition is not matched between the 100 s0→s1 codes and the 100 s1→s1 codes That is, the 100 s0→s1 codes which is a first set of the block codes configured with the sequence of the multilevel edge codes generated in the state transitions performed four times by using the states s0 and s1 (first and second states) as the initial and final states, respectively, are common to the 100 s1→s1 codes which is a second set of the block codes configured with the sequence of the multilevel edge codes generated in the state transitions performed four times by using the states s1 and s1 (third and fourth states) as the initial and final states, respectively.

As described above, the 600 block codes which is a total of the 500 s0→s0 codes and the 100 s0→s1 codes generated in the state transitions performed four times by using the states s0 as the initial states are matched (common) to the 600 block codes which is a total of the 500 s1→s0 codes and the 100 s1→s1 codes generated in the state transitions performed four times by using the states s1 as the initial states.

Accordingly, when the block codes used for channel encoding are adopted from the 600 block codes generated in the state transitions performed four times by using the above-described state s0 or s1 as the initial state, it is not necessary to monitor a final state at the time of encoding of immediately previous 9-bit binary data or an initial state at the time of encoding of immediately subsequent 9-bit binary data in encoding of new 9-bit binary data. That is, the encoding of the binary data can be performed in consideration that the final state at the time of encoding of the immediately previous binary data and the first state at the time of encoding of the immediately subsequent binary data are the state s0 or s1.

In the 9-bit/4-cell codes of k=4 and ML=5, 600 block codes generated in the state transition performed four times by using the state s0 as the initial state (or 600 block codes generated in the state transition performed four times by using the state s1 as the initial state) are considered to be candidate codes which are candidates for adopted codes adopted for encoding.

Of the 600 candidate codes, 512=29 adopted codes adopted for encoding of the 9-bit binary data (allocated to the 9-bit binary data) are selected.

<Repeated Minimum Transition Run (RMTR)>

Figure 15:
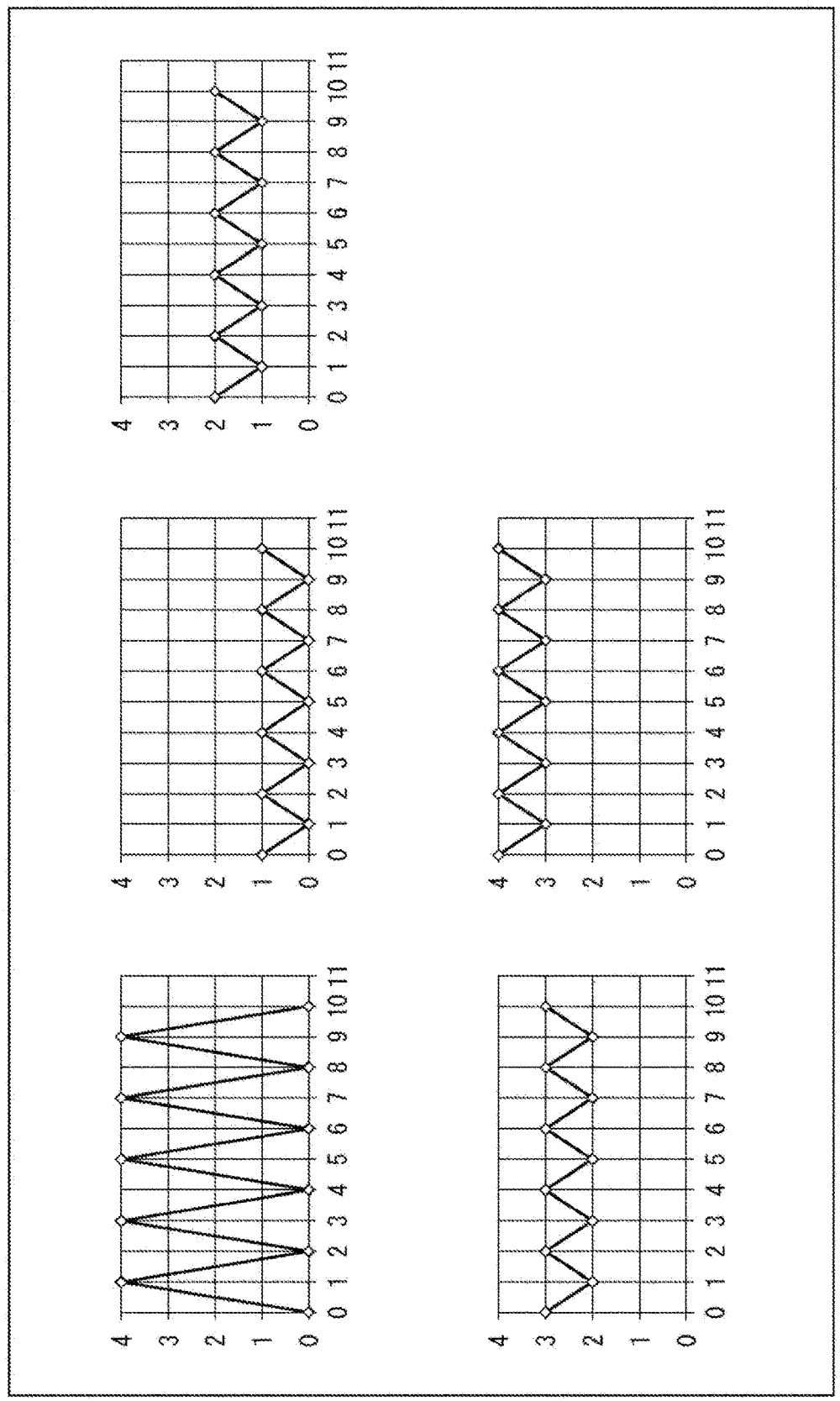
FIG. 15 is a diagram illustrating a minimum transition pattern occurring in a sequence of multilevel codes of ML=5.
Figure 16:
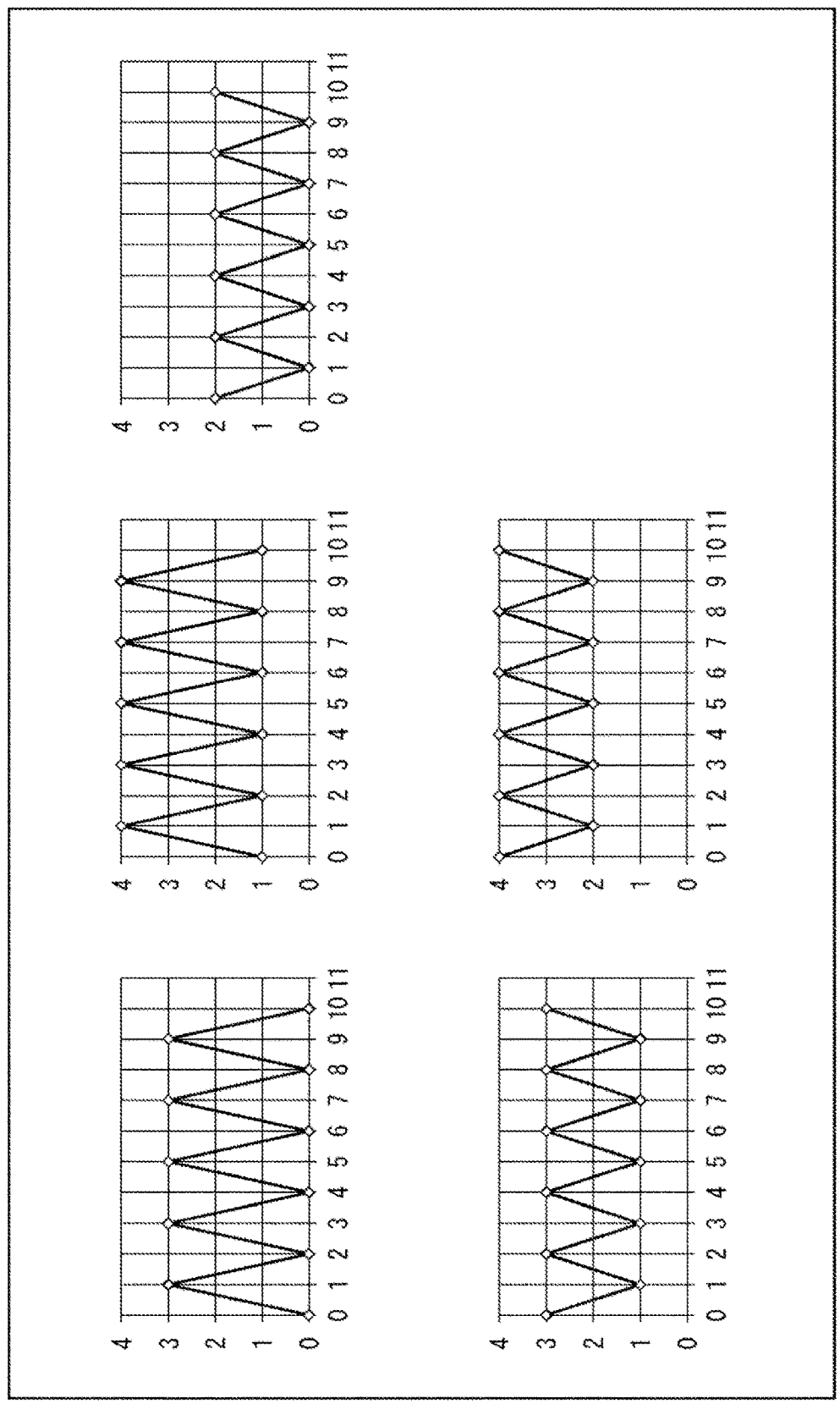
FIG. 16 is a diagram illustrating a minimum transition pattern occurring in a sequence of multilevel codes of ML=5.

FIGS. 15 and 16 are diagrams illustrating minimum transition patterns occurring in a sequence of multilevel codes of ML=5.

FIG. 15 illustrates a minimum transition pattern occurring in multilevel codes when 41 is repeated in the multilevel edge codes (block codes configured with the multilevel edge codes) of ML=5. FIG. 16 illustrates a minimum transition pattern occurring in multilevel codes when 23 is repeated in the multilevel edge codes of ML=5.

The minimum transition pattern is a pattern in which a change in the same value (level) is repeated at a minimum period.

In optical recording, limitation of repeated minimum transition (RMTR) is performed since a high-frequency reproduction gain is low. For example, in 17PP codes and 110 parity-complementary word assignment (PCWA) codes which are binary channel codes (binary codes), the RMTR is limited to 6 and 2, respectively. The 17PP codes are codes obtained by modulating (encoding) the RLL (1, 7) PP modulation scheme. The 110 PCWA codes are disclosed in JP 4998472 B2.

By limiting the RMTR, it is possible to inhibit frequent occurrence of the minimum transition pattern and further inhibit a high-frequency component of a reproduced signal.

A method of performing limitation of the RMTR on the multilevel codes of an ML value will be described.

In the multilevel codes (the sequence of the multilevel codes) of an ML value, a minimum transition pattern occurs when the multilevel edge codes $c(t)$ satisfy an expression $(c(t)+c(t+1))\% ML=0$.

Here, the expression $(c(t)+c(t+1))\% ML=0$ is also referred to as a modular edge condition.

For example, when the multilevel edge code $c(t)$ is 4 and the multilevel edge code $c(t+1)$ is 1, the modular edge condition is satisfied. The number of times the modular edge condition is repeatedly satisfied, that is, a consecution length in which the minimum transition pattern continues is assumed to be a consecution length of modular edges. For example, of the multilevel edge codes of four cells (expressing the multilevel codes) configuring 9-bit/4-cell codes, first and second multilevel edge codes and second and third multilevel edge codes satisfy the modular edge conditions. However, when third and fourth multilevel edge codes do not satisfy the modular edge condition, the consecution length of the modular edges is 2.

As described in FIG. 6, multilevel codes $l(t)$ obtained in accordance with an expression $(l(t)=(l(t-1)+c(t))\% ML$ is recorded on the optical disc 100.

Accordingly, when 41 satisfying the modular edge condition continues as the multilevel edge codes in the multilevel codes of ML=5, the minimum transition pattern continues in the multilevel codes.

That is, for example, when the (immediately previous) multilevel code $l(t-1)$ is 0 and 41 satisfying the modular edge condition continue as the multilevel edge codes, the multilevel code $l(t)$ at a time t is $(l(t-1)+c(t))\% ML=(0+4)\%5=4$. The multilevel code $l(t+1)$ at a time t+1 is $(l(t)+c(t+1))\% ML=(4+1)\%5=0$. Further, the multilevel code $l(t+2)$ at a time t+2 is $(l(t+1)+c(t+2))\% ML=(0+4)\%5=4$. In this way, the multilevel codes become a minimum transition pattern in which 0 and 4 are repeated.

As described above, when 41 satisfying the modular edge condition continues as the multilevel edge codes and the immediately previous multilevel code is 0, the multilevel codes become the minimum transition pattern in which 0 and 4 are repeated, as illustrated in FIG. 15.

When the immediately previous multilevel code is 1, the multilevel codes become a minimum transition pattern in which 1 and 0 are repeated, as illustrated in FIG. 15. When the immediately previous multilevel code is 2, the multilevel codes become a minimum transition pattern in which 2 and 1 are repeated, as illustrated in FIG. 15. When the immediately previous multilevel code is 3, the multilevel codes become a minimum transition pattern in which 3 and 2 are repeated, as illustrated in FIG. 15. When the immediately previous multilevel code is 4, the multilevel codes become a minimum transition pattern in which 4 and 3 are repeated, as illustrated in FIG. 15.

As described above, when 32 satisfying the modular edge condition continues as the multilevel edge codes and the immediately previous multilevel code is 0, the multilevel codes become the minimum transition pattern in which 0 and 3 are repeated, as illustrated in FIG. 16.

When the immediately previous multilevel code is 1, the multilevel codes become a minimum transition pattern in which 1 and 4 are repeated, as illustrated in FIG. 16. When the immediately previous multilevel code is 2, the multilevel codes become a minimum transition pattern in which 2 and 0 are repeated, as illustrated in FIG. 16. When the immediately previous multilevel code is 3, the multilevel codes become a minimum transition pattern in which 3 and 1 are repeated, as illustrated in FIG. 16. When the immediately previous multilevel code is 4, the multilevel codes become a minimum transition pattern in which 4 and 2 are repeated, as illustrated in FIG. 16.

When 14 or 23 satisfying the modular edge condition continues as the multilevel edge codes continue, minimum transition patterns also occur in the multilevel codes.

Limitation of occurrence of the minimum transition patterns in the multilevel codes can be performed by limiting a consecution length of the modular edges in which the modular edge condition is consecutively satisfied.

Figure 17:
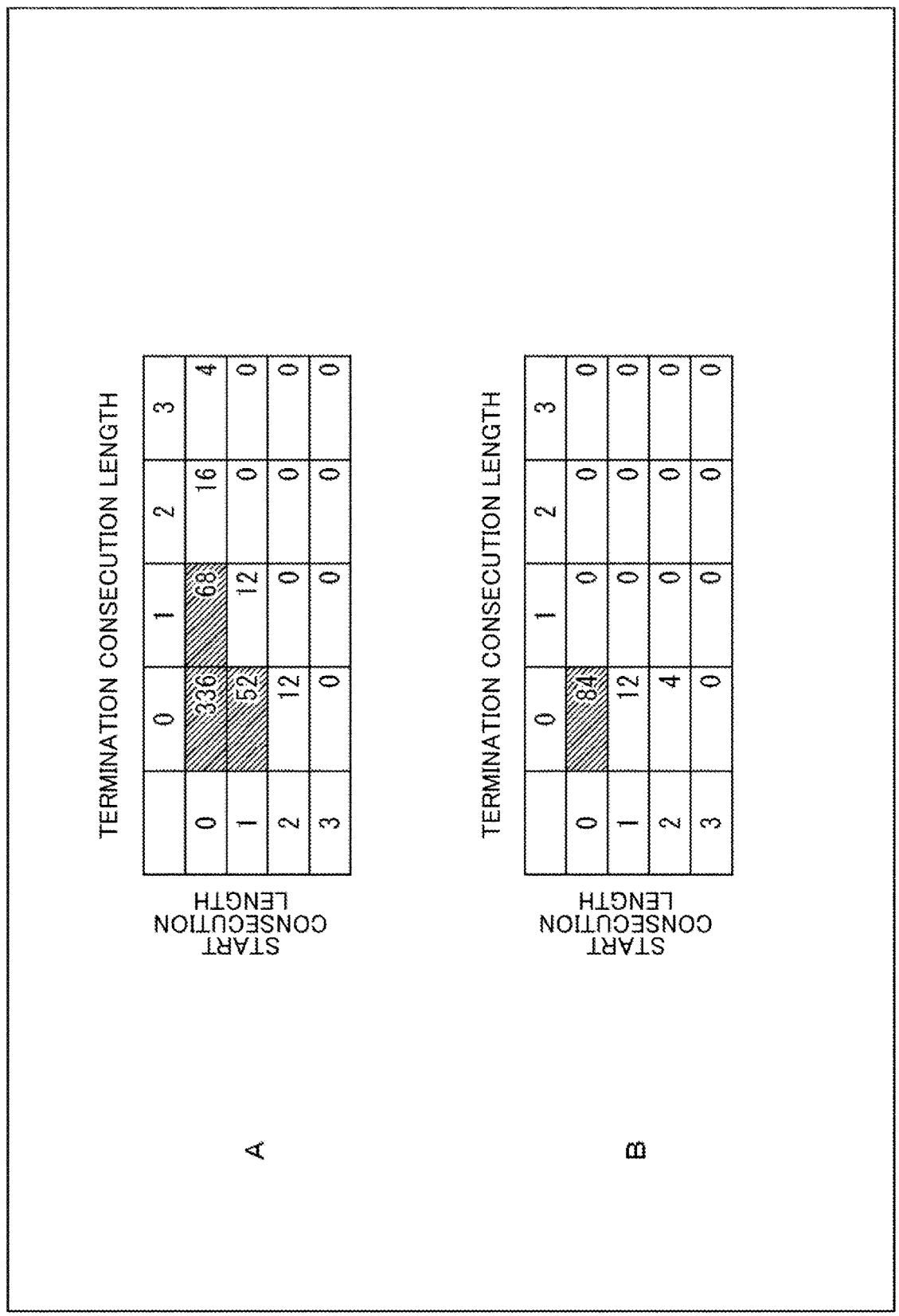
FIG. 17 is a diagram illustrating a start consecution length and a termination consecution length of 500 s0→s0 codes and 100 s0→s1 codes which are 600 candidate codes of 9-bit/4-cell codes of k=4 and ML=5.

FIG. 17 is a diagram illustrating a start consecution length and a termination consecution length of 500 s0→s0 codes (also s1→s0 codes) and 100 s0→s1 codes (also 100 s1→s1 codes) which are 600 candidate codes of 9-bit/4-cell codes of k=4 and ML=5.

The start consecution length means a consecution length of modular edges of a head portion of block codes, that is, the number of times the modular edge condition is satisfied consecutively from a head cell to a termination cell. The termination consecution length means a consecution length of modular edges of a termination portion of block codes, that is, the number of times the modular edge condition is satisfied consecutively from a termination cell to a head cell.

In FIG. 17, each row indicates a start consecution length and each column indicates a termination consecution length A value of a field in which a start consecution length is i and a termination consecution length is j indicates the number of candidate codes in which a start consecution length is i and a termination consecution length is j.

A of FIG. 17 illustrates start consecution lengths and termination consecution lengths in 500 s0→s0 codes among 600 candidate codes of the 9-bit/4-cell codes of k=4 and ML=5. B of FIG. 17 illustrates start consecution lengths and termination consecution lengths in 100 s0→s1 codes among 600 candidate codes of the 9-bit/4-cell codes of k=4 and ML=5.

In FIG. 17, in the 500 s0→s0 codes, there are 336 block codes in which the start consecution length i is limited to 0 and the termination consecution length j is limited to 0 (hereinafter referred to as (i, j) codes), 68 (0, 1) codes, 16 (0, 2) codes, 4 (0, 3) codes, 52 (1, 0) codes, 12 (1, 1) codes, and 12 (2, 0) codes. In the 100 s0→s1 codes, there are 84 (0, 0) codes, 12 (1, 0) codes, and 4 (2, 0) codes.

In the 600 candidate codes of the 9-bit/4-cell codes of k=4 and ML=5, there are no candidate codes in which middle portions excluding the head and termination portions, that is, second and third cells, satisfy the modular edge condition. Accordingly, the 600 candidate codes of the 9-bit/4-cell codes of k=4 and ML=5 can be said to be block codes in which the consecution length of the modular edges of the middle portions (hereinafter also referred to as a middle consecution length) is limited to 0.

In multilevel codes (multilevel edge codes) of an ML value, the RMTR is represented as a consecutive length of a minimum transition pattern.

A minimum transition pattern may be expressed not only in a case in which the minimum transition pattern occurs in one block code but also in a case in which the modular edge condition is satisfied between a termination multilevel edge code of a certain block code and a head multilevel edge code of a subsequent block code.

For example, as illustrated in FIG. 17, among the 600 candidate codes of the 9-bit/4-cell codes of k=4 and ML=5, there are 336 s0→s0 codes in which both the start consecution length and the termination consecution length are 0. For example, 1334 and 1111 are candidate codes (s0→s0 codes) in which both the start consecution length and the termination consecution length are 0. When the candidate code 1111 continues after the candidate code 1334 between the candidate codes 1334 and 1111 in which both the start consecution length and the termination consecution length are 0, the line 41 of the termination multilevel edge code 4 (=c(t)) of the candidate code 1334 and the head multilevel edge code 1 (=c(t+1)) of the candidate code 1111 satisfy the modular edge condition. Accordingly, even when only the candidate codes in which both the start consecution length and the termination consecution length are 0 are adopted for adopted codes, the RMTR is 1.

As described above, the RMTR cannot be limited to a value less than the start consecution length+the termination consecution length+1 which is a value obtained by adding 1 to an added value of the start consecution length and the termination consecution length. Here, the start consecution length+the termination consecution length+1 is also referred to as a minimum length of the modular edges.

To limit the RMTR to a smaller value, as a first condition, it is necessary to select candidate codes in which the start consecution length and the termination consecution length are smaller as adopted codes. As a second condition, it is necessary to exclude candidate codes in which a middle consecution length is greater than a minimum length of the modular edges from the adopted codes (candidate codes).

In the 600 candidate codes of the 9-bit/4-cell codes of k=4 and ML=S, as described above, the second condition is satisfied since the middle consecution length is 0.

Accordingly, for the 600 candidate codes of the 9-bit/4-cell codes of k=4 and ML=5, the RMTR can be limited to a smaller value by selecting the adopted codes according to the first condition.

Accordingly, according the present technology, 512 (=29) candidate codes necessary for 9-bit encoding are selected as the adopted codes from the 600 candidate codes of the 9-bit/4-cell codes of k=4 and ML=5 in FIG. 17 as follows.

First, of the 600 candidate codes in FIG. 17, only a close number of codes is selected as adopted codes so that the (0, 0) codes in which both the start consecution length i and the termination consecution length j are limited to 0 becomes 512 which is the number of adopted codes necessary for 9-bit encoding (hereinafter also referred to as the number of necessary codes).

That is, in the 500 s0→s0 codes in A of FIG. 17, the 336 (0, 0) codes in which the start consecution length i is limited to 0 and the termination consecution length j is limited to 0 are selected adopted codes.

In the 100 s0→s1 codes in B of FIG. 17, the 84 (0, 0) codes in which the start consecution length i is limited to 0 and the termination consecution length j is limited to 0 are selected adopted codes.

Next, of the 600 candidate codes in FIG. 17, the (1, 0) codes and the (0, 1) codes in which one of the start consecution length i and the termination consecution length j is limited to 1 and the other is limited to 0 are selected as adopted codes by only 92 which is a deficient number for 512 which is the number of necessary codes.

That is, for example, in the 500 s0→s0 codes in A of FIG. 17, 46 codes among 68 (0, 1) codes in which the start consecution length i is limited to 0 and the termination consecution length j is limited to 1 and 46 codes among 52 (1, 0) codes in which the start consecution length i is limited to 1 and the termination consecution length j is limited to 2 are selected as adopted codes.

In the encoding of the multilevel codes, as described above, a code set of the block codes selected as the 512 adopted codes of the 9-bit/4-cell codes of k=4 and ML=5 can be used. In this case, the RMTR of the block codes configuring the code set is 3=1+1+1 which is a minimum length of the modular edges.

Here, the block codes configuring the code set can be said to be the block codes in which the start consecution length, the termination consecution length, and the middle consecution length are limited.

Further, the block codes configuring the code set can be said to be the block codes in which the middle consecution length is limited to a minimum length or less of the modular edges.

By excluding the candidate codes of which the second condition, that is, the middle consecution length, is greater than the minimum length of the modular edges from the adopted codes, adopted codes are selected from the candidate codes of which the middle consecution length is greater than the minimum length of the modular edges when the number of candidate codes which can be selected as the adopted codes is less than the number of necessary codes. In this case, the RMTR is greater than the minimum length of the modular edges and is a maximum value of the middle consecution length of the adopted codes.

FIGS. 18, 19, 20, 21, 22, and 23 are diagrams illustrating an example of a code lookup table (LUT) in which 512 block codes which are 9-bit/4-cell codes of k=4 and ML=5 are associated with binary data which are user data obtained by encoding the block codes.

In the code LUT, the block codes (the multilevel edge codes of four cells configuring the block codes) selected as the adopted codes, as described in FIG. 17, are registered in association with binary data which is user data. In the code LUTs of FIGS. 18 to 23, for example, binary data 0 in FIG. 18 (here, zero expressed with 9 bits) is encoded into a block code (multilevel edge codes of four cells configuring the block code) 1111.

<Recording and Reproducing of Multilevel Codes on Optical Disc 100>

Figure 24:
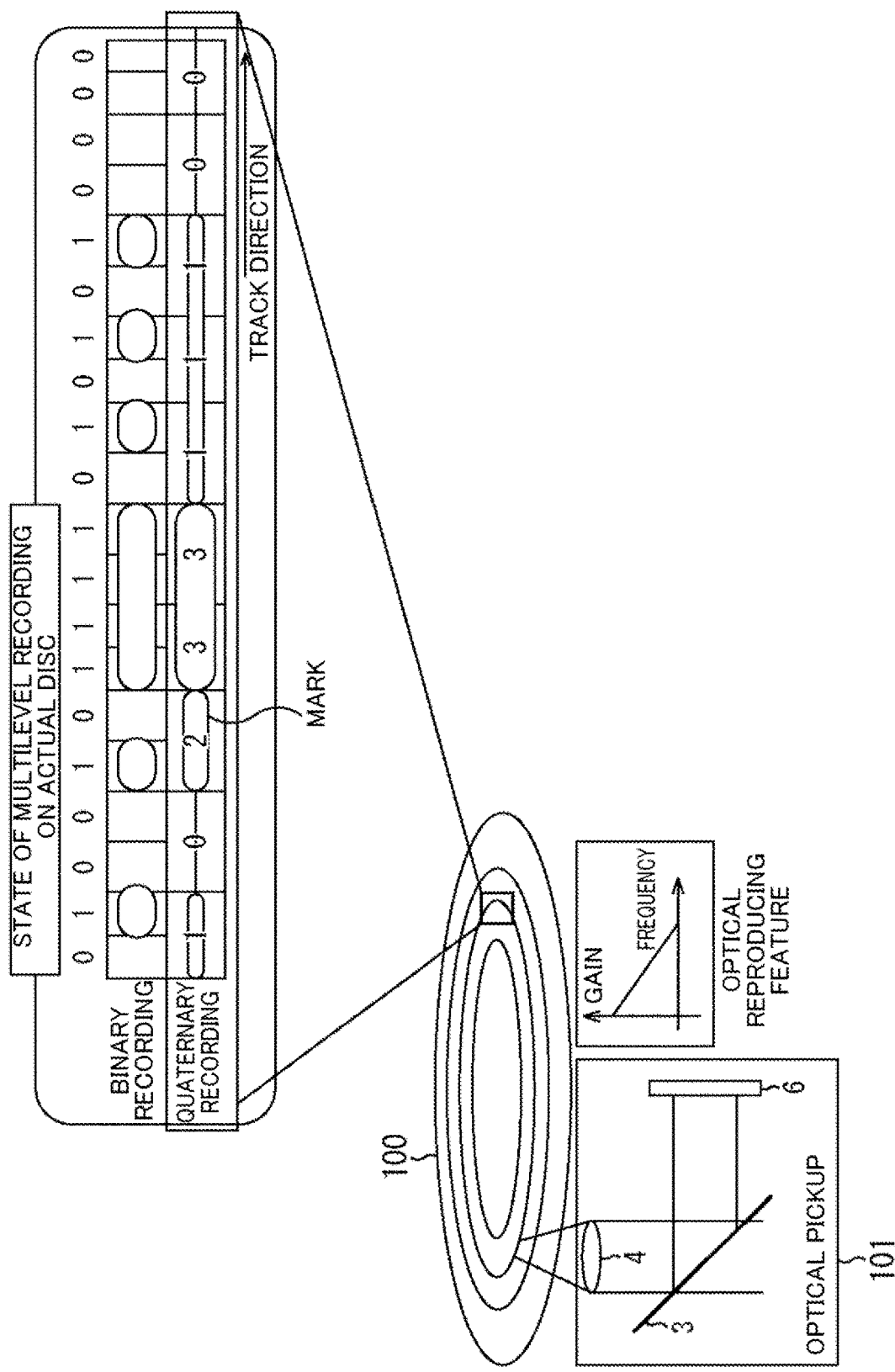
FIG. 24 is a diagram illustrating recording/reproducing of multilevel codes on the optical disc 100.

FIG. 24 is a diagram illustrating recording/reproducing of multilevel codes on the optical disc 100.

In binary recording, marks indicating 0 or 1 of binary codes are formed along tracks of the optical disc 100.

In multilevel recording, marks with sizes (in FIG. 24, sizes in the radial direction) in accordance with values (levels) of multilevel codes are formed along tracks of the optical disc 100.

In the optical disc 100 on which the multilevel recording is performed, a difference in the size of the mark is expressed as stepped density (strongness or weakness of optical intensity) of reflected light at the time of reproducing.

For example, when quaternary codes are recorded on the optical disc 100, an electric signal in which the density of the reflected light corresponding to four values of 0 to 3 taken by quaternary codes is convoluted as an optical reproducing feature of the recording/reproducing device is output from the photodetector 6.

<Data Detection Processing Unit 105>

Figure 25:
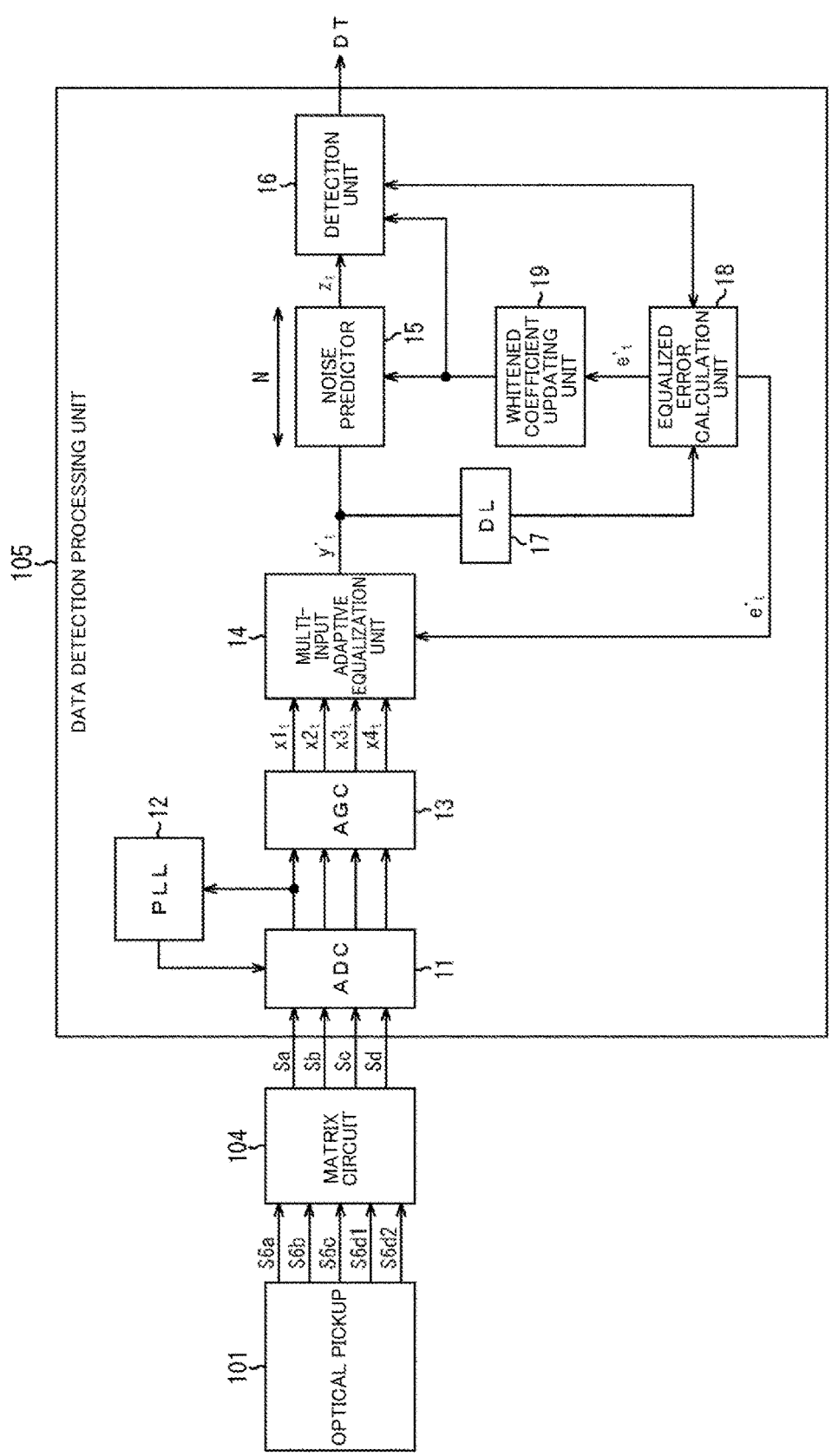
FIG. 25 is a block diagram illustrating an exemplary configuration of a data detection processing unit 105.

FIG. 25 is a block diagram illustrating an exemplary configuration of the data detection processing unit 105.

In the optical pickup 101, output currents output from regions 6a, 6b, 6c, 6d1, and 6d2 of the photodetector 6 are referred to as detected signals S6a, S6b, S6c, S6d1, and S6d2, respectively.

The detected signals S6a, S6b, S6c, S6d1, and S6d2 are supplied from the optical pickup 101 to the matrix circuit 104. The matrix circuit 104 generates reproduced signals from the detected signals S6a to S6d2 supplied from the optical pickup 101 and supplies the reproduced signals to the data detection processing unit 105.

For example, the matrix circuit 104 generates reproduced signals Sa, Sb, Sc, and Sd of four signal channels and supplies the reproduced signals Sa, Sb, Sc, and Sd to the data detection processing unit 105.

The reproduced signal Sa is a signal corresponding to the detected signal S6a and the reproduced signal Sb is a signal corresponding to the detected signal S6b. The reproduced signal Sc is a signal corresponding to the detected signal S6c and the reproduced signal Sd is a signal corresponding to an added value of the detected signals S6d1 and S6d2.

The data detection processing unit 105 includes an analog-to-digital converter (ADC) 11 to which the reproduced signals Sa to Sd supplied from the matrix circuit 104 are supplied. A clock for the ADC 11 is formed by the PLL 12. The reproduced signals Sa to Sd supplied from the matrix circuit 104 are converted into digital data by the ADC 11.

Gains of the reproduced signals Sa, Sb, Sc, and Sd converted into the digital data are adjusted by an automatic gain control (AGC) 13.

Further, the data detection processing unit 105 includes a multi-input adaptive equalization unit 14, a noise predictor 15, a detection unit 16, a delay unit 17, an equalized error calculation unit 18, and a whitened coefficient updating unit 19.

The reproduced signals Sa, Sb, Sc, and Sd subjected to the gain adjustment are supplied from the AGC 13 to the multi-input adaptive equalization unit 14. The reproduced signals Sa, Sb, Sc, and Sd of the four signal channels at a time t after the gain adjustment which are supplied from the AGC 13 to the multi-input adaptive equalization unit 14 are expressed as reproduced signals $x_{1t}$, $x_{2t}$, $x_{3t}$, and $x_{4t}$, respectively.

The multi-input adaptive equalization unit 14 performs adaptive PR equalization (adaptive equalization) on the reproduced signals $x_{1t}$, $x_{2t}$, $x_{3t}$, and $x_{4t}$. Through the PR equalization of the reproduced signals $x_{1t}$ to $x_{4t}$, the reproduced signals $x_{1t}$ to $x_{4t}$ (which ae targets) are equalized to approximate an ideal PR waveform. The multi-input adaptive equalization unit 14 generates an equalized signal $y'_t$ by adding results of the adaptive PR equalization of the reproduced signals $x_{1t}$, $x_{2t}$, $x_{3t}$, and $x_{4t}$, and outputs the equalized signal $y'_t$. In the multi-input adaptive equalization unit 14, a filter coefficient used for the PR equalization is updated so that an equalized error $e'_t$ between the equalized signal $y'_t$ and a reference level is small. The ideal PR waveform is an ideal (genuine) waveform obtained when a sequence of the multilevel codes recorded on the optical disc 100 takes the ISI of the PR. A sample value configuring this waveform is called a reference level.

An output (the equalized signal y't) of the multi-input adaptive equalization unit 14 may be used as a signal input to the PLL 12. In this case, an initial value (an initial coefficient) of the filter coefficient of the multi-input adaptive equalization unit 14 is set as a pre-decided value.

The equalized signal $y'_t$ is supplied to the noise predictor 15 and the delay unit 17. The noise predictor 15 performs filter processing for whitening crosstalk noise (noise containing crosstalk) from the adjacent tracks TK−1 and TK+1 included in the equalized signal $y'_t$ and outputs a whitened signal $z_t$ which is the whitened equalized signal $y'_t$.

The whitened signal $z_t$ which is an output of the noise predictor 15 is supplied to the detection unit 16. The detection unit 16 obtains a multilevel code DT by performing multilevel processing for detecting values which can be taken by multilevel codes from the whitened signal $z_t$ from the noise predictor 15. The multilevel code DT is supplied to the encoding/decoding unit 107 in FIG. 1 to be demodulated (decoded).

The delay unit 17 delays the equalized signal $y'_t$ from the multi-input adaptive equalization unit 14 and supplies the delayed equalized signal $y'_t$ to the equalized error calculation unit 18. In the delay unit 17, the equalized signal $y'_t$ is delayed until a sequence of the multilevel codes (a multilevel code sequence) in which a reference level of the equalized signal $y'_t$ can be obtained is obtained by the detection unit 16.

The equalized error calculation unit 18 obtains an equalized error (an equalized error between the equalized error $y'_t$ and the reference level) $e'_t$ for the reference level of the output (equalized signal) $y'_t$ of the multi-input adaptive equalization unit 14 supplied via the delay unit 17. The equalized error calculation unit 18 supplies the equalized error $e'_t$ as a control signal for adaptive equalization to the multi-input adaptive equalization unit 14. The equalized error calculation unit 18 supplies the equalized error $e'_t$ to the whitened coefficient updating unit 19.

The whitened coefficient updating unit 19 adaptively updates a filter coefficient of the noise predictor 15 which is a whitening filter in accordance with a whitened error $w'_t$ to be described below obtained from the equalized error $e'_t$ from the equalized error calculation unit 18 and supplies the updated filter coefficient to the noise predictor 15.

Hereinafter, before the multi-input adaptive equalization unit 14, the noise predictor 15, the detection unit 16, the equalized error calculation unit 18, and the whitened coefficient updating unit 19 are described in detail, the PRML used to decode (detect) the multilevel codes in the data detection processing unit 105 will be described.

Figure 26:
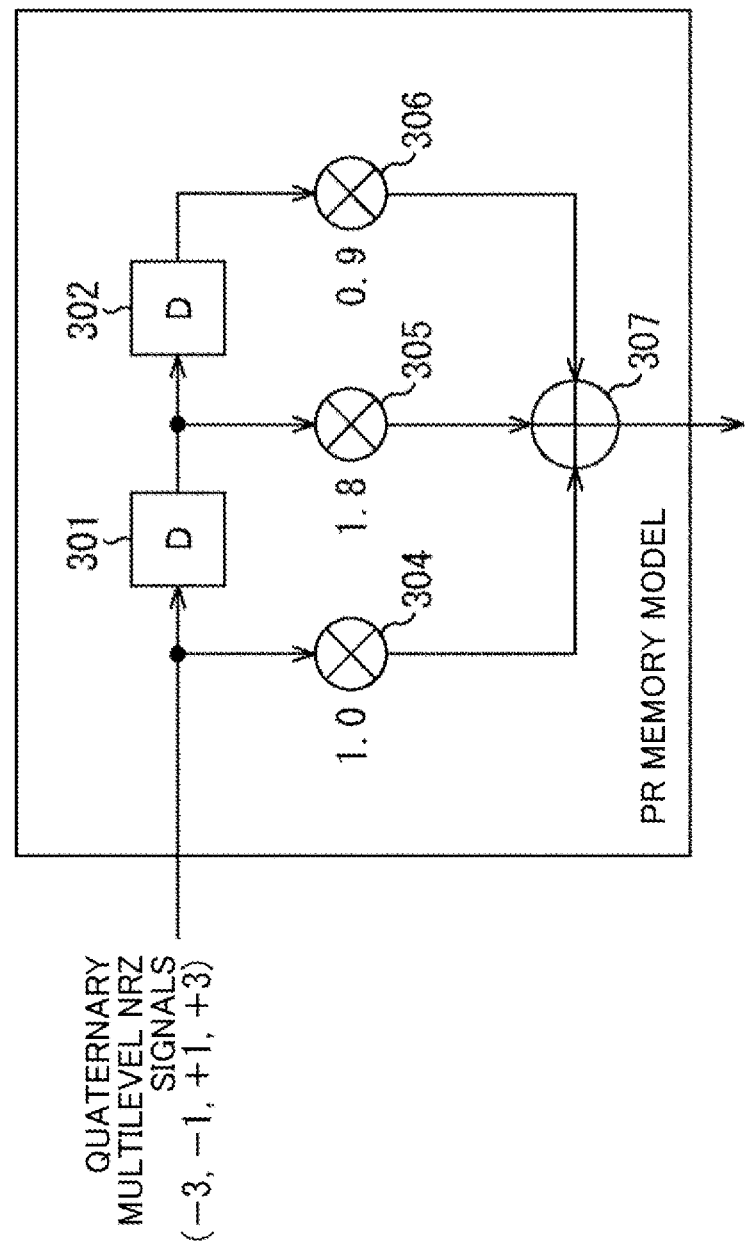
FIG. 26 is a diagram illustrating an exemplary configuration of PR memory model.

FIG. 26 is a diagram illustrating an exemplary configuration of PR memory model.

In the PRML, signals obtained from a recording/reproducing system are decoded in consideration of a PR memory model expressing the recording/reproducing system (a transmission path of the recording/reproducing system).

The PR memory model is a model that expresses reproduction of a waveform sequence subjected to interference of a PR feature from past input data input to the recording/reproducing system. The number +1 of pieces of past input data interfering the input data at a present time t is called an ISI length (a constraint length).

Viterbi decoding as maximum likelihood decoding performed in consideration of a state of the PR memory model and the state transition is PRML.

For example, by adopting quaternary codes taking four values of 0, 1, 2, and 3 as multilevel codes, 0, 1, 2, and 3 which are quaternary codes are assumed to take signal values of −3, −1, +1, and +3 in an NRZ expression. The NRZ expression of the signals which are the multilevel codes is assumed to be NRZ multilevel values.

In FIG. 26, one of −3, −1, +1, and +3 which are NRZ multilevel values is supplied to the PR memory model.

In the PR memory model of FIG. 26, a waveform sequence in which an ISI length is 3(T) and the PR feature is subjected to inter-code interference of the PR (1.0, 1.8, 0.9) is reproduced.

That is, in FIG. 26, the PR memory model includes delay unit 301 and 302, multipliers 304, 305, and 306 and an adder 307.

The NRZ multilevel values which are input data supplied (input) to the PR memory model are supplied to the delay unit 301 and the multiplier 304.

The delay unit 301 delays the NRZ multilevel values supplied to the PR memory model by one clock and supplies the delayed NRZ multilevel values to the delay unit 302 and the multiplier 305.

The delay unit 302 delays the NRZ multilevel values from the delay unit 301 by one clock and supplies the delayed NRZ multilevel values to the multiplier 306.

The multiplier 304 multiplies the NRZ multilevel values supplied to the PR memory model, that is, the NRZ multilevel values at a present time by 1.0 and supplies a multiplied value obtained as the result to the adder 307.

The multiplier 305 multiplies the NRZ multilevel values from the delay unit 301, that is, the NRZ multilevel values before one clock of the present time by 1.8 and supplies a multiplied value obtained as the result to the adder 307.

The multiplier 306 multiplies the NRZ multilevel values from the delay unit 302, that is, the NRZ multilevel values before two clocks of the present time by 0.9 and supplies a multiplied value obtained as the result to the adder 307.

The adder 307 adds the multiplied values from the multipliers 304 to 306 and outputs an added value obtained as the result as one value of the interference sequence subjected to the PR interference.

Figure 27:
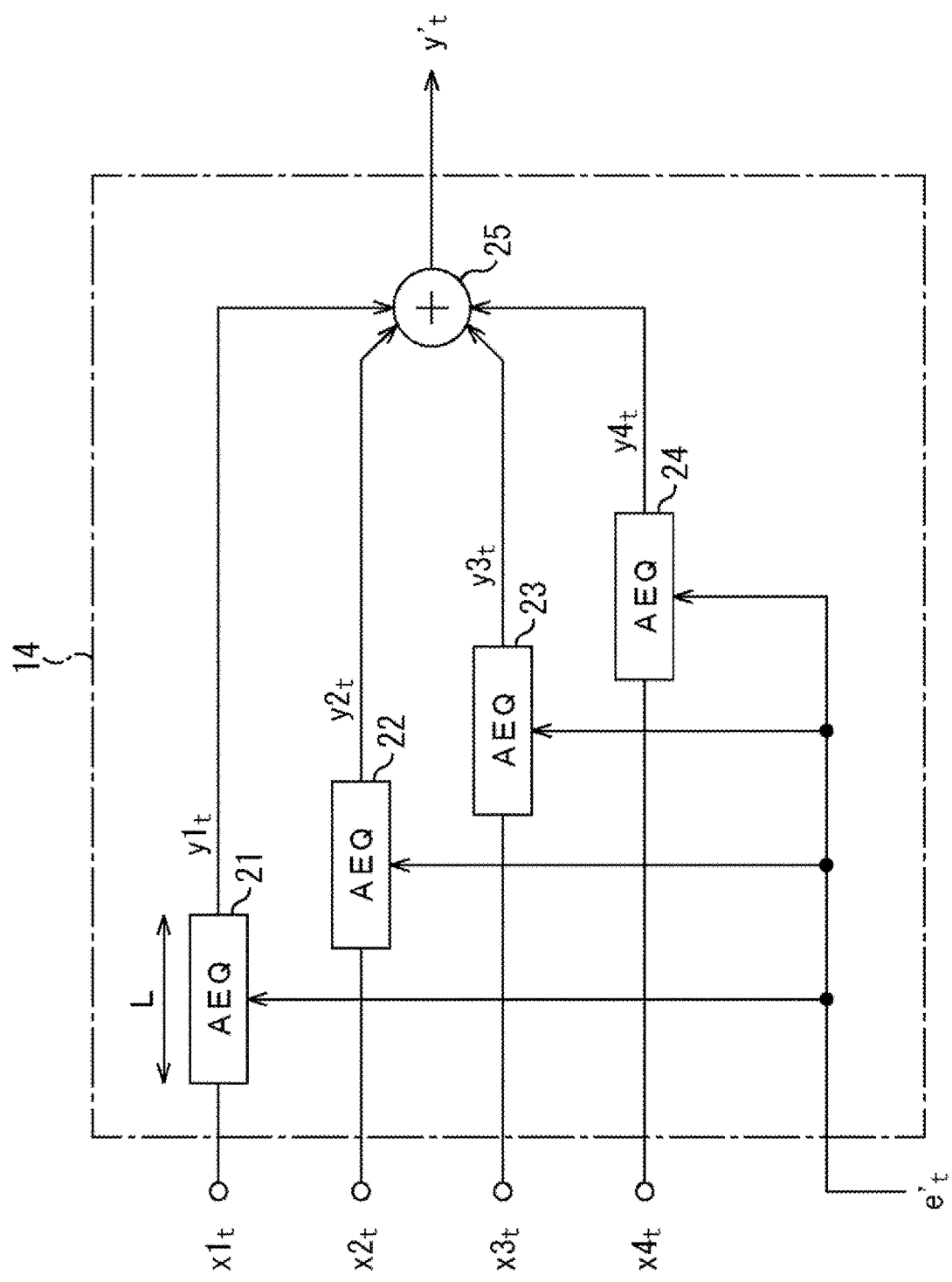
FIG. 27 is a diagram illustrating an exemplary configuration of a multi-input adaptive equalization unit 14.

FIG. 27 is a diagram illustrating an exemplary configuration of the multi-input adaptive equalization unit 14.

In FIG. 27, the multi-input adaptive equalization unit 14 includes adaptive equalizers 21, 22, 23, and 24 and an adder 25.

The reproduced signals $x_{1t}$, $x_{2t}$, $x_{3t}$, and $x_{4t}$ of four signal channels at the time t from the AGC 13 are supplied to the adaptive equalizers 21, 22, 23, and 24. In FIG. 27, to supply the reproduced signals $x_{1t}$ to $x_{4t}$ of four signal channels from the AGC 13 to the multi-input adaptive equalization unit 14, the multi-input adaptive equalization unit 14 includes adaptive equalizers 21 to 24 corresponding to the four signal channels. The multi-input adaptive equalization unit 14 includes the same number of adaptive equalizers as the number of signal channels of the reproduced signals supplied from the AGC 13 to the multi-input adaptive equalization unit 14.

The adaptive equalizers 21 to 24 are configured with finite impulse response (FIR) filters and have the number of taps of the FIR filters, calculation accuracy (bit resolution), and parameters of an updating coefficient μ (an updating gain of adaptive calculation) at the time of updating of the filter coefficient. Each of the adaptive equalizers 21, 22, 23, and 24 is assumed to have a tap length L. In accordance with design specification of the adaptive equalizers, the tap lengths of the adaptive equalizers 21 to 24 can be changed into $L_1$, $L_2$, $L_3$, and $L_4$, respectively. In each parameter of the FIR filter, an appropriate value is set through simulation or the like.

The adaptive equalizers 21 to 24 are supplied with the equalized error $e'_t$ as a control signal for adaptive equalization (a coefficient control value for adaptive control) from the equalized error calculation unit 18.

The adaptive equalizer 20+c (where c=1, 2, 3, and 4) performs filter processing of the FIR filter (filtering) on a target reproduced signal $x_{ct}$ of a c signal channel among the reproduced signals $x_{1t}$ to $x_{4t}$ of four signal channels from the AGC 13. The adaptive equalizer 20+c outputs a filtering signal $y_{ct}$ at the time t obtained as the result of the filter processing to the adder 25.

The adder 25 adds filtering signals $y_{1t}$, $y_{2t}$, $y_{3t}$, and $y_{4t}$ at the time t from the adaptive equalizers 21, 22, 23, and 24 and outputs an added value obtained as the result as the equalized signal $y'_t$ at the time t. A waveform targeted by the equalized signal $y'_t$ is a waveform (an ideal PR waveform) obtained through convolution calculation of the multilevel codes (sequence) decoded (detected) by the detection unit 16 and the PR feature expressing the recording/reproducing device (the transmission path of the recording/reproducing device).

Figure 28:
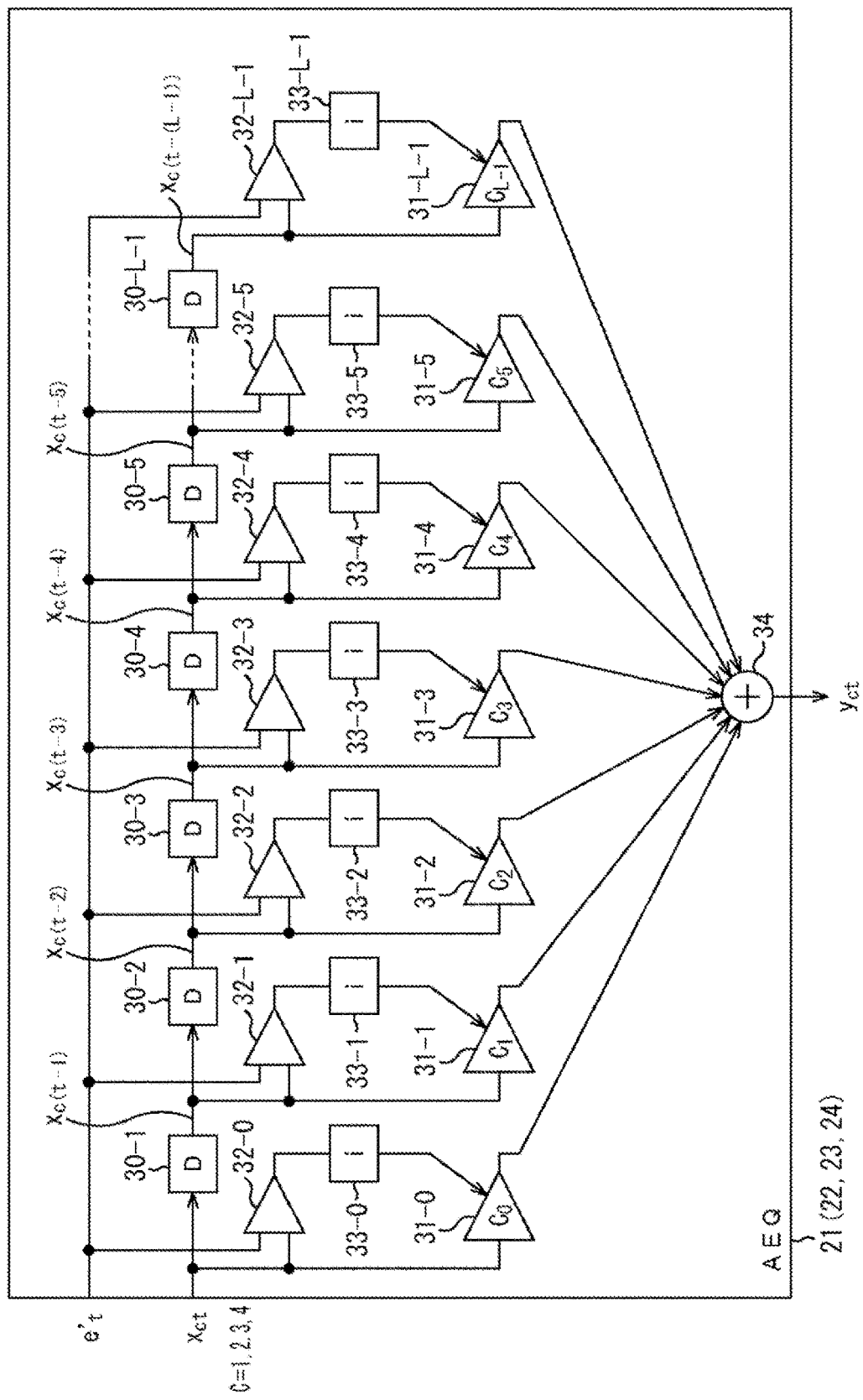
FIG. 28 is a diagram illustrating an exemplary configuration of an FIR filter which is an adaptive equalizer 20+c.

FIG. 28 is a diagram illustrating an exemplary configuration of an FIR filter with the tap length L which is an adaptive equalizer 20+c.

The adaptive equalizer 20+c includes (L−1) delay units 30-1 to 30-(L−1), L multipliers 31-0 to 31-(L−1), and an adder 34 and configures the FIR filters of L taps.

Further, the adaptive equalizer 20+c includes L calculators 32-0 to 32-(L−1) and L integrators 33-0 to 33-(L−1).

The first delay unit 30-1 is supplied with the reproduced signal $x_{ct}$ at the time t from the AGC 13. The delay unit 30-1 supplies a reproduced signal $x_{c(t-1)}$ obtained by delaying the reproduced signal $x_{ct}$ at the time t supplied from the AGC 13 by one clock to the delay unit 30-2 and the calculator 32-1 in the rear stage.

A len-th delay unit 30-len (where len=2, 3, . . . , and L−2) supplies a reproduced signal $x_{c(t-len)}$ obtained by delaying a reproduced signal $x_{c(t-(L-1))}$ from the delay unit 30-(len−1) in the front stage by one clock to the delay unit 30-(len+1) and the calculator 32-len in the rear stage.

The final delay unit 30-(L−1) supplies a signal $x_{c(t-(L-1))}$ obtained by delaying the reproduced signal $x_{c(t-(L-2))}$ from the delay unit 30-(L−2) in the front stage by one clock to the calculator 32-(L−1).

The first multiplier 31-0 is supplied with the reproduced signal $x_{ct}$ at the time t from the AGC 13. The multiplier 31-0 multiplies the reproduced signal $x_{ct}$ from the AGC 13 by a tap coefficient $C_0$ which is the number of filter coefficients and supplies a multiplied value obtained as the result to the adder 34.

A len-th multiplier 31-len (where len=1, 2, . . . , and L−1) multiplies the reproduced signal $x_{c(t-len)}$ from the delay unit 30-len by a tap coefficient $C_{len}$ and supplies a multiplied value obtained as the result to the adder 34.

The first calculator 32-0 is supplied with the reproduced signal $x_{ct}$ from the AGC 13 and the equalized error $e'_t$ at the time t from the equalized error calculation unit 18.

The calculator 32-0 performs calculation of, for example, $-\mu \times e'_t \times x_{ct}$ using the reproduced signal $x_{ct}$ from the AGC 13 and the equalized error $e'_t$ at the time t from the equalized error calculation unit 18 and supplies the calculation value $-\mu \times e'_t \times x_{ct}$ obtained as the result to the integrator 33-0. Here, an example in which $\mu=1$ is set is illustrated in FIG. 28.

A len-th calculator 32-len (where len=1, 2, . . . , and L−1) is supplied with the reproduced signal $x_{c(t-len)}$ from the delay unit 30-len and the equalized error $e'_t$ at the time t from the equalized error calculation unit 18.

The calculator 32-len performs calculation of, for example, $-\mu \times e'_t \times x_{c(t-len)}$ using the reproduced signal $x_{c(t-len)}$ from the delay unit 30-len and the equalized error $e'_t$ at the time t from the equalized error calculation unit 18 and supplies the calculation value $-\mu \times e'_t \times x_{c(t-len)}$ obtained as the result to the integrator 33-len. Here, as described above, the example in which $\mu=1$ is set is illustrated in FIG. 28.

The integrator 33-len (where len=0, 1, . . . , and L−1) integrates the calculation value $-\mu \times e'_t \times x_{c(t-len)}$ from the calculator 32-len and updates the filter coefficient $C_{len}$ of the multiplier 31-len in accordance with an integrated value obtained as the result.

Accordingly, in the adaptive equalizer 20+c, as a result, the filter coefficient $C_{len}$ (where len=0, 1, . . . , and L−1) used for equalization is consequently updated sequentially in accordance with the equalized error $e'_t$, at the time t, the reproduced signal $x_{ct}$ at the time t from the AGC 13 corresponding to len=0, and the reproduced signal $x_{c(t-len)}$ from the delay unit 30-len (len=1, 2, . . . and L−1).

The adaptive equalizer 20+c performs adaptive equalization through updating of the filter coefficient $C_{len}$.

When the integrator 33-len performs integration of the calculation value, responsiveness of updating of the filter coefficient $C_{len}$ is adjusted by setting the updating coefficient $\mu$. As descried above, the example in which $\mu=1$ is set is illustrated in FIG. 28.

The adder 34 adds each of multiplied values from the multiplier 31-0 to 31-(L−1) and outputs an added value obtained as the result as the filtering signal $y_{ct}$ at the time t.

The adaptive equalizers 21, 22, 23, and 24 with the foregoing configuration sets adaptive equalization of signals obtained through linear combination of the reproduced signals $x_{1t}$, $x_{2t}$, $x_{3t}$, and $x_{4t}$ from the AGC 13 and the signals delayed by the delay units 30-len (where len=2, 3, . . . , L−1) respectively mounted in the adaptive equalizers 21, 22, 23, and 24, that is, the ideal PR waveform, as a target and perform equalization of amplitude components of the signals obtained by performing the linear combination of the reproduced signals $x_{1t}$, $x_{2t}$, $x_{3t}$, and $x_{4t}$ and the delayed signals, optimization of errors, and phase distortion of frequency components.

In the adaptive equalization, the tap coefficients $C_0$ to $C_{L-1}$ of the adaptive equalizers 21, 22, 23, and 24 are updated in accordance with the calculation value $-\mu \times e'_t \times x_{c(t-len)}$ (where len=0, 1, . . . , L−1) in the calculators 32-0 to 32-(L−1) respectively mounted in the adaptive equalizers 21, 22, 23, and 24. Thus, the tap coefficients $C_0$ to $C_{L-1}$ are updated in a direction in which a square of the equalized error $e'_t$ (a square error) is minimized (approaches 0) in accordance with a gradient method.

The equalized signal $y'_t$ at the time t expressed as the added value of the filtering signals $y_{1t}$, $y_{2t}$, $y_{3t}$, and $y_{4t}$ output from the adaptive equalizers 21, 22, 23, and 24 is adaptively controlled using equalized error $e'_t$ in a direction in which the tap coefficients $C_0$ to $C_{L-1}$ in the adaptive equalizers have a frequency feature equalized to the target ideal PR waveform.

Through signal processing in the multi-input adaptive equalization unit 14, the equalized signal $y'_t$ becomes the equalized signal $y'_t$ adaptively equalized to a signal of the reproducing target track TK in which an unnecessary signal such as crosstalk noise from the adjacent tracks is reduced from a signal which is noise containing crosstalk noise superimposed with the reproduced signals from the reproducing target track TK and the adjacent tracks TK−1 and TK+1 through the foregoing adaptive equalization processing in which the reproduced signal from each signal channel c is used.

In the multi-input adaptive equalization unit 14, the crosstalk noise or the like of the adjacent tracks TK−1 and TK+1 which cannot be removed in the adaptive equalization processing remains in the equalized signal $y'_t$ obtained by adding the filtering signals $y_{1t}$, $y_{2t}$, $y_{3t}$, and $y_{4t}$ output from the adaptive equalizers 21, 22, 23, and 24.

Accordingly, the noise predictor 15 can be provided in the rear stage of the multi-input adaptive equalization unit 14. Thus, the data detection processing unit 105 can have the function of the NPML. The NPML is disclosed in E. Eleftheriou and W. Hirt, "Noise-Predictive Maximum-Likelihood (NPML) Detection for the Magnetic Recording Channel" (hereinafter referred to as Document A).

The noise predictor 15 whitens the crosstalk noise remaining the equalized signal $y'_t$ by performing filter processing of the whitening filter on the equalized signal $y'_t$ output by the multi-input adaptive equalization unit 14.

The filtering signals $y_{1t}$, $y_{2t}$, $y_{3t}$, and $y_{4t}$ obtained in the multi-input adaptive equalization unit 14 can be expressed in Expression (1) using the reproduced signals $x_{1t}$, $x_{2t}$, $x_{3t}$, and $x_{4t}$.

[Math. 1]

$$y_t = \begin{pmatrix} y_{1t} \\ y_{2t} \\ y_{3t} \\ y_{4t} \end{pmatrix} = f_t^T x_t = \begin{pmatrix} \overrightarrow{f_{1t}} & \overrightarrow{f_{2t}} & \overrightarrow{f_{3t}} & \overrightarrow{f_{4t}} \end{pmatrix} \begin{pmatrix} \overrightarrow{x_{1t}} \\ \overrightarrow{x_{2t}} \\ \overrightarrow{x_{3t}} \\ \overrightarrow{x_{4t}} \end{pmatrix} \quad (1)$$

A vector $f_{ct}$ is a vector that has a length L and has, as elements, the tap coefficients $C_0$ to $C_{L-1}$ at the time t of the signal channel c (the adaptive equalizer 20+c). A vector $x_{ct}$ is a vector that has the length L and has, as elements, sample values $x_{ct}, x_{c(t-1)}, \ldots,$ and $x_{c(t-(L-1))}$ of the reproduced signal $x_{ct}$ which is a filter processing target using the tap coefficients $C_0$ to $C_{L-1}$ at the time t.

The equalized signal $y'_t$ obtained by adding the filtering signals $y_{1t}$ to $y_{4t}$ can be expressed in Expression (2).

[Math. 2]

$$y'_t = \sum_{c=1}^{4} y_{ct} = \sum_{c=1}^{4} \sum_{len=0}^{L-1} f_{clen} \cdot x_{c(t-len)} = \sum_{m=0}^{K-1} c_m \cdot a_{t-m} + v_t + w_t \quad (2)$$

$f_{c1}$ represents the first tap coefficient $C_1$ of the signal channel c (the adaptive equalizer 20+c). K represents an ISI length which is a length (time) in which a targeting PR (target PR) ISI occurs.

$c_m$ represents an m-th coefficient among K coefficients $c_0$, $c_1, \ldots c_{K-1}$ equal to an ISI length K as an impulse response of the target PR (of the ISI). Hereinafter, the coefficient $c_m$ is also referred to as a PR coefficient $c_m$.

at represents an NRZ multilevel value which is a non-return-to-zero (NRZ) expression of a signal value at the time t (on a channel) of the multilevel code recorded on the optical disc 100. When a value (level) of the multilevel code taking an ML value of 0 to ML−1 at the time t is represented by $b_t$, an NRZ multilevel value at can be obtained with an expression at=2×bt−(ML−1), for example.

A sequence of n cells which are a plurality of cells of multilevel codes (values of the multilevel codes) bt expresses an ML base of n digits. A sequence of NRZ multilevel values at corresponding to the sequence of n cells of the multilevel codes bt expresses a sequence of a plurality of cells of the multilevel codes bt as a value centering on a direct current (DC).

Hereinafter, when a quaternary code of ML=4 is adopted as a multilevel code, NRZ multilevel values $a_t$ for $b_t$={0, 1, 2, 3} of the quaternary code (values of the quaternary code) are $a_t$={−3, −1, +1, +3}.

$v_t$ represents an error between the level of the target PR and the equalized signal $y'_t$ at the time t. wt represents noise containing crosstalk noise remaining the equalized signal $y'_t$ at the time t.

By passing the equalized signal $y'_t$ through the noise predictor 15, it is possible to whiten a frequency component of the noise wt and thus inhibit branch metric in the Viterbi decoding of the detection unit 16.

The whitened signal $z_t$ output by the noise predictor 15 can be represented in Expression (3).

[Math. 3]

$$z_t = y'_t - \sum_{len=1}^{N} p_{len} \cdot y'_{t-len} \quad (3)$$

Figure 29:
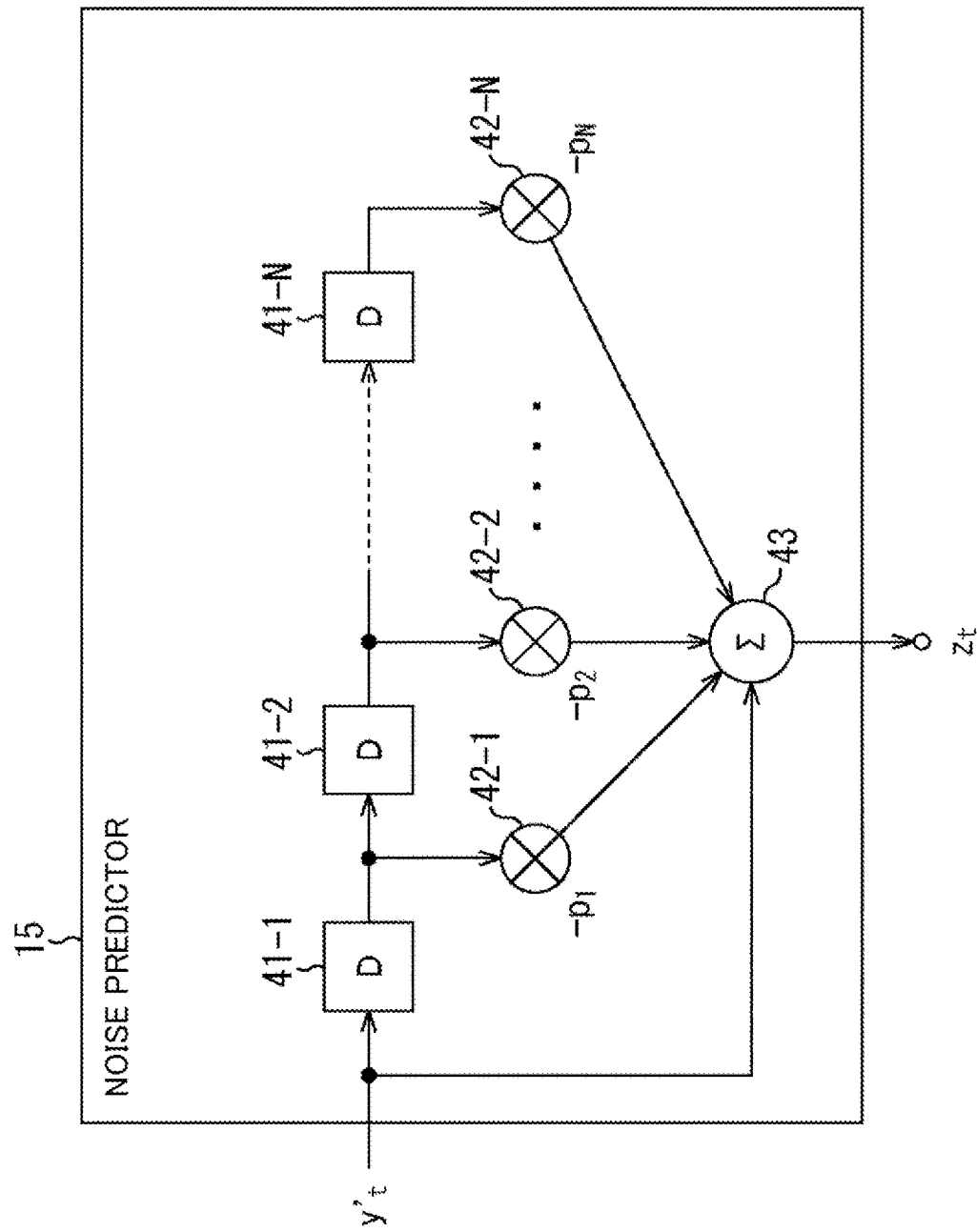
FIG. 29 is a diagram illustrating an exemplary configuration of a noise predictor 15.

FIG. 29 is a diagram illustrating an exemplary configuration of the noise predictor 15.

The noise predictor 15 is configured with an FIR filter that includes N-stage delay units 41-1 to 41-N. N multipliers 42-1 to 42-N, and an adder 43.

When the equalized signal $y'_t$ of the multi-input adaptive equalization unit 14 is input, the N-stage delay units 41-1 to 41-N delay and output the equalized signal $y'_t$ for each sample. That is, the delay units 41-1 to 41-N delay and output the equalized signal $y'_t$ input thereto by one clock.

The N multipliers 42-1 to 42-N multiply outputs of the delay unit 41-len, that is, the equalized signal $y'_{t-1}$ and a tap coefficient $p_{len}$.

The adder 43 calculates a total sum of the equalized signal $y'_t$ which is an input to the delay unit 41-1 in the first stage and a value which is −1 time of outputs of the multipliers 42-1 to 42-N and outputs a calculated value obtained as the result as a whitened signal $z_t$.

As tap coefficients $p_1$ to $p_N$ of the multipliers 42-1 to 42-N, tap coefficients $p_{len}$ (where len=1, 2, ..., and N) obtained by the whitened coefficient updating unit 19 are set.

The noise predictor 15 supplies the whitened signal $z_t$ output by the adder 43 to the detection unit 16.

The detection unit 16 includes a Viterbi decoder that performs, for example, Viterbi decoding as maximum likelihood decoding. The detection unit 16 functions as a decoding unit that decodes (detects) the multilevel code DT from the whitened signal $z_t$ by performing the Viterbi decoding as multilevel processing of the whitened signal $z_t$ from the noise predictor 15 in the Viterbi decoder.

The Viterbi decoder includes blocks (circuits) corresponding to a plurality of states which is the same as the number of values taken by continuous cells of a predetermined length and connection lines connecting the blocks corresponding to the states to each other and corresponding to branches indicating transitions between states (state transition). The Viterbi decoder efficiently detects a most reliable multilevel code sequence among all the possible multilevel code sequences.

In an actual circuit, the Viterbi decoder includes a memory (a register) that is called a state metric memory and stores a state metric of a state (until arrival to the state) at each state. The Viterbi decoder includes a register that is called a path memory and stores a multilevel code sequence until arrival to the state (a multilevel code sequence measured until arrival to the state). Further, the Viterbi decoder has a function of calculating a branch metric in each branch.

Various multilevel code sequences can be associated with paths arriving at each state in a one-to-one relation. For the paths, a path metric is calculated. The path metric indicates an error between an ideal PR waveform in which the multilevel code sequence corresponding to each path is influenced by the ISI of the PR and the actually obtained equalized signal y'$_t$ (a waveform of the equalized signal y'$_t$). The path metric can be obtained by sequentially adding the state transitions configuring the paths, that is, branch metrics of the branches.

The Viterbi decoder selects a minimum value of the path metrics of the paths that have branches from states of an immediately previous time equal to or less than ML arriving at the state at each state of each time, as a state metric of that state. By adding the branch metrics of the branches to states of a subsequent time to the state metrics of the states in each state, the path metrics of the paths that have the branches are calculated. Hereinafter, the selection of the minimum value of the path metrics which are the state metrics and the calculation of the path metrics are repeated similarly.

A final (latest) branch of the path of the path metric which is the state metric is referred to as a selected branch. The Viterbi decoder adds the multilevel code corresponding to the selected branch to a storage value of the path memory in the state at an immediately previous time of arrival at the state when the path metric which is the state metric is selected, and stores the multilevel code in the path memory. Thus, in the path memory of each state, a survival path which is a path arriving at the state is stored in a form expressed as a sequence of the multilevel codes corresponding to the branches configuring the survival path.

Then, for example, a maximum likelihood path which is a path in which the state metric arrives at a minimum state at a predetermined time (a time of the final state of the path when the paths of a predetermined length are obtained) is selected as a decoding result of the Viterbi decoding. The sequence of the multilevel codes expressing the maximum likelihood path which is the decoding result of the Viterbi decoding is a sequence of the multilevel codes DT.

Hereinafter, a branch metric calculation method in each of normal Viterbi decoding, Viterbi decoding to which decision feedback equalization (DFE) is introduced, Viterbi decoding to which the NPML is introduced, Viterbi decoding the DFE and the NPML are introduced will be described.

Here, the normal Viterbi decoding is Viterbi decoding to which the DFE and the NPML are not introduced. The Viterbi decoding to which the DFE is introduced is Viterbi decoding to which the DFE is introduced but the NPML is not introduced. The Viterbi decoding to which the NPML is introduced is Viterbi decoding to which the NPML is introduced but the DFE is not introduced.

When the normal Viterbi decoding is performed in the detection unit 16, the data detection processing unit 105 (see FIG. 25) does not include the noise predictor 15.

In the normal Viterbi decoding, a branch metric $\lambda_t(s_i, s_j)$ of a branch from a state $s_i$ at a time t−1 to a state $s_j$ at a time t is calculated with Expression (4), for example.

[Math. 4]

$$\lambda_t(s_i, s_j) = \left[ y'_t - \left( \sum_{s=0}^{K-1} c_m \cdot a_{t-m} + v_t \right) \right]^2 \quad (4)$$

$$= \left[ y'_t - \underbrace{\{r_t(s_i, s_j) + \Delta r_t(\vec{b}_t)\}}_{MR1} \right]^2$$

$ML^\wedge K$ reference levels equal to number of ML bases expressed as K lines of $b_t$ to $b_{t-(K-1)}$ In Expression (4), $r_t(s_i, s_j)$ on the right side of the second line represents the right side $\Sigma(c_m \times a_{t-m})$ in the first line, and $\Delta r_t(b_t)$ on the right side of the second line represents $v_t$ on the right side of the first line, that is, $v_t$ of Expression (2). $c_m$ represents an m-th PR coefficient, as described in Expression (2).

A vector $b_t$ ($b_t$ above which an arrow is shown) is a vector that has K latest multilevel codes $b_t, b_{t-1}, \ldots,$ and bt−(K−1) as elements by going back from the time t and can be expressed in Expression (5). Transformation between the multilevel code $b_t$ and the NRZ multilevel value at can be performed with the expression at=2×bt−(ML−1), as described in Expression (2).

[Math. 5]

$$\vec{b}_t = \begin{pmatrix} b_t \\ b_{t-1} \\ \vdots \\ b_{t-(K-1)} \end{pmatrix} \quad (5)$$

In Expression (4), $r_t(s_i, s_j)+\Delta r_t(b_t)$ indicated by MR1 represents a reference level of the equalized signal y'$_t$, and there are ML^K reference levels equal to the number of ML bases expressed as the lines of the multilevel codes of K cells of b, to $b_t$-$b_{t-bt-(K-1)}$. A^B represents B-th power of A.

As described above, since the reference level $r_t(s_i, s_j)+\Delta r_t(b_t)$ indicated by MR1 is a reference level of the equalized signal y'$_t$, the reference level $r_t(s_i, s_j)+\Delta r_t(b_t)$ is also referred to as an equalized reference level.

When $v_t$=0, ML^K equalized reference levels $r_t(s_i, s_j)+\Delta r_t(b_t)$ can be obtained in advance.

In the Viterbi decoding to which the DFE is introduced, the branch metric $\lambda_t(s_i, s_j)$ is calculated with Expression (6), for example.

[Math. 6]

$$\lambda_t(s_i, s_j) = \left[ y'_t - \left( \sum_{m=0}^{M-1} c_m \cdot a_{t-m} + v_t \right) \right]^2 \quad (6)$$

$$= \left[ y'_t - \underbrace{\{r_t(s_i, s_j) + \Delta r_t(\vec{b}_t)\}}_{MR2} \right]^2$$

$ML^\wedge M$ reference levels equal to number of ML bases expressed as M lines of $b_t$ to $b_{t-(M-1)}$ In Expression (6), a vector $\vec{b}_t$ is a vector that has latest M latest multilevel codes $b_t$, $b_{t-1}$, ..., and $b_{t-(M-1)}$ as elements by going back from the time t and can be expressed in Expression (7).

[Math. 7]

$$\vec{b}_t = \begin{pmatrix} b_t \\ b_{t-1} \\ \vdots \\ b_{t-(M-1)} \end{pmatrix} \quad (7)$$

Expressions (6) and (7) are the same as Expressions (4) and (5) except that M is used instead of K.

In Expression (6), $r_t(s_i, s_j) + \Delta r_t(\vec{b}_t)$ indicated by MR2 represents a reference level of the equalized signal $y'_t$ (an equalized reference level) as in Expression (4). Here, while there are ML^K reference levels $r_t(s_i, s_j) + \Delta r_t(\vec{b}_t)$ which are indicated by MR1 of Expression (4) and are equal to the number of ML bases expressed as the lines of the multilevel codes of K cells of $b_t$ to $b_{t-bt-(K-1)}$, there are ML^M reference levels $r_t(s_i, s_j) + \Delta r_t(\vec{b}_t)$ which are indicated by MR2 of Expression (6) and are equal to the number of ML bases expressed as the lines of the multilevel codes of M cells of $b_t$ to $b_{t-(M-1)}$.

Here, when PR of a certain impulse response is assumed in a recording/reproducing system of the optical disc 100, the assumed PR (an ideal PR) is also referred to as an assumed PR.

In the recording/reproducing system of the actual optical disc 100, minute interference occurs over the ISI length of the assumed PR in some cases. In addition to the assumed PR, an PR in which the minute interference is taken into consideration is also referred to an extended PR.

Hereinafter, K represents an ISI length of the assumed PR and M represents an ISI length of the extended PR. The ISI lengths K and M are assumed to have a relation of an expression K<=M.

Since actually occurring minute interference is taken into consideration in Viterbi decoding in which the extended PR in which minute interference actually occurring in the assumed PR is taken into consideration is combined, a branch metric is inhibited, decoding performance (detection accuracy) of the multilevel codes can be improved.

Here, the number of states of the Viterbi decoding is an ISI length−1-th power of the number of values ML taken for each cell. Therefore, when the ISI length of the PR is long, the number of states increases, and thus a circuit size of the Viterbi decoder may increase.

When K<M, the ISI length M in the Viterbi decoding in which the extended PR is combined is longer than the ISI length K in the Viterbi decoding in which the assumed PR is combined. When the Viterbi decoding in which the extended PR is combined is performed simply. The decoding performance of the multilevel codes is improved, but the circuit size may increase.

Accordingly, states taken in the Viterbi decoding in which the assumed PR is combined can be adopted as states taken in the Viterbi decoding in which the extended PR is combined. In this case, the number of states of the Viterbi decoding in which the extended PR is combined is reduced from the original number of states ML^(M−1) to the number of states ML^(K−1) of the Viterbi decoding in which the assumed PR is combined. Therefore, the decoding performance of the multilevel codes can be improved while inhibiting an increase in the circuit size.

As described above, in the Viterbi decoding in which the extended PR is combined, Viterbi decoding in which the number of states is reduced to the number of states of the Viterbi decoding in which the assumed PR is combined is also referred to as reduced Viterbi decoding. The reduced Viterbi decoding is normal Viterbi decoding when K=M.

In the reduced Viterbi decoding including the normal Viterbi decoding, there are ML^M reference numbers which is the ISI length-th power of the number ML of values taken for each cell.

In the reduced Viterbi decoding to which the DFE is introduced, ML^M reference levels are stored at most in a storage unit. Of the reference levels stored in the storage unit, reference levels addressed (designated) at latest M (>K) cells in the multilevel code sequence which are candidates for decoding results of the Viterbi decoding (hereinafter also referred to as provisional decoding results) configuring the paths including branch metric calculation target branches are read and used for branch metric calculation.

Then, path metric calculation of the paths including the branch metric calculation target branches is performed using the branch metric obtained as the result of the branch metric calculation. Further, a multilevel code sequence corresponding to paths in which the path metric is minimum is obtained as a new provisional decoding result using the path metric obtained as the result of the path metric calculation.

In the reduced Viterbi decoding to which the DFE is introduced, the reference levels stored in the storage unit are updated so that the equalized error $e'_t$ is decreased in accordance with the equalized error $e'_t$. The reference levels updated among the reference levels stored in the storage unit are addressed with the M cells in the multilevel code sequence which is the provisional decoding result.

As described above, in the reduced Viterbi decoding to which the DFE is introduced, a provisional decoding result (decision) of M (>K) cells is fed back and the reference levels are updated, and thus the DFE performing the feedback can be configured. According to the DFE, the reference levels are updated by the feedback of the provisional decoding result of M (>K) cells, and thus an influence of interference exceeding the ISI length K of the assumed PR in the interference of the extended PR is inhibited in the branch metric calculation. As a result, in the reduced Viterbi decoding in which the number of states is reduced, as described above, it is possible to inhibit deterioration in the decoding performance.

The configuration of the DFE is disclosed in FIG. 3 of Document A.

In the Viterbi decoding to which the NPML is introduced, the branch metric $\lambda_t(s_i, s_j)$ is calculated with Expression (8), for example.

[Math. 8]

$$\lambda_t(s_i, s_j) = \left[\left\{y'_t - \left(\sum_{n=0}^{K-1} c_m \cdot a_{t-m} + v_t\right)\right\} - \sum_{len=1}^{N} p_{len} \cdot \left\{y'_{t-len} - \left(\sum_{m=0}^{K-1} c_m \cdot a_{t-len-m} + v_{t-len}\right)\right\}\right]^2 \quad (8)$$

$$= \left[\left\{y'_t - \left(\sum_{len=1}^{N} p_{len} \cdot y'_{t-len}\right)\right\} - \left\{\sum_{n=0}^{K-1} c_m \cdot a_{t-m} + v_t - \sum_{len=1}^{N} p_{len} \cdot \left(\sum_{m=0}^{K-1} c_m \cdot a_{t-len-m} + v_{t-len}\right)\right\}\right]^2$$

$$= \underbrace{\left[z_t - \left\{r_t(s_i, s_j) + \Delta r_t(\vec{b}_t) - \sum_{len=1}^{N} p_{len} \cdot \left\{\left(r_{t-len}(s_i, s_j) + \Delta r_t(\vec{b}_{t-len})\right)\right\}\right\}\right]^2}_{MR3}$$

$(K + N)$ reference levels equal to
number of ML bases expressed as $K + N$ lines of $b_t$ to $b_{t-(K-1+N)}$ In Expression (8), a vector $b_t$ is expressed in the above-described Expression (5).

In Expression (8), $r_t(s_i, s_j)$ and $r_{t-len}(s_i, s_j)$ on the right side of the third line indicate the right side $\Sigma(c_m \times a_{t-m})$ and $\Sigma(c_m \times a_{t-len-m})$ on the right side of the second line, respectively. $\Delta r_t(b_t)$ and $\Delta r_t(b_{t-len})$ on the right side of the third line indicate $v_t$ and $v_{t-len}$ on the right side of the second line.

Further, in Expression (8), N represents the number of taps of the noise predictor 15 and $p_{len}$ represents the len-th tap coefficient among N tap coefficients (filter coefficients) of the noise predictor 15.

In Expression (8), $y'_t-((c_m \times a_{t-m})+v_t)$ on the right side of the first line represents noise wt in Expression (2). $\Sigma[p_{len} \times \{y'_{t-len}-(\Sigma(c_m \times a_{t-len-m})+v_{t-len})\}]$ on the right side of the first line represents an estimated value of the noise wt whitened by the noise predictor 15.

Accordingly, in the Viterbi decoding to which the NPML is introduced, a square of an error between the noise wt and the estimated value of the whitened noise wt is obtained as a branch metric $\lambda t(s_i, s_j)$.

In Expression (8), $z_t$ represents a whitened signal which is the equalized signal $y'_t$ whitened by the noise predictor 15.

Further, in Expression (8), $r_t(s_i, s_j)+\Delta r_t(b_t)-\Sigma[p_{len} \times \{r_{t-len}(s_i, s_j)+\Delta r_t(b_{t-len})\}]$ indicated by MR3 represents a reference level of the whitened signal $z_t$ which is the equalized signal $y'_t$ whitened by the noise predictor 15. There are $ML^{(K+N)}$ reference level $r_t(s_i, s_j)+\Delta r_t(b_t)-\Sigma[p_{len} \times \{r_{t-len}(s_i, s_j)+\Delta r_t(b_{t-len})\}]$ indicated by MR3 and equal to the number of ML bases expressed as the lines of the multilevel codes of K+N cells of bt to bt-bt-(K+N-1).

As described above, since the reference level $r_t(s_i, s_j)+\Delta r_t(b_t)-\Sigma[p_{len} \times \{r_{t-len}(s_i, s_j)+\Delta r_t(b_{t-len})\}]$ indicated by MR3 is a reference level of the whitened signal $z_t$ (the equalized signal $y'_t$ can be whitened and obtained), the reference level $r_t(s_i, s_j)+\Delta r_t(b_t)-\Sigma[p_{len} \times \{r_{t-len}(s_i, s_j)+\Delta r_t(b_{t-len})\}]$ is also referred to as an whitened reference level.

The whitened reference level $r_t(s_i, s_j)+\Delta r_t(b_t)-\Sigma[p_{len} \times \{r_{t-len}(s_i, s_j)+\Delta r_t(b_{t-len})\}]$ indicated by MR3 can be obtained using the equalized reference level $r_t(s_i, s_j)+\Delta r_t(b_t)$ (and $r_{t-len}(s_i, s_j)+\Delta r_t(b_{t-len})$) indicated by MR1.

In the Viterbi decoding to which the NPML is introduced, $ML^{(N+K)}$ reference levels are stored at most in the storage unit. Of the reference levels stored in the storage unit, the reference levels addressed with latest N+K cells in the multilevel code sequence which is a provisional decoding result configuring the paths including the branch metric calculation target branches are read and used for the branch metric calculation.

The path metric calculation of the paths including the branch metric calculation target branches is performed using the branch metric obtained as the result of the branch metric calculation. Further, a multilevel code sequence corresponding to paths in which the path metric is minimum is obtained as a new provisional decoding result using the path metric obtained as the result of the path metric calculation.

In the Viterbi decoding to which the NPML is introduced, the reference levels stored in the storage unit are updated so that the equalized error $e'_t$ is decreased in accordance with the equalized error $e'_t$. The reference levels updated among the reference levels stored in the storage unit are addressed with the N+K cells in the multilevel code sequence which is the provisional decoding result.

As described above, in the Viterbi decoding to which the NPML is introduced, a provisional decoding result (decision) of N+K cells is fed back and the reference levels are updated, and thus the DFE can be configured as in the reduced Viterbi decoding to which the DFE is introduced.

In the Viterbi decoding to which the DFE and the NPML are introduced, the branch metric $\lambda_t(s_i, s_j)$ is calculated with Expression (9), for example.

[Math. 9]

$$\lambda_t(s_i, s_j) = \left[\left\{y'_t - \left(\sum_{n=0}^{M-1} c_m \cdot a_{t-m} + v_t\right)\right\} - \sum_{len=1}^{N} p_{len} \cdot \left\{y'_{t-len} - \left(\sum_{m=0}^{M-1} c_m \cdot a_{t-len-m} + v_{t-len}\right)\right\}\right]^2 \quad (9)$$

$$= \left[\left\{y'_t - \left(\sum_{len=1}^{N} p_{len} \cdot y'_{t-len}\right)\right\} - \left\{\sum_{n=0}^{M-1} c_m \cdot a_{t-m} + v_t - \sum_{len=1}^{N} p_{len} \cdot \left(\sum_{m=0}^{M-1} c_m \cdot a_{t-len-m} + v_{t-len}\right)\right\}\right]^2$$

$$= \underbrace{\left[z_t - \left\{r_t(s_i, s_j) + \Delta r_t(\vec{b}_t) - \sum_{len=1}^{N} p_{len} \cdot \left\{\left(r_{t-len}(s_i, s_j) + \Delta r_t(\vec{b}_{t-len})\right)\right\}\right\}\right]^2}_{MR4}$$

-continued

| (M + N) reference levels equal to number of ML bases expressed as $M + N$ lines of $b_t$ to $b_{t-(M-1+N)}$ |
|---|

Expression (9) is the same as Expression (8) except that M is used instead of K. Accordingly, the Viterbi decoding in which the branch metric $\lambda_t(s_i, s_j)$ is obtained in Expression (9) is reduced Viterbi decoding.

In Expression (9), $r_t(s_i, s_j)+\Delta r_t(b_t)-\Sigma[p_{len}\times\{(r_{t-len}(s_i, s_j)+\Delta r_t(b_{t-len})\}]$ indicated by MR4 represents a reference level of the whitened signal $z_t$ which is the equalized signal $y'_t$ whitened by the noise predictor 15 (whitened reference level) as in Expression (8).

Here, while there are ML^(K+N) whitened reference level $r_t(s_i, s_j)+\Delta r_t(b_t)-\Sigma[p_{len}\times\{r_{t-len}(s_i, s_j)+\Delta r_t(b_{t-len})\}]$ indicated by MR3 of Expression (8) and equal to the number of ML bases expressed as the lines of the multilevel codes of K+N cells of bt to $b_t$-$b_t$-(K+N−1), there are ML^(M+N) whitened reference level $r_t(s_i, s_j)+\Delta r_t(b_t)-\Sigma[p_{len}\times\{r_{t-len}(s_i, s_j)+\Delta r_t(b_{t-len})\}]$ indicated by MR4 in Expression (9) and equal to the number of ML bases expressed as the lines of the multilevel codes of M+N cells of $b_t$ to $b_{t-(M+N-1)}$.

The whitened reference level $r_t(s_i, s_j)+\Delta r_t(b_t)-\Sigma[p_{len}\times\{r_{t-len}(s_i, s_j)+\Delta r_t(b_{t-len})\}]$ indicated by MR4 can be obtained using the equalized reference level $r_t(s_i, s_j)+\Delta r_t(b_t)$ (and $r_{t-len}(s_i, s_j)+\Delta r_t(b_{t-len})$) indicated by MR2.

In Expression (9), the branch metric $\lambda_t(s_i, s_j)$ of the Viterbi decoding to which the DFE and the NPML are introduced is expressed with the equalized reference level $r_t(s_i, s_j)+\Delta r_t(b_t)$ and the whitened signal $z_t$ obtained by whitening the equalized signal $y'_t$ and convolution of the tap coefficient $p_{len}$ of the noise predictor 15 and the equalized reference level $r_{t-len}(s_i, s_j)+\Delta r_t(b_{t-len})$.

In the Viterbi decoding to which the DFE and the NPML are introduced, ML^(M+N) reference levels are stored at most in the storage unit. Of the reference levels stored in the storage unit, the reference levels addressed with latest M+N cells in the multilevel code sequence which is a provisional decoding result configuring the paths including the branch metric calculation target branches are read and used for the branch metric calculation.

The path metric calculation of the paths including the branch metric calculation target branches is performed using the branch metric obtained as the result of the branch metric calculation. Further, a multilevel code sequence corresponding to paths in which the path metric is minimum is obtained as a new provisional decoding result using the path metric obtained as the result of the path metric calculation.

In the reduced Viterbi decoding to which the DFE and the NPML are introduced, the reference levels stored in the storage unit are updated so that the equalized error $e'_t$ is decreased in accordance with the equalized error $e'_t$. The reference levels updated among the reference levels stored in the storage unit are addressed with the M+N cells in the multilevel code sequence which is the provisional decoding result.

In Expression (9), by setting N=0 and M=K, it is possible to express the branch metric calculation of the normal Viterbi decoding. In Expression (9), by setting N>0 and M=K, it is possible to express the branch metric calculation of the Viterbi decoding to which the NPML is introduced. Further, in Expression (9), by setting N=0 and M>K, it is possible to express the branch metric calculation of the Viterbi decoding to which the DFE is introduced.

Accordingly, description of the Viterbi decoding in which the branch metric calculation is performed with Expression (9), that is, the Viterbi decoding to which the DFE and the NPML are introduced, is description of one of the normal Viterbi decoding, the Viterbi decoding to which the DFE is introduced, and the Viterbi decoding to which the NPML is introduced in accordance with values of N and M.

Accordingly, hereinafter, reduced Viterbi decoding to which the DFE and the NPML are introduced and the multilevel codes are decoded will be described instead of description of each of the normal Viterbi decoding, the Viterbi decoding to which the DFE is introduced, the Viterbi decoding to which the NPML is introduced, and the Viterbi decoding to which the DFE and the NPML are introduced.

Figure 30:
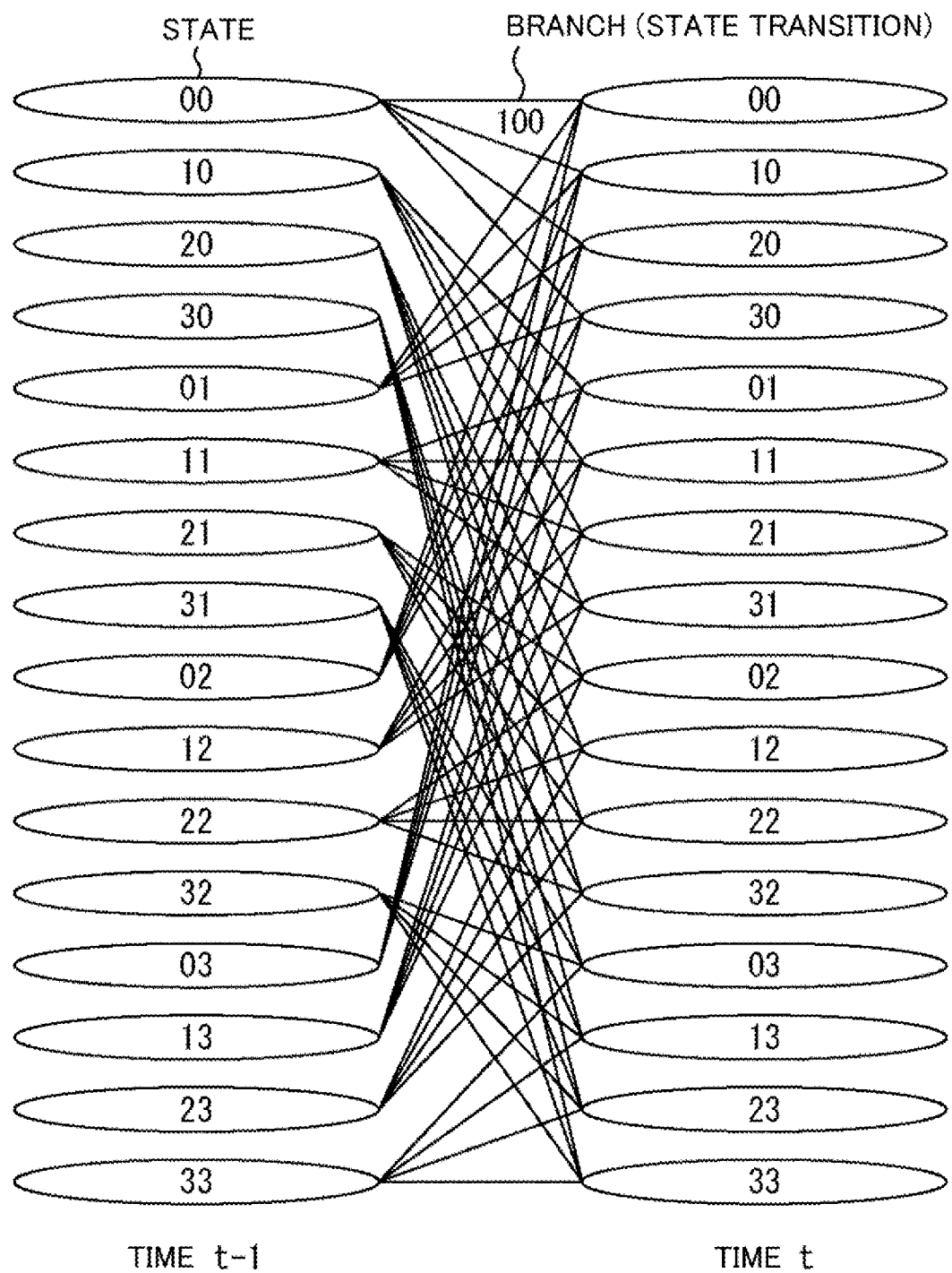
FIG. 30 is a diagram illustrating an example of a trellis of reduction Viterbi decoding in which DFE and NPML are introduced.

FIG. 30 is a diagram illustrating an example of a trellis of reduction Viterbi decoding in which the DFE and the NPML are introduced.

Here, for example, it is assumed that ML=4 is set and quaternary codes taking $b_t$=0, 1, 2, and 3 are adopted as multilevel codes.

Further, for example, it is assumed that the assumed PR is a PR (1, 2, 1) with the ISI length K=3 and the extended PR is a PR (1, 2, 1, 0.2, 0.1) with the ISI length M=5. In this case, it is assumed that the PR coefficient $c_m$ of the assumed PR is $c_0$=1, $c_1$=2, and $c_2$=1. The PR coefficient $c_m$ of the extended PR is $c_0$=1, $c_1$=2, $c_2$=1, $c_3$=0.2, and $c_4$=0.1.

A minimum travel length (a minimum value of the number of consecutive zeros) d of the multilevel codes bt is d=0 and the number of taps N of the noise predictor 15 is N=1.

Further, it is assumed that the RMTR described in FIGS. 15 and 16 is limited to 1 or less.

The RMTR is equivalent to a consecutive number in which an expression $b_t \ne b_{t-1}$ and $b_t=b_{t-2}$ are satisfied for the quaternary code sequence $b_t, b_{t-1}, b_{t-2}, \ldots$. A !=B represents that A is not equal to B.

When the RMTR is limited to 1 or less, for example {1, 3, 1, 0}, {1, 3, 1, 1}, or {1, 3, 1, 2} which is the quaternary code sequence is allowed because RMTR is 1.

On the other hand, for example {1, 3, 1, 3} which is the quaternary code sequence is not allowed because RMTR is 2.

The number of states of a trellis of the reduced Viterbi decoding is ML^(K−1)=4^(3−1)=16 which is equal to the number of ML bases (cases) expressed by the number of cells which is the ISI length K−1 of the assumed PR, as illustrated in FIG. 30. Each of 16 states is expressed as a state qr using a line qr of ML bases of 2 cells. q and r represent an ML base of one digit.

The number of branches which arrives (can arrive) from the state at the time t−1 to one state at the time t is ML. Accordingly, a total number of branches arriving at ML^(K−1) states at the time t is ML×ML^(K−1)=ML^K=4^3=64 in the trellis.

In the state qr at the time t−1, a branch indicating state transition in which a quaternary code $b_t$=p is obtained as a new provisional decoding result at the time t is expressed as a branch pqr using a line pqr of a ML base of 3 cells.

In this case, a state qr expressed with an ML base qr of 2 final cells of the branch pqr represents a state before state transition, and a state pq expressed with an ML base pq of the first 2 cells of the branch pqr represents a state after state transition. For example, a branch 100 represents state transition from a state 00 to a state 10.

While a total number of branches is ML^K=64, the number of whitened reference levels MR4 which are used (can be used) for the branch metric calculation of Expression (9) is ML^(M+N)=4^(5+1)=4^6, as described in Expression (9). The number of whitened reference levels MR4 used for the branch metric calculation of one branch can be ML^(M+N)/ML^K=ML^(M+N−K).

In accordance with an encoding rule at the time of encoding of the multilevel codes (an encoding rule of the multilevel codes), for example, the minimum travel length d, the RMTR or the like, a state of the trellis and a branch (state transition) are limited and the Viterbi decoding can be performed.

In the trellis of FIG. 30, when the RMTR is limited to 1 or less, there is an untaken state (a prohibitive state), an untaken branch (a prohibitive branch), or an unusable whitened reference level MR4 (a prohibitive reference level).

A branch indicating state transition to an untaken state, branch metric calculation of an untaken branch, and branch metric calculation performed using the unusable whitened reference level MR4 can be omitted (excluded from execution targets).

<Viterbi Decoder>

Figure 31:
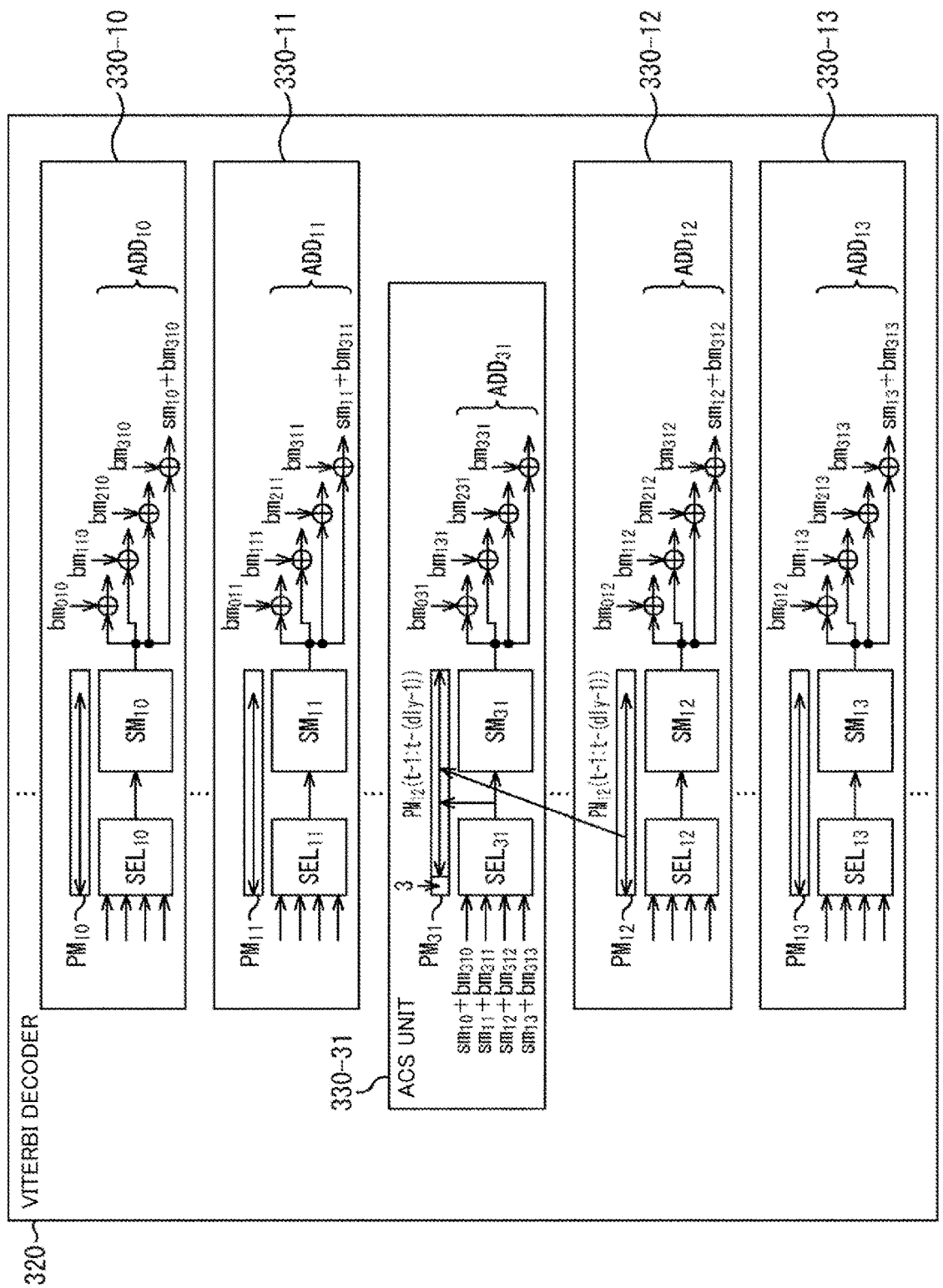
FIG. 31 is a diagram illustrating an exemplary configuration of a Viterbi decoder 320 included in a detection unit 16.

FIG. 31 is a diagram illustrating an exemplary configuration of a Viterbi decoder 320 included in the detection unit 16.

The Viterbi decoder 320 is a Viterbi decoder that restores the quaternary codes described in FIG. 30 and includes Add Compare Select (ACS) unit 330-*pq* corresponding to each of 16 states pq of the trellis. pq is a line of an ML base of 2 cells indicating a state pq, as described in FIG. 30.

The ACS unit 330-*pq* includes a path memory $PM_{pq}$, a selector $SEL_{pq}$, a state metric memory $SM_{pq}$, and an adder $ADD_{pq}$.

The path memory $PM_{pq}$ stores a quaternary code sequence which is a provisional decoding result corresponding to a survival path arriving at the state pq by going back from the quaternary codes which are the provisional decoding result at the latest time.

A path metric $sm_{qr}+bm_{pqr}$ in which a state metric $sm_{qr}$ of a state qr and a branch metric $bm_{pqr}$ of a branch from the state qr to the state pq (indicating state transition) are added and which has a path arriving at the state pq via the state qr is supplied from the ACS unit 330-*qr* corresponding to the state qr in which state transition to the state pq is possible to the selector $SEL_{pq}$.

For example, state transition from each of a state 10, a state 11, a state 12, and a state 13 to a state 31 is possible. Therefore, an ACS unit 330-31 corresponding to the state 31 is provided with a connection line (not illustrated) corresponding to a branch indicating state transition and coming from each of an ACS unit 330-10 corresponding to the state 10, an ACS unit 330-11 corresponding to the state 11, an ACS unit 330-12 corresponding to the state 12, and an ACS unit 330-13 corresponding to the state 13.

The following path metric is supplied to the selector $SEL_{31}$ of the ACS unit 330-31 corresponding to the state 31 from each of the ACS unit 330-10 corresponding to the state 10, the ACS unit 330-11 corresponding to the state 11, the ACS unit 330-12 corresponding to the state 12, and the ACS unit 330-13 corresponding to the state 13 via the connection line corresponding to the branch.

A path metric $sm_{10}+bm_{310}$ in which a state metric $sm_{10}$ of the state 10 and a branch metric $bm_{310}$ of a branch from the state 10 to the state 31 are added and which has a path arriving at the state 31 via the state 10 is supplied from the ACS unit 330-10 corresponding to the state 10 to the selector $SEL_{31}$ of the ACS unit 330-31 corresponding to the state 31.

A path metric $sm_{11}+bm_{311}$ in which a state metric $sm_{11}$ of the state 11 and a branch metric $bm_{311}$ of a branch from the state 11 to the state 31 are added and which has a path arriving at the state 31 via the state 11 is supplied from the ACS unit 330-11 corresponding to the state 11 to the selector $SEL_{31}$ of the ACS unit 330-31 corresponding to the state 31.

A path metric $sm_{12}+bm_{312}$ in which a state metric $sm_{12}$ of the state 12 and a branch metric $bm_{312}$ of a branch from the state 12 to the state 31 are added and which has a path arriving at the state 31 via the state 12 is supplied from the ACS unit 330-12 corresponding to the state 12 to the selector $SEL_3a$ of the ACS unit 330-31 corresponding to the state 31.

A path metric $sm_{13}+bm_{313}$ in which a state metric $sm_{13}$ of the state 13 and a branch metric $bm_{313}$ of a branch from the state 13 to the state 31 are added and which has a path arriving at the state 31 via the state 13 is supplied from the ACS unit 330-13 corresponding to the state 13 to the selector $SEL_{31}$ of the ACS unit 330-31 corresponding to the state 31.

The selector $SEL_{pq}$ selects a minimum path metric as a new state metric $sm_{pq}$ of the state pq from the path metrics supplied from the selector $SEL_{pq}$, and supplies the selected minimum path metric to the state metric memory $SM_{pq}$.

The state metric memory $SM_{pq}$ stores the state metric $sm_{pq}$ from the selector $SEL_{pq}$.

The adder $ADD_{pq}$ obtains a path metric $sm_{pq}+bm_{p'pq}$ of a path arriving at a state p'p in which state transition from the state pq is possible by adding the state metric $sm_{pq}$ stored in the state metric memory $SM_{pq}$ and a branch metric $bm_{p'pq}$ of a branch to the state p'p. p' represents one digit of the ML base as in p, q, and r.

A connection line (not illustrated) corresponding to a branch indicating state transition is provided between the adder $ADD_{pq}$ of the ACS unit 330-*pq* corresponding to the state pq and the selector $SEL_{p'p}$ of the ACS unit 330-*p'*p corresponding to the state p'p in which state transition from the state pq is possible.

The adder $ADD_{pq}$ supplies the path metric $sm_{pq}+bm_{p'pq}$ to the selector $SEL_{p'p}$ of the ACS unit 330-*p'*p corresponding to the state p'p via the connection line.

For example, state transition from the state 31 to a state 03, a state 13, a state 23, and the state 33 is possible.

Therefore, the adder ADD31 of the ACS unit 330-31 corresponding to the state 31 obtains a path metric $sm_{31}+bm_{031}$ of a path arriving at the state 03 via the state 31 by adding a state metric $sm_{31}$ and the branch metric $bm_{031}$ of the branch from the state 31 to the state 03, and the path metric $sm_{31}+bm_{031}$ is supplied to an ACS unit 330-03 (not illustrated) corresponding to the state 03.

Similarly, the adder ADD31 obtains a path metric $sm_{31}+bm_{131}$ of a path arriving at the state 13 via the state 31 by adding the state metric $sm_{31}$ and a branch metric $bm_{131}$ of a branch from the state 31 to the state 13, and the path metric $sm_{31}+bm_{131}$ is supplied to an ACS unit 330-13 corresponding to the state 13.

Further, the adder ADD31 obtains a path metric $sm_{31}+bm_{231}$ of a path arriving at the state 23 via the state 31 by adding the state metric $sm_{31}$ and a branch metric $bm_{231}$ of the branch from the state 31 to the state 23, and the path metric $sm_{31}+bm_{231}$ is supplied to an ACS unit 330-23 (not illustrated) corresponding to the state 23.

The adder ADD31 obtains a path metric $sm_{31}+bm_{331}$ of a path arriving at the state 33 via the state 31 by adding the state metric $sm_{31}$ and a branch metric $bm_{331}$ of the branch from the state 31 to the state 33, and the path metric $sm_{31}+bm_{331}$ is supplied to an ACS unit 330-33 (not illustrated) corresponding to the state 33.

The Viterbi decoder 320 has a function of performing branch metric calculation, and the branch metric $bm_{p'pq}$ obtained by the function is supplied to the adder $ADD_{pq}$.

FIG. 32 is a diagram illustrating an example of an operation of the Viterbi decoder 320.

An operation of the Viterbi decoder 320 in FIG. 31 will be described with reference to FIG. 32 by giving an example of state transition to the state 31 when the multilevel codes $b_t=3$ which is a provisional decoding result at the latest time t is assumed.

When the quaternary codes $b_t=3$ which is a provisional decoding result at the time t, states at the immediately previous time t−1 of the time at which the state transition to the state 31 is possible are the states 10, 11, 12, and 13.

FIG. 32 illustrates information regarding the states 10, 11, 12, and 13 at the time t−1.

In FIG. 32, a "provisional decoding result" indicates a line of the multilevel codes $b_t=3$ which is the provisional decoding result at the latest time t and storage content of the path memory $PM_{pq}$ of the state pq at the time t−1 (the ACS unit 330-pq corresponding to the state pq), that is, a quaternary code sequence $PM_{pq}$ which is a provisional decoding result.

The path memory $PM_{pq}$ stores a time-series of the quaternary code sequences which are provisional decoding results before the time t−1.

FIG. 32 illustrates a specific example of the line of the multilevel codes $b_t=3$ and the quaternary code sequence $PM_{pq}$ which are the provisional decoding result to the right of the "provisional decoding result."

In FIG. 32, for example, a specific example {310-231 . . . } of a provisional decoding result of the state 10 indicates quaternary codes $b_t=3$ which are a provisional decoding result at the time t, quaternary codes $b_{t-1}=1$ which are a provisional decoding result at the time t−1, quaternary codes $b_{t-2}=0$ which are a provisional decoding result at the time t−2, quaternary codes $b_{t-3}=2$ which are a provisional decoding result at the time t−3, quaternary codes $b_{t-4}=3$ which are a provisional decoding result at the time t−4, quaternary codes $b_{t-5}=1$ which are a provisional decoding result at the time t−5, . . . .

The path memory $PM_{pq}$ of the state pq at the time t can store quaternary codes which are provisional decoding results at dly times until a time t−(dly−1) going back from the time t. dly represents a path memory length, that is, the number (maximum number) of the quaternary codes which can be stored by the path memory $PM_{pq}$ and is for example, M+N or more.

In FIG. 32, an "equalized reference address" is an address of a storage region where the equalized reference level $r_t(s_i, s_j)+\Delta r_t(b_t)$ read from the storage unit that stores the equalized reference level $r_t(s_i, s_j)+\Delta r_t(b_t)$ (and $r_{t-len}(s_i, s_j)+\Delta r_t(b_{t-len})$) at the whitened reference level MR4 ($r_t(s_i, s_j)+\Delta r_t(b_t)-\Sigma[p_{len}\times\{r_{t-len}(s_i, s_j)+\Delta r_t(b_{t-len})\}]$) of Expression (9) used for the branch metric calculation is stored.

As will be described below in detail, an equalized reference storage unit which is the storage unit that stores the equalized reference level $r_t(s_i, s_j)+\Delta r_t(b_t)$ has a storage region where the equalized reference level $r_t(s_i, s_j)+\Delta r_t(b)$ at which a value is updated from an initial value obtained through convolution calculation with an extended PR feature (convolution calculation with an impulse response of the extended PR) is stored.

The storage region of the equalized reference storage unit serves as an address at a storage value of the path memory $PM_{pq}$ that stores the quaternary code sequence corresponding to a path arriving at a state.

$PM_{pq}(t1:t2)$ represents a quaternary code sequence of quaternary codes bt1 and bt2 which are provisional decoding results at times t1 and t2 stored in the path memory $PM_{pq}$ of the state pq.

For example, in the equalized reference storage unit, the equalized reference level $r_t(s_i, s_j)+\Delta r_t(b_t)$ used for branch metric calculation of a branch from the state 10 to the state 31 is read from a storage region addressed at the equalized reference address {31023} by using the quaternary code sequence {31023} in which the multilevel codes $b_t=3$ which is the provisional decoding result at the latest time t is added to the head (the most significant cell) of a quaternary code sequence $PM_{pq}(t-1:t-(M-1))=PM_q(t-1:t-(5-1))=\{1023\}$ which is a provisional decoding result stored in the path memory PM10 of the state 10 at the time t−1 as that equalized reference address.

In FIG. 32, the "initial value" to the right of the "equalized reference address" indicates an initial value of the equalized reference level $r_t(s_i, s_j)+\Delta r_t(b_t)$ stored in the storage region of the equalized reference storage unit addressed with the equalized reference address. The initial value of the equalized reference level $r_t(s_i, s_j)+\Delta r_t(b_t)$ can be obtained through convolution calculation of the extended PR feature and a sequence of an NRZ multilevel values which is an NRZ expression of the quaternary code sequence serving as the equalized reference address.

In FIG. 32, the "whitened reference address" is an address of a storage region where the whitened reference level MR4 read from the storage unit that stores the whitened reference level MR4 ($r_t(s_i, s_j)+\Delta r_t(b_t)-\Sigma[p_{len}\times\{r_{t-len}(s_i, s_j)+\Delta r_t(b_{t-len})\}]$) of Expression (9) used for the branch metric calculation is stored.

As will be described below in detail, the whitened reference storage unit serving as the storage unit that stores the whitened reference level MR4 has a storage region where the whitened reference level MR4 in which a value is updated from an initial value obtained through the convolution calculation with the extended PR feature is stored.

The storage region of the whitened reference storage unit is addressed with a storage value of the path memory $PM_{pq}$ storing the quaternary code sequence corresponding to a path arriving at a state as in the equalized reference storage unit.

For example, in the whitened reference storage unit, the whitened reference level MR4 used for branch metric calculation of a branch from the state 10 to the state 31 is read from a storage region addressed at the whitened reference address {310231} by using the quaternary code sequence {310231} in which the multilevel codes $b_t=3$ which is the provisional decoding result at the latest time t is added to the head of a quaternary code sequence $PM_{pq}(t-1:t-(M+N-1))=PM_{pq}(t-1:t-(5+1-1))=\{10231\}$ which is a provisional decoding result stored in the path memory PM10 of the state 10 at the time t−1 as that whitened reference address.

In FIG. 32, the "initial value" to the right of the "whitened reference address" indicates an initial value of the whitened reference level MR4 stored in the storage region of the whitened reference storage unit addressed with the whitened reference address. The initial value of the whitened reference level MR4 can be obtained using the initial value of the equalized reference level $r_t(s_i, s_j)+\Delta r_t(b_t)$ obtained through convolution calculation with the extended PR feature.

In FIG. 32, a "branch metric" indicates branch metrics $bm_{310}, bm_{311}, bm_{312}$, and $bm_{313}$ of branches from the states 10, 11, 12, and 13 to the state 31.

For example, it is assumed that the whitened signal $z_t$ at the time t is 1.5 and the whitened reference level MR4 is an initial value.

As indicated in Expression (9), since the branch metric calculation is calculation of a square of a difference between the whitened signal $z_t$ and the whitened reference level MR4, the branch metrics $bm_{310}$, $bm_{311}$, $bm_{312}$, and $bm_{313}$ of the branches can be obtained as follows.

$$bm_{310}=\lambda_t(s_{10},s_{31})=(1.5-(-1.445))2=8.673025$$

$$bm_{311}=\lambda_t(s_{11},s_{31})=(1.5-0.505)2=0.990025$$

$$bm_{312}=\lambda_t(s_{12},s_{31})=(1.5-1.507)2=4.9E-05$$

$$bm_{313}=\lambda_t(s_{13},s_{31})=(1.5-3.861)2=5.574321$$

In FIG. 32, a "state metric" indicates a state metric $sm_{pq}$ of the state pq stored in the state metric memory $SM_{pq}$ of the state pq. In FIG. 32, state metrics $sm_{10}$, $sm_{11}$, $sm_{12}$, and $sm_{13}$ are 2.1341, 4.6109, 0.0221, and 3.2319, respectively.

In FIG. 32, a "path metric" indicates path metrics $sm_{10}+bm_{310}$, $sm_{11}+bm_{311}$, $sm_{12}+bm_{312}$, and $sm_{13}+bm_{313}$ of the paths arriving at the state 31 via the states 10, 11, 12, and 13, respectively.

The path metric of a path arriving at the state p'p via the state pq can be obtained as follows by adding the state metric $sm_{pq}$ of the state pq and the branch metric $bm_{p'pq}$ of a branch from the state pq to the state p'p.

a path metric of a path arriving the state 31 via the state 10

$$sm_{10}+bm_{310}=2.13141+8.673025=10.807125$$

a path metric of a path arriving the state 31 via the state 11

$$sm_{11}+bm_{311}=4.6109+0.990025=5.600925$$

a path metric of a path arriving the state 31 via the state 12

$$sm_{12}+bm_{312}=0.0221+4.9E-05=0.022149$$

a path metric of a path arriving the state 31 via the state 13

$$sm_{13}+bm_{313}=3.2319+5.574321=8.806221$$

The Viterbi decoder 320 obtains each of the path metrics $sm_{10}+bm_{310}$, $sm_{11}+bm_{311}$, $sm_{12}+bm_{312}$, and $sm_{13}+bm_{313}$, as described, in the adders ADD10, ADD11. ADD12, and ADD13 of the states 10, 11, 12, and 13.

The path metrics $sm_{10}+bm_{310}$, $sm_{11}+bm_{311}$, $sm_{12}+bm_{312}$, and $sm_{13}+bm_{313}$ are supplied from the adders ADD10, ADD11, ADD12, and ADD13 of the states 10, 11, 12, and 13 to the selector $SEL_{31}$ of the state 31.

The path metric $sm_{12}+bm_{312}=0.022149$ which is the minimum path metric among the path metrics $s_{10}+bm_{310}$, $sm_{11}+bm_{311}$, $sm_{12}+bm_{312}$, and $sm_{13}+bm_{313}$ to be supplied to the selector $SEL_{31}$ of the state 31 is selected and is supplied to the state metric memory SM31.

The state metric memory SM31 of the state 31 stores the minimum path metric $sm_{12}+bm_{312}=0.022149$ from the selector $SEL_{31}$ as the state metric $sm_{31}$ of the state 31.

Further, the path memory PM31 of the state 31 is updated to a quaternary code sequence obtained by adding a multilevel code which is a provisional decoding result at the latest time t to the sequence of dly−1 quaternary codes which is a provisional decoding result which is stored in the path memory PM12 of the state 12 and passes immediately before arrival at the state 31 in the path in which the minimum path metric $sm_{12}+bm_{312}=0.022149$ selected by the selector $SEL_{31}$ is obtained.

That is, the path memory PM31 of the state 31 is updated to a sequence of dly quaternary codes obtained by adding the multilevel codes $b_t=3$ which is the provisional decoding result at the latest time t to the head of the quaternary code sequence PM12 (t−1:t−(dly−1)) which is the provisional decoding result stored in the path memory PM12 of the state 12.

Figure 33:
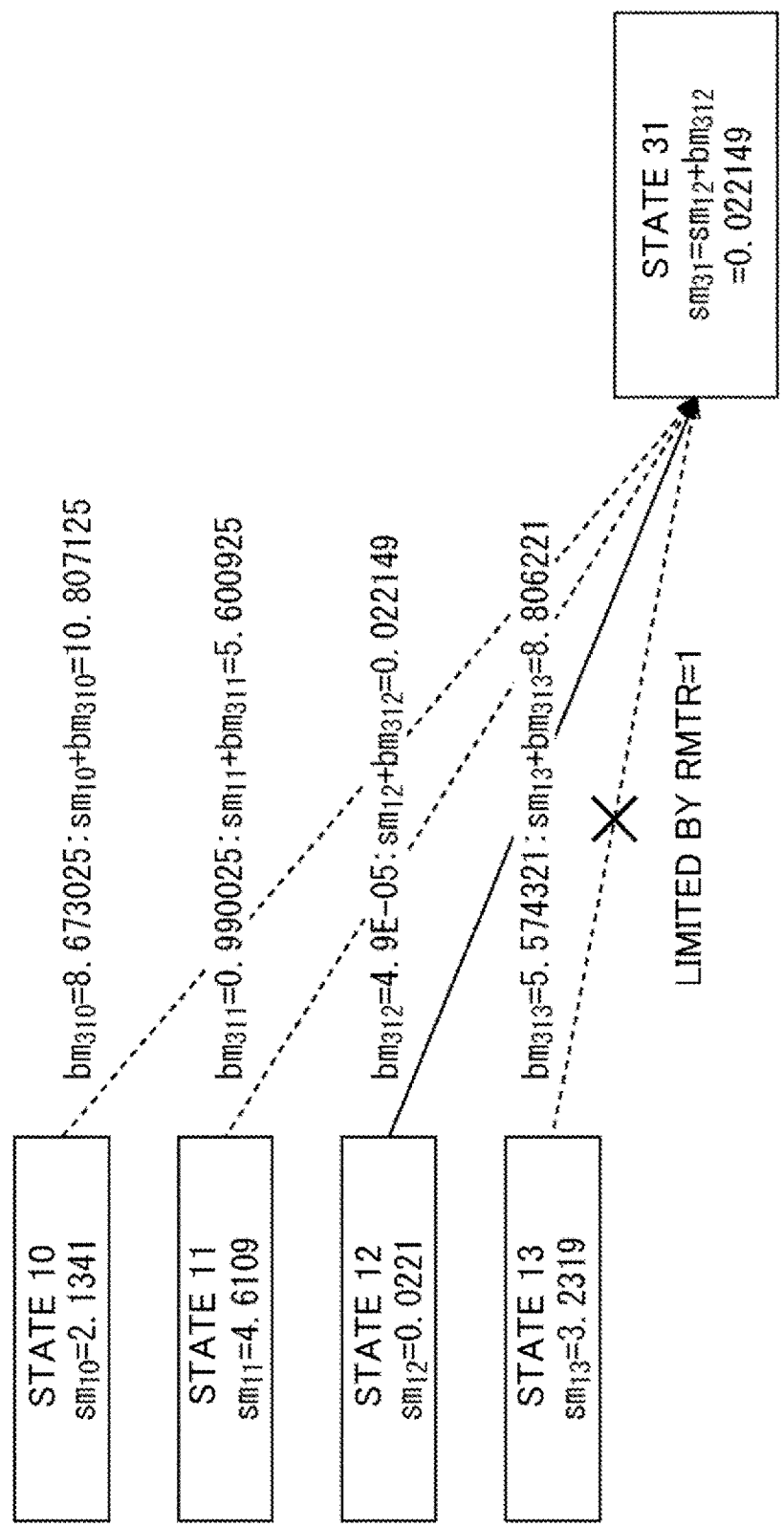
FIG. 33 is a diagram further illustrating the example of the operation of the Viterbi decoder 320.

FIG. 33 is a diagram further illustrating the example of the operation of the Viterbi decoder 320.

FIG. 33 illustrates any of aspects of the paths (branches) arriving at the state 31 in the case of the quaternary codes $b_t=3$ which are the provisional decoding result at the time t.

In the case of the quaternary codes $b_t=3$ which are the provisional decoding result at the time t, the path arriving at the state 31 passes through any of the states 10, 11, 12, and 13.

In FIG. 33, for the states 10, 11, 12, and 13, the state metrics $sm_{10}$, $sm_{11}$, $sm_{12}$, and $sm_{13}$ described in FIG. 32 and the path metrics $sm_{10}+bm_{310}$, $sm_{11}+bm_{311}$, $sm_{12}+bm_{312}$, and $sm_{13}+bm_{313}$ of the paths arriving at the state 31 are illustrated.

Further, as illustrated in FIG. 33, the path metric $sm_{12}+bm_{312}=0.022149$ which is the minimum path metric is selected, as indicated by a solid line of the drawing, of the path metrics $sm_{10}+bm_{310}$, $sm_{11}+bm_{311}$, $sm_{12}+bm_{312}$, and $sm_{13}+bm_{313}$ and becomes the state metric $sm_{31}$ of the state 31.

In FIG. 32, the quaternary code sequence which is the provisional decoding result stored in the path memory PM13 of the state 13 at the time t−1 is {13120 . . . }.

In the case of the quaternary codes $b_t=3$ which is the provisional decoding result at the time t, when the path arriving at the state 31 at the time t via the state 13 at the time t−1 is selected (the path metric $sm_{13}+bm_{313}$ of the path arriving at the state 31 is selected as the state metric $sm_{31}$ of the state 31), the provisional decoding result corresponding to that path is the quaternary code sequence {313120 . . . } in which the quaternary codes $b_t=3$ which are the provisional decoding result at the time t are added to the head of the quaternary code sequence {13120 . . . } which is the provisional decoding result stored in the path memory PM13 of the state 13.

For 3131 of the head portion of the quaternary code sequence {313120 . . . }RMTR=2 is set.

In this case, as described in FIG. 30, since the RMTR is limited to 1 or less, the quaternary code sequence 3131 of RMTR=2 cannot be taken as a decoding result of the Viterbi decoding.

Therefore, the branch from the state 13 to the state 31 can be limited as indicated by x in FIG. 33.

When the branch from the state 13 to the state 31 is limited, the selector $SEL_{31}$ of the state 31 selects the path metric $sm_{12}+bm_{312}=0.022149$ which is the minimum path metric among the path metrics $sm_{10}+bm_{310}$, $sm_{11}+bm_{311}$, and $sm_{12}+bm_{312}$ except for the path metric $sm_{13}+bm_{313}$ of the path including the limited branch among the path metrics $sm_{10}+bm_{310}$, $sm_{11}+bm_{311}$, $sm_{12}+bm_{312}$, and $sm_{13}+bm_{313}$.

As described in FIG. 30, the trellis state and the branch (the state transition) can be limited by an encoding rule of encoding to multilevel codes (an encoding rule of multilevel codes), for example, the minimum travel length d or the RMTR, to perform the Viterbi decoding.

Here, the limitation of a certain state pq of the trellis includes non-provision of the ACS unit 330-pq corresponding to the state pq and non-use of the ACS unit 330-pq despite the provision of the ACS unit 330-pq in the Viterbi decoder 320. Similarly, the limitation of the branch includes non-provision of a connection line corresponding to the branch among the connection lines between the ACS units 330-$pq$ in the Viterbi decoder 320 and non-selection of a path metric supplied from that connection line despite the provision of the connection line.

The limitations of the state pq of the trellis and the branch include non-use of the ACS unit 330-$pq$ corresponding to the state pq despite provision of the ACS unit 330-$pq$ and non-selection of the path metric supplied from the connection line corresponding to the limited branch despite provision of the connection line between the ACS unit 330-$pq$ corresponding to the branch. Thus, when the encoding rule is changed, countermeasures can be taken easily through the limitations of the state and the branch by the changed encoding rule without remanufacturing the Viterbi decoder 320.

Figure 34:
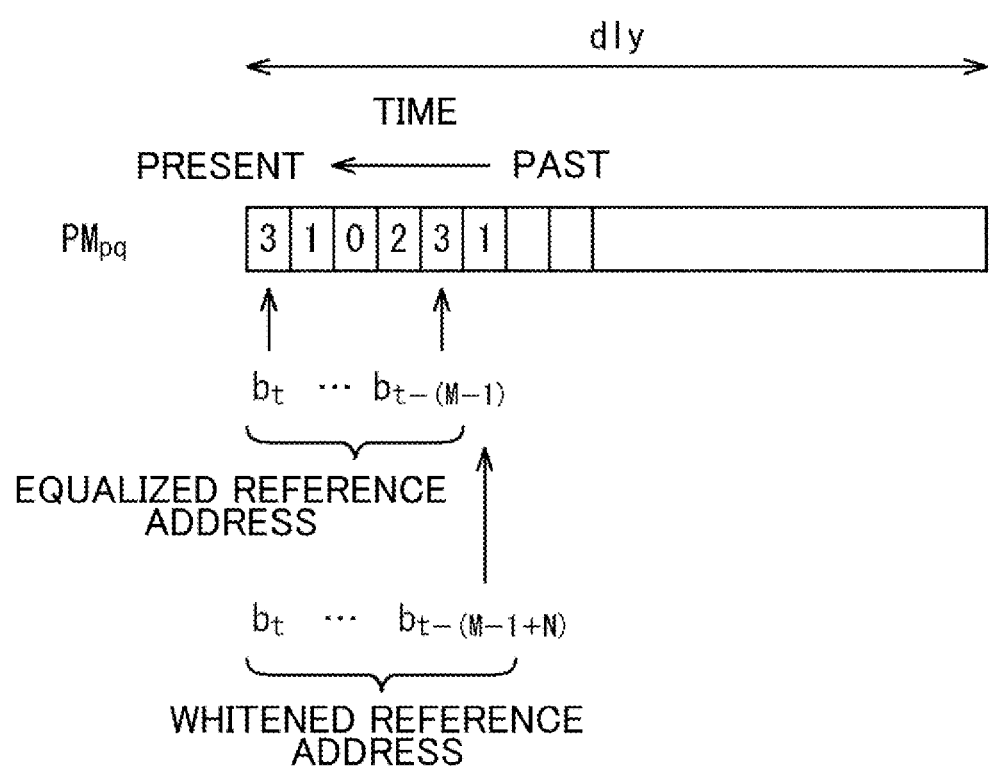
FIG. 34 is a diagram illustrating an exemplary configuration of a path memory $PM_{pq}$ of an ACS unit 330-$pq$.

FIG. 34 is a diagram illustrating an exemplary configuration of a path memory $PM_{pq}$ of an ACS unit 330-$pq$.

The path memory $PM_{pq}$ is configured with a memory capable of storing dly quaternary codes.

In FIG. 34, path memory $PM_{pq}$ stores quaternary codes $b_t$ which are the provisional decoding result of the latest time t at the left end and sequentially stores quaternary codes $b_{t-1}$, $b_{t-2}$, . . . , and $b_{t-(dly-1)}$ which are provisional decoding results of the past times t–1, t–2, . . . , and t–(tly–1) toward the right.

As described in FIG. 32, the quaternary code sequence which is the provisional decoding result stored in the path memory PMpg serves as addresses when the equalized reference level $r_t(s_i, s_j)+\Delta r_t(b_t)$ used for the branch metric calculation and the whitened reference level MR4 of Expression (9) are read from the equalized reference storage unit and the whitened reference storage unit.

That is, the quaternary code sequence $PM_{pq}(t:t-(M-1))=\{b_t, b_{t-1}, \ldots, b_{t-(M-1)}\}$ from the head to an M-th of the provisional decoding result stored in the path memory $PM_{pq}$ serves as an address of the equalized reference level $r_t(s_i, s_j)+\Delta r_t(b_t)$.

The quaternary code sequence $PM_{pq}(t:t-(M+N-1))=\{b_t, b_{t-1}, \ldots, b_{t-(M+N-1)}\}$ from the head to an M+N-th of the provisional decoding result stored in the path memory $PM_{pq}$ serves as an address of the whitened reference level MR4.

Figure 35:
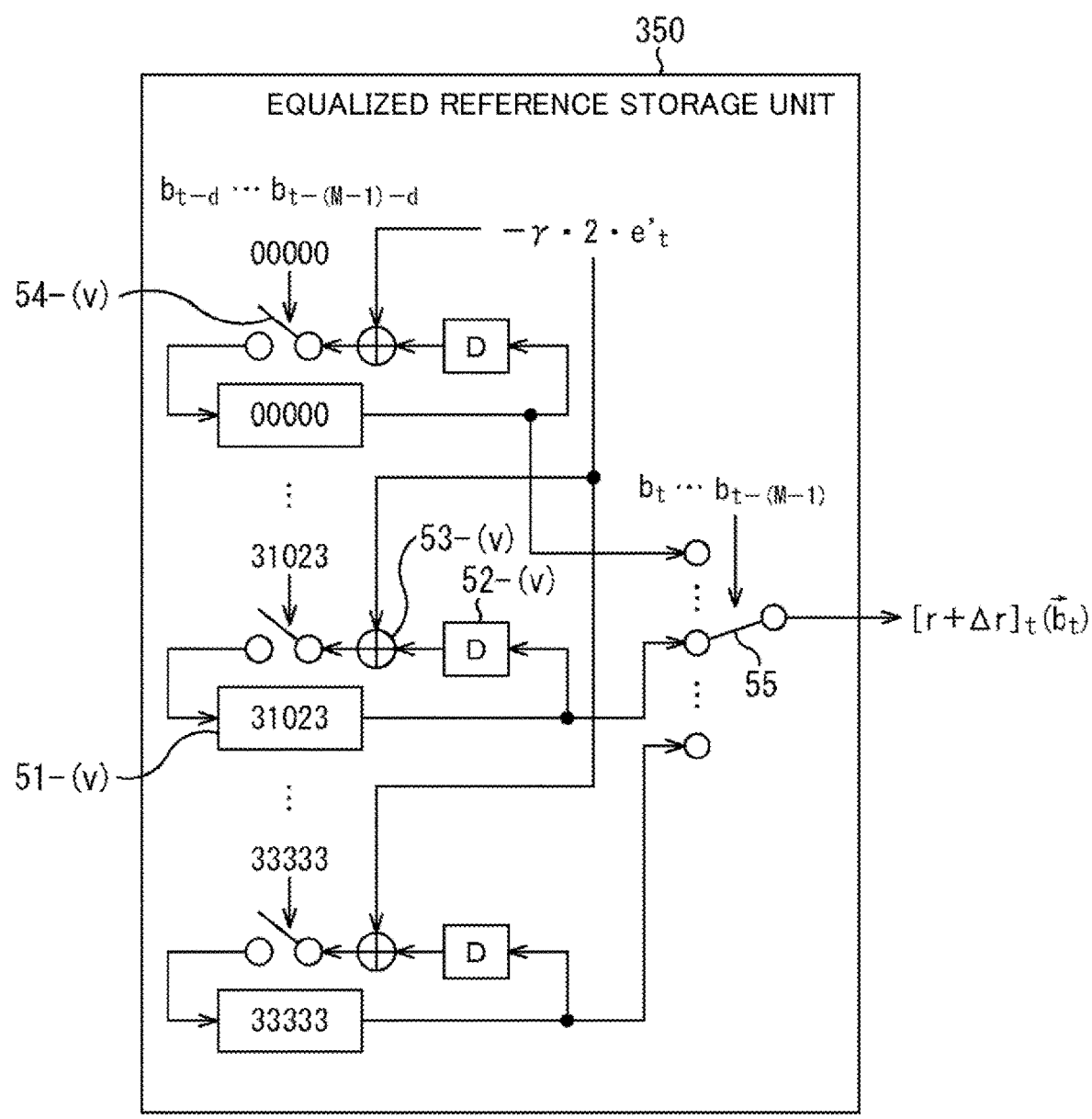
FIG. 35 is a diagram illustrating an exemplary configuration of an equalized reference storage unit storing an equalization reference level $r_t(s_i, s_j)+\Delta r_t(b_t)$.

FIG. 35 is a diagram illustrating an exemplary configuration of an equalized reference storage unit storing the equalization reference level $r_t(s_i, s_j)+\Delta r_t(b_t)$.

An equalized reference storage unit 350 is provided in, for example, the detection unit 16 (see FIG. 25).

Here, in the multi-input adaptive equalization unit 14, a len-th tap coefficient $f_{clen}(C_{len})$ of the signal channel c (the adaptive equalizer 20+c) is updated based on a least mean square (LMS) algorithm so that an error of a square of the equalized error $e'_t$ obtained by the equalized error calculation unit 18 is minimized.

The equalized error calculation unit 18 calculates the equalized error $e'_t$ which is a difference between the equalized reference level $r_t(s_i, s_j)+\Delta r_t(b_t)$ and the equalized signal $y'_t$ output by the multi-input adaptive equalization unit 14 and supplied at a timing adjusted by the delay unit 17. Then, the equalized error calculation unit 18 supplies the equalized error $e'_t$ to the adaptive equalizers 21 to 24 of the multi-input adaptive equalization unit 14 in order to control the tap coefficient $f_{clen}$.

The equalized reference level $r_t(s_i, s_j)+\Delta r_t(b_t)$ is addressed with the quaternary code sequence $PM_{pq}(t:t-(M-1))=\{b_t, b_{t-1}, \ldots, b_{t-(M-1)}\}$ which are the provisional decoding results stored in the path memory $PM_{pq}$ and is read from the equalized reference storage unit 350.

The equalized error $e'_t$ can be output from the multi-input adaptive equalization unit 14 and can be obtained as a difference between an equalized reference level rt–d($s_i$, $s_j$)+$\Delta r_t(b_{t-d})$ and an equalized signal $y'_t$–d of which the timing is adjusted by delaying the time d in the delay unit 17 by Expression (10).

[Math. 10]

$$e'_t = y'_{t-d} - [r+\Delta r](\vec{b}_{t-d}) \tag{10}$$

$[r+\Delta r](b_{t-d})$ represents the equalized reference level rt–d ($s_i$, $s_j$)+$\Delta r_t(b_{t-d})$ addressed with a time-series of lines of M provisional decoding results before a time t–d at which quaternary codes $b_{t-d}$ which are the provisional decoding result in the equalized reference storage unit 350 is the head.

In the embodiment, an equalized reference level $[r+\Delta r](b_t)$ stored in the equalized reference storage unit 350 is cyclically updated based on a gradient method by Expression (11).

[Math. 11]

$$[r+\Delta r]_{t+1}(\vec{b}t) = [r+\Delta r]_t(\vec{b}_t) - \gamma \cdot 2 \cdot e'_t \tag{11}$$

$[r+\Delta r]_t(b_t)$ represents an equalized reference level $[r+\Delta r]$ $(b_t)$ at a certain time t. $[r+\Delta r]_{t+1}(b_t)$ represents an equalized reference level $[r+\Delta r](b)$ at a subsequent time t+1, that is, the updated equalized reference level $[r+\Delta r](b_t)$.

y represents an updating coefficient for adjusting how much the equalized reference level $[r+\Delta r](b_t)$ is updated at the time of updating.

In the equalized reference storage unit 350, the equalized reference level $[r+\Delta r](b_t)$ is updated in accordance with the equalized error $e'_t$ so that an error of a square of the equalized error $e'_t$ is minimized by Expression (11).

The equalized reference storage unit 350 includes ML^M=4^5 storage regions 51-($v$), delay units 52-($v$), adders 53-($v$), switches 54-($v$), and one switch 55. ($v$) represents an ML=4 base of M=5 digits, that is, the quaternary code sequence of 5 cells. Accordingly, here, ($v$) takes a value (an integer value) in the range of 00000 to 33333 as the ML=4 base.

The storage region 51-($v$) is a storage region designated using the quaternary code sequence ($v$) of 5 cells as an address. The storage region 51-($v$) stores the equalized reference level $[r+\Delta r](b_t)$ updated by Expression (11).

The delay unit 52-($v$) delays the equalized reference level $[r+\Delta r](b_t)$ stored in the storage region 51-($v$) by one time and supplies the delayed equalized reference level $[r+\Delta r](b_t)$ to the adder 53-($v$).

The adder 53-($v$) adds the equalized reference level $[r+\Delta r]$ $(b_t)$ supplied from the delay unit 52-($v$) and $-\gamma \times 2 \times e'_t$ obtained from the equalized error $e'_t$ supplied from the equalized error calculation unit 18. The adder 53-($v$) supplies an added value $[r+\Delta r](b_t) - \gamma \times 2 \times e'_t$ obtained through the addition as an updated equalized reference level $[r+\Delta r](b_t)$ to the switch 54-($v$).

The switch 54-($v$) is turned on when the quaternary code sequence $PM_{pq}(t-d:t-(M-1)-d)=\{b_{t-d}, b_{t-1-d}, \ldots, b_{t-(M-1)-d}\}=\{b_{t-d}, b_{t-1-d}, b_{t-2-d}, b_{t-3-d}, b_{t-(5-1)-d}\}$ of M=5 cells which are the provisional decoding results stored in the path memory $PM_{pq}$ is ($v$). When the switch 54-($v$) is turned on, the updated equalized reference level $[r+\Delta r](b_t)$ supplied from the adder 53-($v$) is supplied to the storage region 51-($v$) and is stored in an overwritten form. Thus, the equalized reference level $[r+\Delta r](b_t)$ stored in the storage region 51-($v$) is updated.

When the quaternary code sequence $PM_{pq}(t:t-(M-1))=\{b_t, b_{t-1}, \ldots, b_{t-(M-1)}\}=\{b_t, b_{t-1}, b_{t-2}, b_{t-3}, b_{t-(5-1)}\}$ of M=5 cells which are the provisional decoding results stored in the path memory $PM_{pq}$ is (v), the switch 55 selects the storage region 51-(v) and reads the equalized reference level [r+Δr](b$_t$) stored in the storage region 51-(v) is read.

Accordingly, the provisional decoding result stored in the path memory $PM_{pq}$ is used as an address at which the equalized reference level [r+Δr](b$_t$) stored in the storage region 51-(v) is read.

In the switch 55 the equalized reference level [r+Δr](b$_t$) read from the storage region 51-(v) is used, for example, to calculate the equalized error e'$_t$ or the whitened reference level MR4.

In the equalized reference storage unit 350 with the above-described configuration, an initial value of the equalized reference level [r+Δr](b$_t$) is set and stored in the storage region 51-(v).

The initial value of the equalized reference level [r+Δr](b$_t$) stored in the storage region 51-(v) can be obtained through convolution calculation of $a_t \times c_0 + a_{t-1} \times c_1 + \ldots + a_{t-(M-1)} \times c_{M-1}$ of the sequence of the NRZ multilevel values $\{a_t, a_{t-1}, \ldots, a_{t-(M-1)}\}$ which is an NRZ expression of the quaternary code sequence $\{b_t, b_{t-1}, \ldots, b_{t-(M-1)}\}$ indicated by (v) and the PR coefficient $\{c_0, c_1, \ldots, c_{M-1}\}$ of the extended PR.

In this case, here, the PR coefficient $c_m$ of the extended PR is $\{c_0, c_1, c_2, c_3, c_4\} = \{1, 2, 1, 0.2, 0.1\}$, as described in FIG. 30.

When the quaternary code sequence $\{b_t, b_{t-1}, \ldots, b_{t-(M-1)}\} = \{b_t, b_{t-1}, b_{t-2}, b_{t-3}, b_{t-(5-1)}\}$ indicated by (v) is, for example, $\{3, 1, 0, 2, 3\}$, the sequence of the NRZ multilevel values $\{a_t, a_{t-1}, a_{t-2}, a_{t-3}, a_{t-(5-1)}\}$ corresponding to $\{3, 1, 0, 2, 3\}$ is $\{3, -1, -3, 1, 3\}$.

In this case, a convoluted value obtained through the convolution calculation of the sequence of the NRZ multilevel values $\{3, -1, -3, 1, 3\}$ corresponding to the quaternary code sequence $\{3, 1, 0, 2, 3\}$ indicated by (v) and the extended PR feature $\{1, 2, 1, 0.2, 0.1\}$ is $3 \times 1 + (-1) \times 2 + (-3) \times 1 + 1 \times 0.2 + 3 \times 0.1 = -1.5$. The convoluted value $-1.5$ is stored as an initial value of the equalized reference level [r+Δr](b$_1$) in a storage region 51-31023.

The equalized reference level [r+Δr](b$_t$) stored in the storage region 51-(v) is cyclically updated from the initial value stored in this way.

That is, the adder 53-(v) is supplied with the equalized reference level [r+Δr]$_t$(b$_t$) stored in the storage region 51-(v) and delayed by one time in the delay unit 52-(v).

The adder 53-(v) adds the equalized reference level [r+Δr]$_t$ (b$_t$) supplied from the delay unit 52-(v) and $-\gamma \times 2 \times e'_t$ obtained from the equalized error et supplied from the equalized error calculation unit 18. The adder 53-(v) supplies an added value [r+Δr]$_{t+1}$(b$_t$)=[r+Δr]$_t$(b$_t$)$-\gamma \times 2 \times e'_t$ of the Expression (11) obtained through the addition as an updated equalized reference level [r+Δr]$_{t+1}$(b$_t$) to the switch 54-(v).

On the other hand, the switch 54-(v) is turned on at a timing at which the quaternary code sequence $PM_{pq}(t-d:t-(M-1)-d) = \{b_{t-d}, b_{t-1-d}, \ldots, b_{t-(M-1)-d}\} = \{b_{t-d}, b_{t-1-d}, b_{t-2-d}, b_{t-3-d}, bt-(5-1)-d\}$ of M=5 cells which are the provisional decoding results stored in the path memory $PM_{pq}$ is (v).

When the switch 54-(v) is turned on, the updated equalized reference level [r+Δr]$_{t+1}$(b$_t$) supplied from the adder 53(v) is supplied to the storage region 51-(v) and is stored in an overwritten form. Thus, the equalized reference level [r+Δr]$_t$(b$_t$) stored in the storage region 51-(v) is updated to the equalized reference level [r+Δr]$_{t+1}$(b$_t$).

At a timing at which the quaternary code sequence $PM_{pq}(t:t-(M-1)) = \{b_t, b_{t-1}, \ldots, b_{t-(M-1)}\} = \{b_t, b_{t-1}, bt-2, bt-3, bt-(5-1)\}$ of M=5 cells which are the provisional decoding results stored in the path memory $PM_{pq}$ is (v), the switch 55 selects the storage region 51-(v) and reads the equalized reference level [r+Δr]$_t$(b$_t$) stored in the storage region 51-(v).

Accordingly, the provisional decoding result $\{b_t, b_{t-1}, \ldots, b_{t(M-1)}\}$ stored in the path memory $PM_{pq}$ is set as an address and the equalized reference level [r+Δr]$_t$(b$_t$) is read from the storage region 51-(v) designated with the address $\{b_t, b_{t-1}, \ldots, b_{t-(M-1)}\}$.

Then, the equalized reference level [r+Δr]$_t$(b$_t$) read from the storage region 51-(v) is used, for example, to calculate the equalized error e'$_t$ or the whitened reference level MR4.

Here, when a branch from a state $s_i$ to a state $s_j$ is limited by the encoding rule, an access, that is, a storage region in which reading or the like of the equalized reference level [r+Δr]$_t$(b$_t$) is limited (not performed), is generated in the storage region 51-(v) addressed with the quaternary code sequence of M=5 cells including the quaternary code sequence which is the provisional decoding result corresponding to that branch.

The whitened reference level MR4 calculated using the equalized reference level [r+Δr]$_t$(b$_t$ read from the storage region 51-(v) is used for the branch metric calculation of Expression (9). The equalized error e'$_t$ is used to update L tap coefficients $f_{clen}$(Clen) of the signal channel c (the adaptive equalizer 20+c) in the multi-input adaptive equalization unit 14 and update N tap coefficients $p_{len}$ of the noise predictor 15.

In consideration that the equalized signal y'$_t$ is expressed in Expression (2), a partial differential value obtained by performing partial differentiation of a square of the equalized error e'$_t$ (square error) expressed in Expression (10) is expressed in Expression (12) with respect to the tap coefficient $f_{clen}$.

[Math. 12]

$$\frac{\partial}{\partial f_{clen}} e'^2_t = 2 \cdot e'_t \cdot x_{c(t-len)} \tag{12}$$

In the multi-input adaptive equalization unit 14, the tap coefficient $f_{clen}$(Clen) of the signal channel c (the adaptive equalizer 20+c) is updated using a partial differential value of Expression (12) by Expression (13).

[Math. 13]

$$f_{clen}(t+1) = f_{clen}(t) - \alpha \cdot 2 \cdot e'_t \cdot x_{c(t-len)} \tag{13}$$

$f_{clen}(t)$ represents a tap coefficient $f_{clen}$ at the time t, that is, the tap coefficient $f_{clen}$ before updating, and $f_{clen}(t+1)$ represents a tap coefficient $f_{clen}$ at the time t+1, that is, the tap coefficient $f_{clen}$ after updating.

α represents an updating coefficient for showing how much the tap coefficient $f_{clen}$ is updated at the time of updating.

In Expression (13), the tap coefficient $f_{clen}$ is updated so that a square error of the equalized error e'$_t$ is minimized in accordance with the equalized error e'$_t$.

Figure 36:
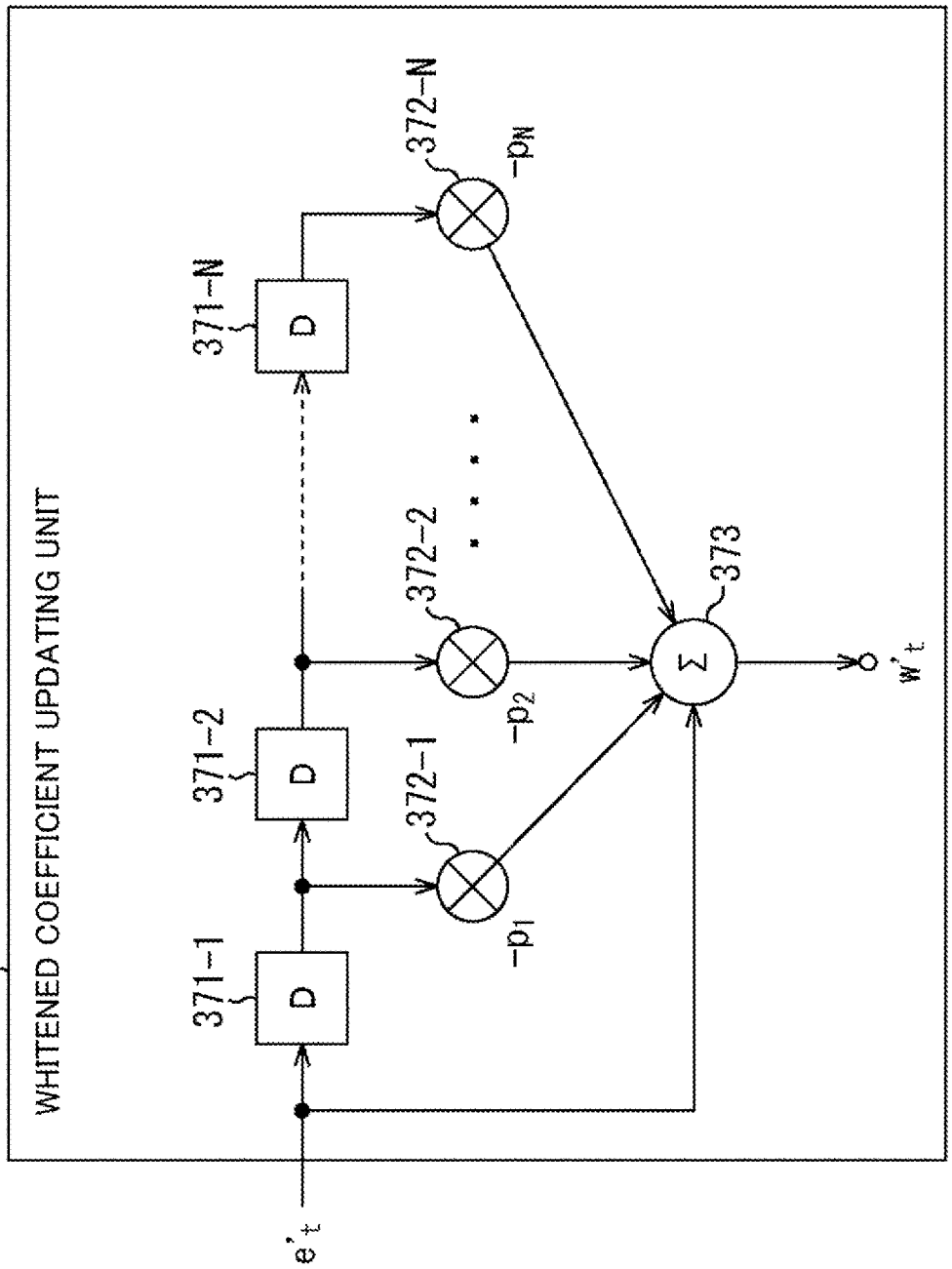
FIG. 36 is a diagram illustrating an exemplary configuration of a whitened coefficient updating unit 19.

FIG. 36 is a diagram illustrating an exemplary configuration of the whitened coefficient updating unit 19.

The whitened coefficient updating unit 19 in FIG. 25 is configured with an FIR filter that includes N-stage delay units 371-1 to 371-N, N multipliers 372-1 to 372-N, and an adder 373, as in the noise predictor 15 illustrated in FIG. 29.

Since the delay unit 371-1, the multiplier 372-1, and the adder 373 are similar to the delay unit 41-1, the multiplier 42-1, and the adder 43 in FIG. 29, description thereof will be omitted.

In the noise predictor 15 in FIG. 29, an input of the delay unit 41-1 is the equalized signal $y'_t$ supplied from the multi-input adaptive equalization unit 14. In the whitened coefficient updating unit 19, however, an input of the delay unit 371-1 is the equalized error $e'_t$ supplied from the equalized error calculation unit 18.

In the noise predictor 15 in FIG. 29, an output of the adder 43 is the whitened signal $z_t$. In the whitened coefficient updating unit 19, an output of the adder 373 is the signal $w'_t$ equivalent to the noise wt of Expression (2).

In the whitened coefficient updating unit 19 in FIG. 36, the signal $w'_t$ is obtained using the equalized error $e'_t$ by Expression (14).

[Math. 14]

$$w'_t = e'_t - \sum_{len=1}^{N} p_{len} \cdot e'_{t-len} \quad (14)$$

The signal $w'_t$ is an error between the equalized error $e'_t$ and the whitened equalized error $e'_t$ obtained by whitening the equalized error $e'_t$ and is also referred to as a whitened error $w'_t$.

A partial differential value obtained by performing partial differentiation of a square of the whitened error $w'_t$ (square error) expressed in Expression (14) is expressed in Expression (15) with respect to the tap coefficient $p_{len}$.

[Math. 15]

$$\frac{\partial}{\partial p_{len}} w'^2_t = -2 \cdot w'_t \cdot e'_{t-len} \quad (15)$$

In the whitened coefficient updating unit 19, the tap coefficient $p_{len}$ is updated using the partial differential value of Expression (15) by Expression (16).

[Math. 16]

$$p_{len}(t+1) = p_{len}(t) + \beta \cdot 2 \cdot w'_t \cdot e'_{t-len} \quad (16)$$

$p_{len}(t)$ represents a tap coefficient $p_{len}$ at the time t, that is, the tap coefficient $p_{len}$ before updating, and $p_{len}(t+1)$ represents the tap coefficient $p_{len}$ at the time t+1, that is, the tap coefficient $p_{len}$ after updating.

β represents an updating coefficient for showing how much the tap coefficient $p_{len}$ is updated at the time of updating.

In Expression (16), the tap coefficient $p_{len}$ is updated so that a square error of the whitened error $w'_t$ is minimized in accordance with the whitened error $w'_t$.

As described above, the tap coefficient $p_{len}$ updated by the whitened coefficient updating unit 19 is supplied to the noise predictor 15 in FIG. 29 and is set. Thus, in the noise predictor 15, the noise wt contained in the equalized signal $y'_t$ of Expression (2) is whitened.

The tap coefficient $p_{len}$ updated by the whitened coefficient updating unit 19 is supplied not only to the noise predictor 15 but also to the detection unit 16. In the detection unit 16, the tap coefficient $p_{len}$ is used for the branch metric calculation of Expression (9), more specifically, for updating of the whitened reference level MR4 used for the branch metric calculation.

Thus, in the detection unit 16, Viterbi decoding appropriate for a state in which the noise predictor 15 is disposed in the front stage of the detection unit 16, that is, the Viterbi decoding to which the NPML is introduced, is realized.

Figure 37:
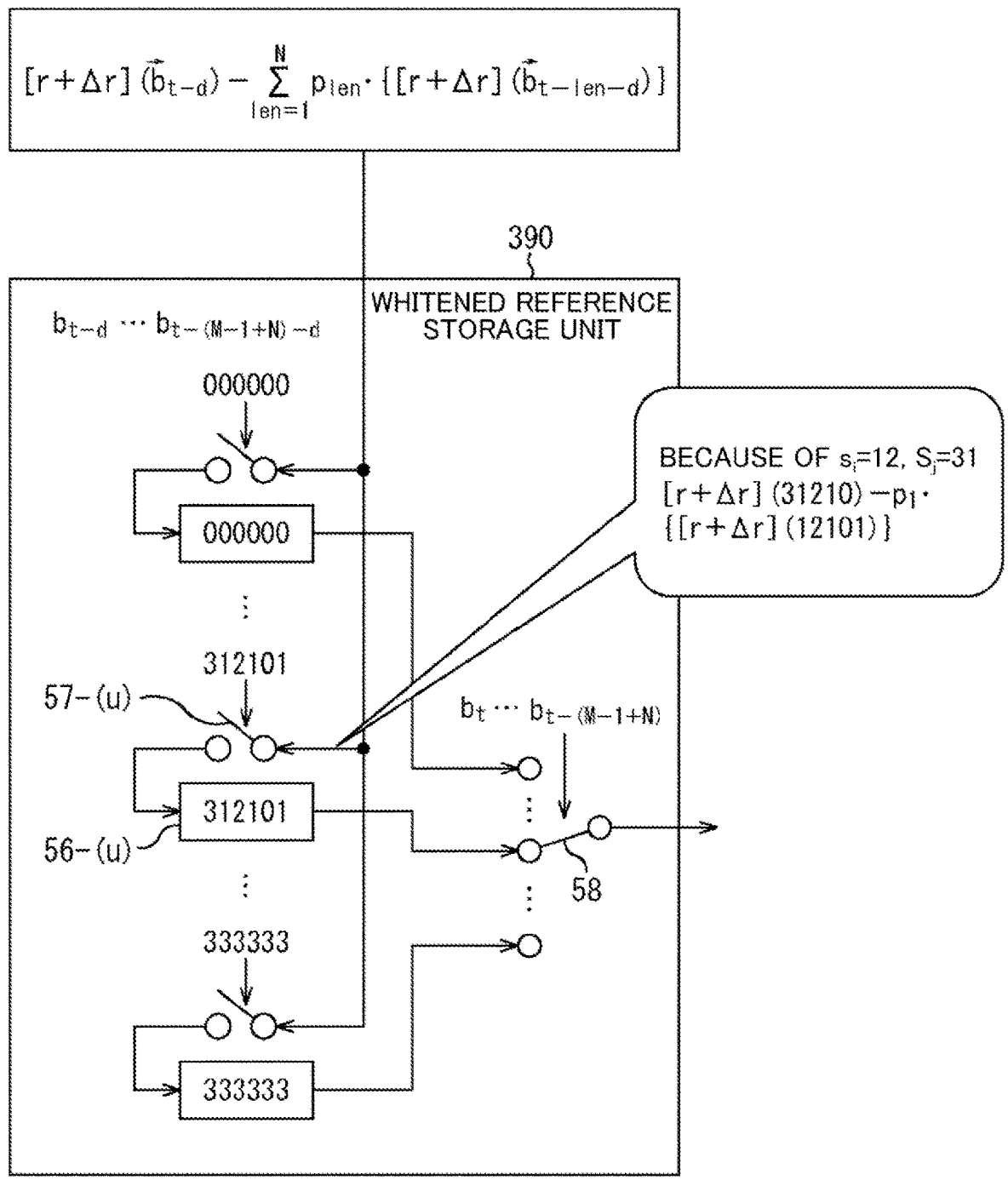
FIG. 37 is a diagram illustrating an exemplary configuration of a whitening reference storage unit storing a whitening reference level MR4.

FIG. 37 is a diagram illustrating an exemplary configuration of a whitened reference storage unit storing a whitening reference level MR4.

The whitened reference storage unit 390 is provided in, for example, the detection unit 16 (see FIG. 25).

In the branch metric calculation of Expression (9), when the whitened reference level MR4 is obtained, many product-sum operations are performed with convolution calculation $\Sigma[p_{len} \times \{r_{t-len}(s_i, s_j) + \Delta r_t(b_{t-len})\}]$ of the tap coefficient $p_{len}$ and the equalized reference level $r_{t-len}(s_i, s_j) + \Delta r_t(b_{t-len})$.

When the detection unit 16 is configured with a digital circuit and Viterbi decoding is performed, it is necessary to operate the digital circuit at a high speed. In such a high-speed operation, it is difficult to complete the calculation of the whitened reference level MR4 within one clock.

Accordingly, the whitened reference storage unit 390 storing the whitened reference level MR4 is provided in the detection unit 16, and the whitened reference level MR4 can be appropriately calculated and stored in the whitened reference storage unit 390.

In this case, the whitened reference level MR4 is addressed with the quaternary code sequence $PM_{pq}(t:t-(M+N-1)) = \{b_t, b_{t-1}, \ldots, b_{t-(M+N-1)}\}$ which are the provisional decoding results stored in the path memory $PM_{pq}$ and is read from the whitened reference storage unit 390. Accordingly, the whitened reference level MR4 necessary for the branch metric calculation can be acquired quickly.

The whitened reference storage unit 390 includes ML^(M+N)=4^(5+1) storage regions 56-(u) and switches 57-(u) and one switch 58. (u) represents an ML=4 base of M+N=5+1=6 digits, that is, the quaternary code sequence of 6 cells. Accordingly, here, (u) takes a value in the range of 000000 to 333333 as the ML=4 base.

The storage region 56-(u) is a storage region designated using the quaternary code sequence (u) of 6 cells as an address. The storage region 56-(u) stores the whitened reference level MR4 updated in accordance with the tap coefficient pie, of the noise predictor 15 by the right-side expression $r_t(s_i, s_j) + \Delta r_t(b_t) - \Sigma\{p_{len} \times \{r_{t-len}(s_i, s_j) + \Delta r_t(b_{t-len})\}\}$ of Expression (9).

Hereinafter, as in the case of FIG. 35, the equalized reference level $r_t(s_i, s_j) + \Delta r_t(b_t)$ is expressed as a variable $[r+\Delta r](b_t)$ that has a vector bt (a time-series line of M provisional decoding results before the time t in which the quaternary code bt which is the provisional decoding result is a head) as an argument.

In this case, the whitened reference level MR4 is expressed as an expression $MR4=[r+\Delta r](b_t) - \Sigma\{p_{len} \times [r+\Delta r](b_{t-len})\}$.

In the embodiment, as described in FIG. 30, because of the number of taps N=1 of the noise predictor 15, the whitened reference level MR4 is expressed an expression $MR4=[r+\Delta r](b) - \Sigma\{p_{len} \times [r+\Delta r](b_{t-len})\} = [r+\Delta r](b_t) - p_1 \times [r+\Delta r](b_{t-1})$.

Here, the detection unit 16 obtains the whitened reference level $MR4=[r+\Delta r](b_{t-d}) - \Sigma\{p_{len} \times [r+\Delta r](b_{t-len-d})\} = [r+\Delta r](b_{t-d}) - p_1 \times [r+\Delta r](b_{t-1-d})$ using the equalized reference level $[r+\Delta r](b_{t-d})$ stored in the equalized reference storage unit 350 (see FIG. 35).

The switch 57-(u) is provided with the whitened reference level $MR4=[r+\Delta r](b_{t-d}) - \Sigma\{p_{len} \times [r+\Delta r](b_{t-len-d})\} = [r+\Delta r](b_{t-d}) - p_1 \times [r+\Delta r](b_{t-1-d})$ obtained by the detection unit 16, as described above.

The switch 57-($u$) is turned on when the quaternary code sequence $PM_{pq}$(t−d:t−(M+N−1)−d)={$b_{t-d}$, $b_{t-1-d}$, . . . , $b_{t-(M+N-1)-d}$}={$b_{t-d}$, $b_{t-1-d}$, $b_{t-2-d}$, $b_{t-3-d}$, $b_{t-4-d}$, $b_{t-(5+1-1)-d}$} of M+N=5+1=6 cells which are the provisional decoding results stored in the path memory $PM_{pq}$ is (u). When the switch 57-($u$) is turned on, the whitened reference level MR4=[r+Δr]($b_{t-d}$)−Σ{$p_{len}$×[r+Δr]($b_{t-len-d}$)}=[r+Δr]($b_{t-d}$)−$p_1$×[r+Δr]($b_{t-1-d}$) supplied from the detection unit 16 is supplied to the storage region 56-($u$) and is stored in an overwritten form. Thus, the whitened reference level MR4 stored in the storage region 56-($u$) is updated.

When the quaternary code sequence $PM_{pq}$(t:t−(M+N−1))= {$b_t$, $b_{t-1}$, . . . , $b_{t-(M+N-1)}$}={$b_t$, $b_{t-1}$, $b_{t-2}$, $b_{t-3}$, $b_{t-4}$, $b_{t-(5+1-1)}$} of M+N=5+1=6 cells which are the provisional decoding results stored in the path memory $PM_{pq}$ is (u), the switch 58 selects the storage region 56-($u$) and reads the whitened reference level MR4 stored in the storage region 56-($u$).

Accordingly, the provisional decoding result stored in the path memory $PM_{pq}$ is used as an address at which the whitened reference level MR4 stored in the storage region 56-($u$) is read.

In the switch 58, the whitened reference level MR4 read from the storage region 56-($u$) is used, for example, for the branch metric calculation of Expression (9).

In the whitened reference storage unit 390 with the above-described configuration, an initial value of the whitened reference level MR4 is set and stored in the storage region 56-($u$).

The initial value of the whitened reference level MR4 in the whitened reference storage unit 390 is set using the initial value of the equalized reference level [r+Δr]($b_t$) stored in the equalized reference storage unit 350 immediately after the initial value of the equalized reference level [r+Δr]($b_t$) in the equalized reference storage unit 350 is set.

The initial value of the whitened reference level MR4 stored in the storage region 56-($u$) can be obtained using the following initial values:
an initial value of the equalized reference level [r+Δr]($b_t$) that has a quaternary code sequence {$b_t$, $b_{t-1}$, . . . , $b_{t-(M-1)}$} of M digits from the head of the quaternary code sequence {$b_t$, $b_{t-1}$, . . . , $b_{t-(M+N-1)}$} indicated by (u) as an argument;
an initial value of the equalized reference level [r+Δr]($b_{t-1}$) that has a quaternary code sequence {$b_{t-1}$, $b_{t-1-1}$, . . . , $b_{t-1-(M-1)}$} of M digits from the 1+1=2nd digit from the head of the quaternary code sequence {$b_t$, bt−1, . . . , $b_{t-(M+N-1)}$} indicated by (u) as an argument;
an initial value of the equalized reference level [r+Δr](bt−2) that has a quaternary code sequence {$b_{t-2}$, $b_{t-2-1}$, . . . , $b_{t-2-(M-1)}$} of M digits from the 2+1=3rd digit from the head of the quaternary code sequence {$b_t$, $b_{t-1}$, . . . , $b_{t-(M+N-1)}$} indicated by (u) as an argument;
. . . an initial value of the equalized reference level [r+Δr] (bt−N) that has a quaternary code sequence {$b_{t-N}$, $b_{t-N-1}$, . . . , $b_{t-N-(M-1)}$} of M digits from the N+1-th digit from the head of the quaternary code sequence {$b_t$, $b_{t-1}$, . . . , $b_{t-(M+N-1)}$} indicated by (u) as an argument;
in accordance with the expression MR4=[r+Δr]($b_t$)−Σ{$p_{len}$λ[r+Δr]($b_{t-len}$)}.

Accordingly, since the initial value of the whitened reference level MR4 can be obtained using the initial value of the equalized reference level [r+Δr]($b_t$), the initial value can be obtained through convolution calculation of the extended PR feature and the sequence of the NRZ multilevel values which is an NRZ expression of the quaternary code sequence serving as the address of the equalized reference level [r+Δr]($b_t$), as in the initial value of the equalized reference level [r+Δr]($b_t$) described in FIG. 35.

In the embodiment, because of N=1, the initial value of the whitened reference level MR4 stored in the storage region 56-($u$) can be obtained in accordance with the expression MR4=[r+Δr]($b_t$)−$p_1$×[r+Δr]($b_{t-1}$).

Further, in the embodiment, the PR coefficient $c_m$ of the extended PR is {$c_0$, $c_1$, $c_2$, $c_3$, $c_4$}={1, 2, 1, 0.2, 0.1}, as described in FIG. 30.

When the quaternary code sequence {$b_t$, $b_{t-1}$, . . . , $b_{t-(M+N-1)}$}={$b_t$, $b_{t-1}$, $b_{t-2}$, $b_{t-3}$, $b_{t-4}$, $b_{t-(5+1-1)}$} indicated by (u) is, for example, {3, 1, 2, 1, 0, 1}, a vector bt of the expression MR4=[r+Δr]($b_t$)−$p_1$×[r+Δr]($b_{t-1}$) is the quaternary code sequence {31210} of M=5 digits from the head of {3, 1, 2, 1, 0, 1}. A vector $b_{t-1}$ of the expression MR4=[r+Δr]($b_t$)−$p_1$×[r+Δr]($b_{t-1}$) is the quaternary code sequence {12101} of M=5 digits from the 1+1=2nd from the head of {3, 1, 2, 1, 0, 1}.

Accordingly, the initial value of the whitened reference level MR4 stored in a storage region 56-(312101) is obtained in accordance with the expression MR4=[r+Δr](31210)−$p_1$×[r+Δr](12101).

When the sequence of the NRZ multilevel values {at, at−1, at−2, at−3, at−(5−1)} corresponding to the quaternary code sequence {3, 1, 2, 1, 0, 1} indicated by (u) is {3, −1, 1, −1, −3, −1}.

In this case, an initial value of the equalized reference level [r+Δr](31210) is a convoluted value 3×1+(−1)×2+1×1+(−1)×0.2+(−3)×0.1=1.5 obtained through the convolution calculation of the sequence of the NRZ multilevel values(3, −1, 1, −1, 31 of M=5 from the head in the sequence of the NRZ multilevel values {$a_t$, $a_{t-1}$, $a_{t-2}$, $a_{t-3}$, $a_{t-(5-1)}$}={3, −1, 1, −1, −3, −1} corresponding to the quaternary code sequence {3, 1, 2, 1, 0, 1} indicated by (u) and the extended PR feature {1, 2, 1, 0.2, 0.1}.

An initial value of the equalized reference level [r+Δr] (12101) is a convoluted value (−1)×1+1×2+(−1)×1+(−3)× 0.2+(−1)×0.1=−0.7 obtained through the convolution calculation of the sequence of the NRZ multilevel values {−1, 1, −1, −3, −1} of M=5 from the 2=1+1nd from the head in the sequence of the NRZ multilevel values {$a_t$, $a_{t-1}$, $a_{t-2}$, $a_{t-3}$, $a_{t-(5-1)}$}={3, −1, 1, −1, −3, −1} corresponding to the quaternary code sequence {3, 1, 2, 1, 0, 1} indicated by (u) and the extended PR feature {1, 2, 1, 0.2, 0.1}.

The detection unit 16 reads the initial value 1.5 of the equalized reference level [r+Δr](31210) stored in a storage region 51-(31210) addressed with (v)=(31210) from the equalized reference storage unit 350 immediately after the initial value is set.

Further, the detection unit 16 reads the initial value −0.7 of the equalized reference level [r+Δr](12101) stored in a storage region 51-(12101) addressed with (v)=(12101) from the equalized reference storage unit 350 immediately after the initial value is set.

The detection unit 16 obtains the initial value of the whitened reference level MR4 stored in a storage region 56-(312101) in accordance with an expression MR4=[r+Δr] (31210)−$p_1$×[r+Δr](12101)=1.5−$p_1$×(−0.7).

For example, in the case of $p_1$=0.01, the initial value of the whitened reference level MR4 stored in the storage region 56-(312101) is [r+Δr](31210)−$p_1$×[r+Δr](12101)=1.5− 0.01×(−0.7)=1.507.

The value 1.507 is stored as an initial value of the whitened reference level MR4 in the storage region 56-(312101).

The whitened reference level MR4 stored in the storage region 56-($u$) is appropriately updated from the initial value stored as described above.

That is, for example, $b_{t-d}=3$ is assumed as the multilevel codes $b_{t-d}$ which are the provisional decoding results of the time t-d and a path including the branch from the state 12 to the state 31 is selected as a path in which the path metric is the minimum.

In this case, the switch 57-($u$) is turned on at a timing at which the quaternary code sequence $PM_{pq}$(t-d:t-(M+N-1)-d)={$b_{t-d}=3$, $b_{t-1-d}$, ..., $b_{t-(M+N-1)-d}$}={$b_{t-d}=3$, $b_{t-1-d}$, $b_{t-2-d}$, $b_{t-3-d}$, $b_{t-4-d}$, $b_{t-(5+1-1)-d}$} of M+N=5+1=6 cells which are the provisional decoding results stored in the path memory PM31 of the state 31 is (u).

For example, here, when {$b_{t-d}=3$, $b_{t-1-d}$, $b_{t-2-d}$, $b_{t-3-d}$, $b_{t-4-d}$, $b_{t-(5+1-1)-d}$}={3, 1, 2, 1, 0, 1}, the switch 57-(312101) is turned on.

On the other hand, the detection unit 16 reads the whitened reference level [r+$\Delta$r](31210) stored in the storage region 51-(31210) of the equalized reference storage unit 350 by using the quaternary code sequence {31210} of M=5 digits from the head of the quaternary code sequence {$b_{t-d}=3$, $b_{t-1-d}$, $b_{t-2-d}$, $b_{t-3-d}$, $b_{t-4-d}$, $b_{t-(5+1-1)-d}$}={3, 1, 2, 1, 0, 1} of the of M+N=5+1=6 cells as the address.

Further, the detection unit 16 reads the whitened reference level [r+$\Delta$r](12101) stored in the storage region 51-(12101) of the equalized reference storage unit 350 by using the quaternary code sequence {12101} of M=5 digits from the second from the head of the quaternary code sequence {$b_{t-d}=3$, $b_{t-1-d}$, $b_{t-2-d}$, $b_{t-3-d}$, $b_{t-4-d}$, $b_{t-(5+1-1)-d}$}={3, 1, 2, 1, 0, 1} of the of M+N=5+1=6 cells as the address.

The detection unit 16 obtains the updated whitened reference level MR4 in accordance with the expression MR4=[r+$\Delta$r]($b_{t-d}$)-$p_1$×[r+$\Delta$r]($b_{t-1-d}$)=[r+$\Delta$r](31210)-0.01×[r+$\Delta$r](12101) and supplies the updated whitened reference level MR4 to the switch 57-($u$).

When the switch 57-($u$) is turned on, the updated whitened reference level MR4=[r+$\Delta$r]($b_{t-d}$)-$p_1$×[r+$\Delta$r]($b_{t-1-d}$) supplied from the detection unit 16 is supplied to the storage region 56-($u$) and is stored in an overwritten form. Thus, the whitened reference level MR4 stored in the storage region 56-($u$) is updated to the updated whitened reference level MR4=[r+$\Delta$r]($b_{t-d}$)-$p_1$×[r+$\Delta$r]($b_{t-1-d}$).

In this case, here, in the detection unit 16, the updated whitened reference level MR4 is obtained in accordance with the expression MR4=[r+$\Delta$r]($b_{t-d}$)-$p_1$×[r+$\Delta$r]($b_{t-1-d}$)=[r+$\Delta$r](31210)-0.01×[r+$\Delta$r](12101) and is supplied to the switch 57-($u$).

Of the switches 57-(000000) to (333333), the switch 57-(312101) is turned on. As a result, the updated whitened reference level MR4=[r+$\Delta$r]($b_{t-d}$)-$p_1$×[r+$\Delta$r]($b_{t-1-d}$)=[r+$\Delta$r](31210)-0.01×[r+$\Delta$r](12101) is supplied from the detection unit 16 to the storage region 56-(312101) via the switch 57-(312101) which has been turned on.

In the storage region 56-(312101), the updated whitened reference level MR4=[r+$\Delta$r]($b_{t-d}$)-$p_1$×[r+$\Delta$r]($b_{t-1-d}$)=[r+$\Delta$r](31210)-0.01×[r+$\Delta$r](12101) is stored.

At a timing at which the quaternary code sequence $PM_{pq}$(t:t-(M+N-1))={$b_t$, $b_{t-1}$, ..., $b_{t-(M+N-1)}$}={$b_t$, $b_{t-1}$, $b_{t-2}$, $b_{t-3}$, $b_{t-4}$, $b_{t-(5+1-1)}$} of M+N=5+1=6 cells which are the provisional decoding results stored in the path memory $PM_{pq}$ is (u), the switch 58 selects the storage region 56-($u$) and the whitened reference level MR4 stored in the storage region 56-($u$) is read.

Accordingly, the provisional decoding result {$b_t$, $b_{t-1}$, ..., $b_{t-(M+N-1)}$} stored in the path memory $PM_{pq}$ is set as an address and the whitened reference level MR4 is read from the storage region 56-($u$) designated with the address {$b_t$, $b_{t-1}$, ..., $b_{t-(M+N-1)}$}.

The whitened reference level MR4 read from the storage region 56-($u$) is used for the branch metric calculation of Expression (9).

As described above, the storage region 56-($u$) of the whitened reference storage unit 390 is designated using the quaternary code sequence which is the provisional decoding result stored in the path memory $PM_{pq}$ as an address, the whitened reference level MR4 stored in that storage region 56-($u$) is updated and the whitened reference level MR4 stored in the storage region 56-($u$) is read, and the branch metric calculation is performed using the whitened reference level MR4.

Thus, the branch metric calculation can be performed within one clock.

The actual whitened reference level MR4 is calculated using, for example, a pipeline memory in the detection unit 16. It is difficult to complete the calculation of the whitened reference level MR4 itself within one clock. However, until the new (updated) whitened reference level MR4 is calculated, the branch metric calculation can be performed using the whitened reference level MR4 stored in the storage region 56-($u$). The whitened reference level MR4 is gradually close to an appropriately value as the updating of the whitened reference level MR4 stored in the whitened reference storage unit 390 is repeated.

That is, in the detection unit 16, the branch metric calculation is completed within one clock by reading the whitened reference level MR4 from the whitened reference storage unit 390, and an operation of sequentially updating the whitened reference level MR4 stored in the whitened reference storage unit 390 so that the whitened reference level MR4 converges to an appropriate value is performed.

Here, when a branch from a state si to a state sj is limited by the encoding rule, an access, that is, a storage region in which reading or the like of the whitened reference level MR4 is not performed, is generated in the storage region 56-($u$) addressed with the quaternary code sequence of M+N=5+1=6 cells including the quaternary code sequence which is the provisional decoding result corresponding to that branch.

In the case of N=0, the whitened reference storage unit 390 is unnecessary. In the case of N=0, the branch metric calculation of Expression (9) is the branch metric calculation of Expression (4) or (6) and is performed using the equalized reference level $r_t(s_i, s_j)+\Delta r_t(b_t)=[r+\Delta r]_t(b_t)$ stored in the equalized reference storage unit 350.

In the above-described case, as described in Expression (16), the tap coefficient $p_{len}$ of the noise predictor 15 is updated so that the square error of the whitened error $w'_t$ is minimized. Additionally, for example, the tap coefficient $p_{len}$ of the noise predictor 15 can be updated so that the whitened error $w'_t$ is smaller and the minimum distance dmin is larger.

For example, a combination of a pattern forming a minimum distance between quaternary code sequences {311310} and {312210} is assumed to be an i-th combination, a line of the quaternary codes forming a quaternary code sequence is selected as an element of a vector, and {311310} and {312210} are expressed as vectors Ai and Bi, as expressed in Expression (17)

[Math. 17]

$$\vec{A}_i = \{311310\}$$

$$\vec{B}_i = \{312210\} \qquad (17)$$

In the data detection processing unit 105, a square dmin2 of the minimum distance dmin is expressed in Expression (18).

[Math. 18]

$$d_{min}^2 = \sum_{m=1}^{M-1}\left\{\sum_{len=1}^{N} p_{len} \cdot r'_t(\vec{A}_{-len+m})) - \sum_{len=1}^{N} p_{len} \cdot r'_t(\vec{B}_{-len+m}))\right\}^2 \quad (18)$$
$$= \sum_{m=1}^{M-1}\left[\sum_{len=1}^{N} p_{len} \cdot \{r'_t(\vec{A}_{-len+m})) - r'_t(\vec{B}_{-len+m}))\}\right]^2$$

A vector $A_{-(len+m)}$ indicates a vector that has a line of quaternary codes after a len+m-th code from the head of the vector Ai as an element. The same applies to a vector $B_{-(len+m)}$.

r'($b_t$) that has a vector $b_t$ as an argument is expressed in Expression (19).

[Math. 19]

$$r'_t(\vec{b}_t) = r_t(\vec{b}_t) + \Delta r_t(\vec{b}_t) \quad (19)$$

When a signal proportional to the whitened error w'$_t$ and inversely proportional to the minimum distance dmin is defined as an error signal E indicating an error of the noise predictor 15, a square of the error signal E is expressed in Expression (20), for example.

[Math. 20]

$$E^2 = \left(\frac{w'_t}{d_{min}}\right)^2 \quad (20)$$

When partial differentiation of the square of the error signal E of Expression (20) with respect to the tap coefficient $p_{len}$ is performed, a partial differential value of Expression (21) can be obtained.

[Math. 21]

$$\frac{\partial}{\partial p_{len}} E^2 = 2\left(\frac{w'_t}{d_{min}}\right) \cdot \left(\frac{\partial w'_t}{\partial p_{len}} \cdot \frac{1}{d_{min}} - w'_t \cdot \frac{1}{d_{min}^2} \cdot \frac{\partial d_{min}}{\partial p_{len}}\right) \quad (21)$$
$$= \frac{1}{d_{min}^2}\left[d_{min} \cdot (-e'_{t-len}) - 2 \cdot w'_t \cdot \sum_{m=0}^{M-1}\left[\sum_{len=1}^{N} p_1 \cdot \{r'_t(\vec{A}_{-len+m})) - r'_t(\vec{B}_{-(lem+m)}))\}\right]\right]$$
$$\cdot \{r'_t(\vec{A}_{-(len+m)})) - r'_t(\vec{B}_{-(len+m)}))\}\Bigg]$$

The whitened coefficient updating unit 19 can update the tap coefficient $p_{len}$ using the partial differential value of Expression (21) by Expression (22).

[Math. 22]

$$p_{len}(t+1) = p_{len}(t) - \beta \cdot \frac{\partial}{\partial p_{len}} E^2 \quad (22)$$

$p_{len}$(t) represents a tap coefficient $p_{len}$ at the time t, that is, the tap coefficient $p_{len}$ before updating, and $p_{len}$(t+1) represents the tap coefficient $p_{len}$ at the time t+1, that is, the tap coefficient $p_{len}$ after updating.

β represents an updating coefficient for showing how much the tap coefficient $p_{len}$ is updated at the time of updating.

In Expression (22), the tap coefficient $p_{len}$ is updated so that a square (a square error) of the error signal E is minimized in accordance with the error signal E. That is, the tap coefficient $p_{len}$ is updated in accordance with the whitened error w'$_t$ and the minimum distance dmin so that the whitened error w'$_t$ is small and the minimum distance dmin is large.

By updating the tap coefficient $p_{len}$ of the noise predictor 15 with the tap coefficient $p_{len}$ obtained in Expression (22), the whitened signal $z_t$ for minimizing the square error of the error signal E can be obtained, and thus it is possible to improve decoding performance of the Viterbi decoding.

Subsequently, as described in FIG. 30, trellis states and branches are limited by the encoding rule of the multilevel codes, for example, the minimum travel length d, the RMTR, or the like, and Viterbi decoding can be performed.

Hereinafter, a specific example of Viterbi decoding in which trellis states and branches are limited by the encoding rule will be described.

For example, it is assumed that ML=4, d=0, K=M=5, N=0, PR (1, 2, 3, 2, 1), and RMTR=1 are set.

In this case, if there is no limitation of RMTR=1, the number of trellis states is ML^(K−1)=4^(5−1)=256 and the number of branches is ML^K=4^5=1024.

Here, each of a, b, c, d and e represents ML=4 base of one digit. A state of a case in which there is no limitation of RMTR=1 is represented by s(bcde). Further, when an ML=4 codes which are the provisional decoding results at the time t are a, a branch from a state s(bcde) at the time t−1 to a state s(abcd) at the time t is represented by b(abcde).

Of 256 states s(0000) to s(3333) in the case in which there is no limitation of RMTR=1, for example, states s(0101), s(2121), s(3131), and the like cannot be taken in the limitation of RMTR=1, and are therefore unnecessary.

Of 256 states s(0000) to s(3333) in the case in which there is no limitation of RMTR=1, there are 244 states in which RMTR=1 is satisfied.

Of 1024 branches b(00000) to b(33333) in the case in which there is no limitation of RMTR=1, for example, b(01010), b(01011), b(01012), b(01013), b(21210), b(21211), b(21212), b(21213), and the like cannot be taken in the limitation of RMTR=1, and are therefore unnecessary.

Of 1024 branches b(00000) to b(33333) in the case in which there is no limitation of RMTR=1, there are 940 branches in which RMTR=1 is satisfied.

Accordingly, in this case, by configuring the Viterbi decoder 320 (see FIG. 31) with a circuit corresponding to 244 states and 940 branches, it is possible to reduce the size of the circuit.

When the Viterbi decoder 320 is configured with a circuit corresponding to 256 states and 1024 branches taken in the case in which there is no limitation of RMTR=1, a path metric in which a branch metric of a branch which cannot be taken and a state metric of a state of a transition source of state transition corresponding to that branch are added is prohibited from being selected by the selector $\text{SEL}_{pq}$ of the state pq of a transition destination of the state transition. Thus, it is possible to prevent a wrong path from surviving and suppress deterioration in the decoding performance.

Subsequently, for example, it is assumed that there is no limitation of ML=4, d=1, K=M=3, N=0, PR (1, 2, 1), and the RMTR.

In this case, when there is no limitation of d=1, the number of trellis states is ML^(K-1)=4^(3-1)=16 and the number of branches is ML^K=4^3=64.

For 16 states s(00) to s(33) in the case in which there is no limitation of d=1, any state can be taken even though there is limitation of d=1.

Of 64 branch b(000) to b(333) in the case in which there is no limitation of d=1, for example, b(101), b(121), b(131), and the like cannot be taken in the limitation of d=1, and are therefore unnecessary.

Of 64 branch b(000) to b(333) in the case in which there is no limitation of d=1, there are 28 branches in which d=1 is satisfied.

Accordingly, in this case, by configuring the Viterbi decoder 320 (see FIG. 31) with a circuit corresponding to 16 states and 28 branches, it is possible to reduce the size of the circuit.

When the Viterbi decoder 320 is configured with a circuit corresponding to 16 states and 64 branches taken in the case in which there is no limitation of d=1, a path metric in which a branch metric of a branch which cannot be taken and a state metric of a state of a transition source of state transition corresponding to that branch are added is prohibited from being selected by the selector $\text{SEL}_{pq}$ of the state pq of a transition destination of the state transition. Thus, it is possible to prevent a wrong path from surviving and suppress deterioration in the decoding performance.

CONCLUSION

As described above, in the recording/reproducing device, light is radiated to a range including a data detection target (reproducing target) track TK and adjacent tracks TK−1 and TK+1 of the optical disc 100 which is an optical recording medium on which a plurality of tracks are formed.

Further, the reproduced signals $x_{1t}$, $x_{2t}$, $x_{3t}$, and $x_{4t}$ generated from the plurality of detected signals S6a, S6b, S6c, S6d1, and S6d2 output by receiving reflected light of light in the plurality of regions 6a, 6b, 6c, 6d1, and 6d2 into which the light reception surface of the photodetector 6 serving as an optical detection unit is divided are supplied to the adaptive equalizers 21, 22, 23, and 24 of the multi-input adaptive equalization unit 14, respectively.

The filtering signals $y_{1t}$, $y_{2t}$, $y_{3t}$, and $y_{4t}$ obtained by the adaptive equalizers 21, 22, 23, and 24 are calculated and the equalized signal $y'_t$ is obtained.

For the equalized signal $y'_t$, crosstalk noise (crosstalk noise remaining in the equalized signal $y'_t$) from the adjacent tracks TK−1 and TK+1 is whitened in the noise predictor 15 which is a whitening filter. The detection unit 16 performs Viterbi decoding which is multilevel processing on the equalized signal $y'_t$ passing through the noise predictor 15, that is, the whitened signal $z_t$ to obtain the multilevel code DT.

The equalized error calculation unit 18 obtains the equalized error $e'_t$ of the equalized signal $y'_t$ output from the multi-input adaptive equalization unit 14 with respect to the equalized reference level which is an ideal (genuine) waveform.

In the adaptive equalizers 21, 22, 23, and 24, the tap coefficient $f_{clen}$ for adaptive equalization is adaptively updated in accordance with the equalized error $e'_t$ so that the equalized error $e'_t$ is small.

In the whitened coefficient updating unit 19, the tap coefficient $p_{len}$ of the noise predictor 15 is adaptively updated in accordance with the whitened error $w'_t$ between the equalized error $e'_t$ and a whitened equalized error obtained by whitening the equalized error $e'_t$ so that the whitened error $w'_t$ is small.

The equalized signal $y'_t$ is processed in the detection unit 16 after the crosstalk noise contained in the equalized signal $y'_t$ is whitened in the noise predictor 15.

Thus, it is possible to perform the branch metric calculation of the Viterbi decoding in the detection unit 16 with high accuracy and improve the decoding performance.

Figure 38:
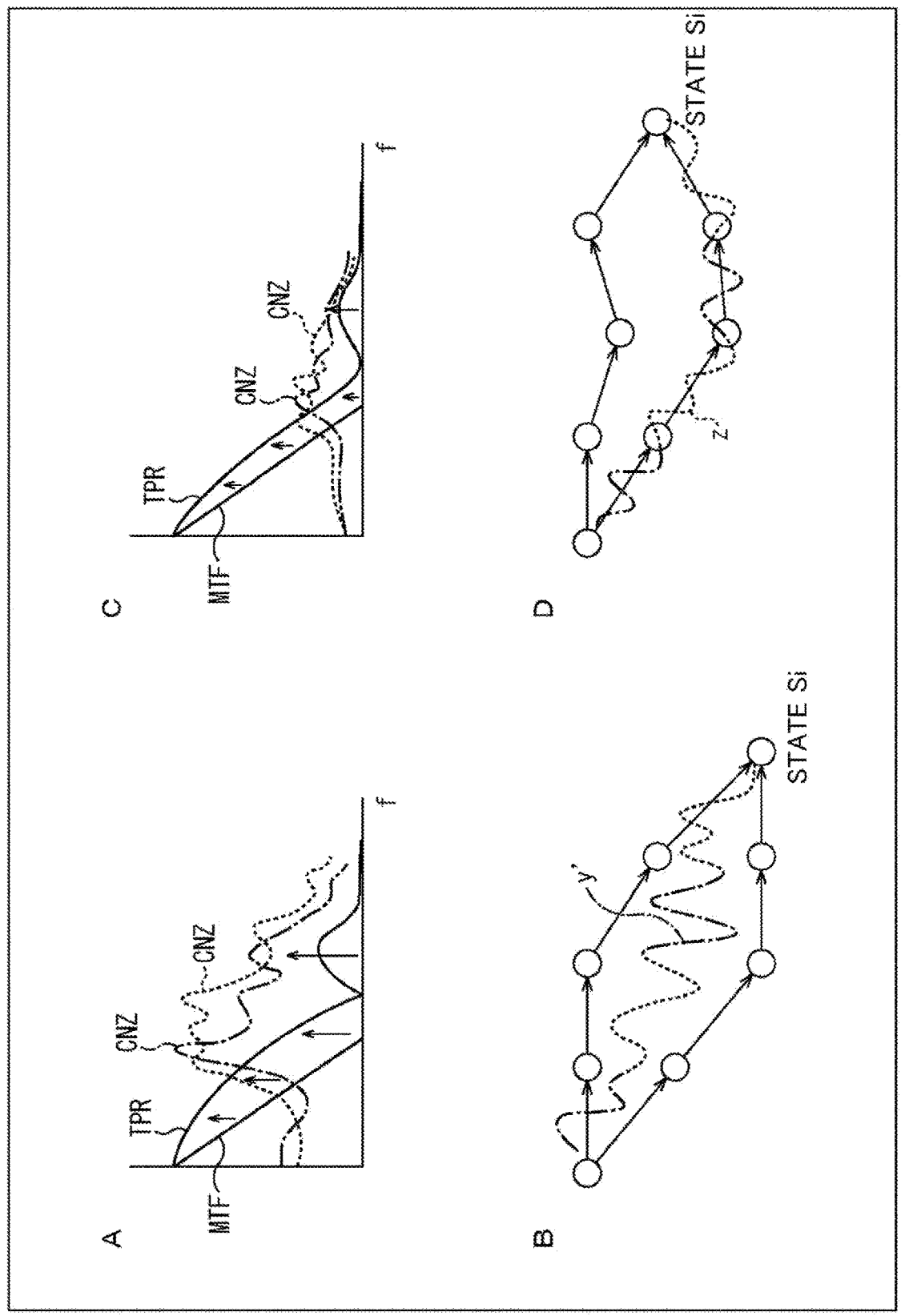
FIG. 38 is a diagram illustrating decoding performance of the recording/reproducing device.

FIG. 38 is a diagram illustrating decoding performance of the recording/reproducing device.

A of FIG. 38 illustrates an equalization target (an equalization target value) TPR for a modulation transfer function (MTF) of a reproduced signal when the noise predictor 15 is not provided.

In A of FIG. 38, the horizontal axis represents a frequency and the vertical axis represents intensity. The same applies to C of FIG. 38.

In A of FIG. 38, an arrow indicates enhancement through PR equalization.

In A of FIG. 38, a dashed line and a one-dot chain line indicate crosstalk noise CNZ. The same applies to C of FIG. 38.

The crosstalk noise CNZ is largely enhanced through PR equalization.

B of FIG. 38 is a diagram illustrating a selection aspect of a maximum likelihood path in Viterbi decoding when the equalized signal y' containing the largely enhanced crosstalk noise CNZ is supplied to the detection unit 16 as it is.

For the equalized signal $y'_t$ containing the largely enhanced crosstalk noise CNZ, a large difference does not occur in a path metric between a path passing through a state sequence which is right as a decoding result and a path passing through another state sequence, and accuracy of selection (detection) of the maximum likelihood path may deteriorate.

C of FIG. 38 illustrates an equalization target TPR of the MTF of the reproduced signal when the noise predictor 15 is provided.

When the noise predictor 15 is provided, the crosstalk noise CNZ is whitened and the degree of enhancement through the PR equalization is suppressed.

D of FIG. 38 is a diagram illustrating a selection aspect of a maximum likelihood path in Viterbi decoding when the equalized signal $y'_t$ containing the whitened crosstalk noise CNZ, that is, the whitened signal z output by the noise predictor 15, is supplied to the detection unit 16.

For the whitened signal z, a meaningful difference occurs in the path metric between the path passing through the state sequence which is right as the decoding result and the path passing through another state sequence, and the path metric of the path passing through the state sequence which is right as the decoding result becomes small. As a result, it is possible to suppress deterioration in accuracy of the selection of the maximum likelihood path.

In general, the enhancement of the crosstalk noise can be reduced by designing the PR close to the MTF at the time of high-density recording. However, although the PR is designed, it is difficult to predict actually occurring ISI in advance.

Accordingly, by providing the noise predictor 15 in which the tap coefficient $p_{len}$ is adaptively updated in the recording/reproducing device, it is possible to suppress enhancement of crosstalk at the time of high-density recording and improve the decoding performance.

Figure 39:
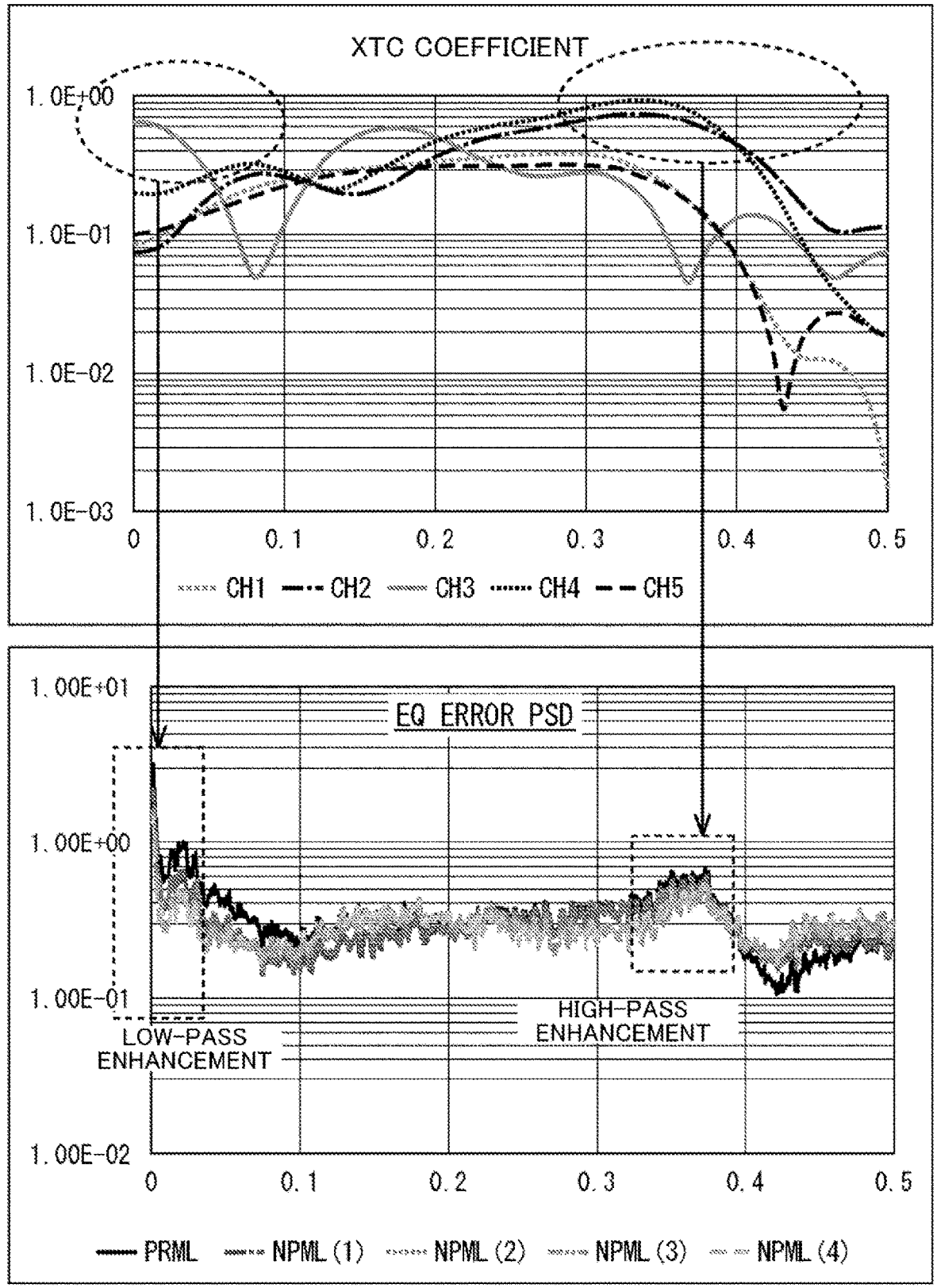
FIG. 39 is a diagram illustrating a tap coefficient fa and a frequency feature of an equalized error $e'_t$ obtained through simulation.

FIG. 39 is a diagram illustrating the tap coefficient $f_{clen}$ and a frequency feature of an equalized error $e'_t$ obtained through simulation carried out by the inventors of the present specification.

In FIG. 39, the horizontal axis represents a frequency and the vertical axis represents intensity (magnitude).

In the simulation, as illustrated in FIG. 3, adaptive equalizers similar to the adaptive equalizers 21 to 24 processed reproduced signals of five signal channels generated from outputs of the photodetector 6 of which a light reception surface was divided into five regions, and generated the equalized signal $y'_t$ from the outputs of the adaptive equalizers.

The ML=4 codes were adopted as multilevel codes and RMTR=1 was allowed (the RMTR is limited to 2 or more).

Recording of the multilevel codes (the quaternary codes in the simulation) on the optical disc 100 was performed at line density of 110% of AD2 and 93.36 nm was adopted as a length of a pit corresponding to the channel clock (1T).

Further, in the simulation, K=M=5 and N=0, 1, 2, 3, and 4 were adopted.

FIG. 39 illustrates a frequency feature of the tap coefficient $f_{clen}$ (an XTC coefficient) of the adaptive equalizers of the signal channels c=CH1, CH2, CH3, CH4, and CH5 at which the reproduced signals of five signal channels are processed.

Further, FIG. 39 illustrates a frequency feature of the equalized error $e'_t$ (EQ ERROR) of the case of N=0 (PRML), the case of N=1 (NPML (1)), the case of N=2 (NPML (2)), the case of N=3 (NPML (3)), and the case of N=4 (NPML (4)).

In the frequency feature of the equalized error $e'_t$ of the case of N=0 (PRML), there is a portion enhanced in low-pass and high-pass However, by providing the noise predictor 15, that is, setting N=1 to 4 herein, it was confirmed that the equalized error $e'_t$ was whitened and the degree of enhancement was suppressed.

Figure 40:
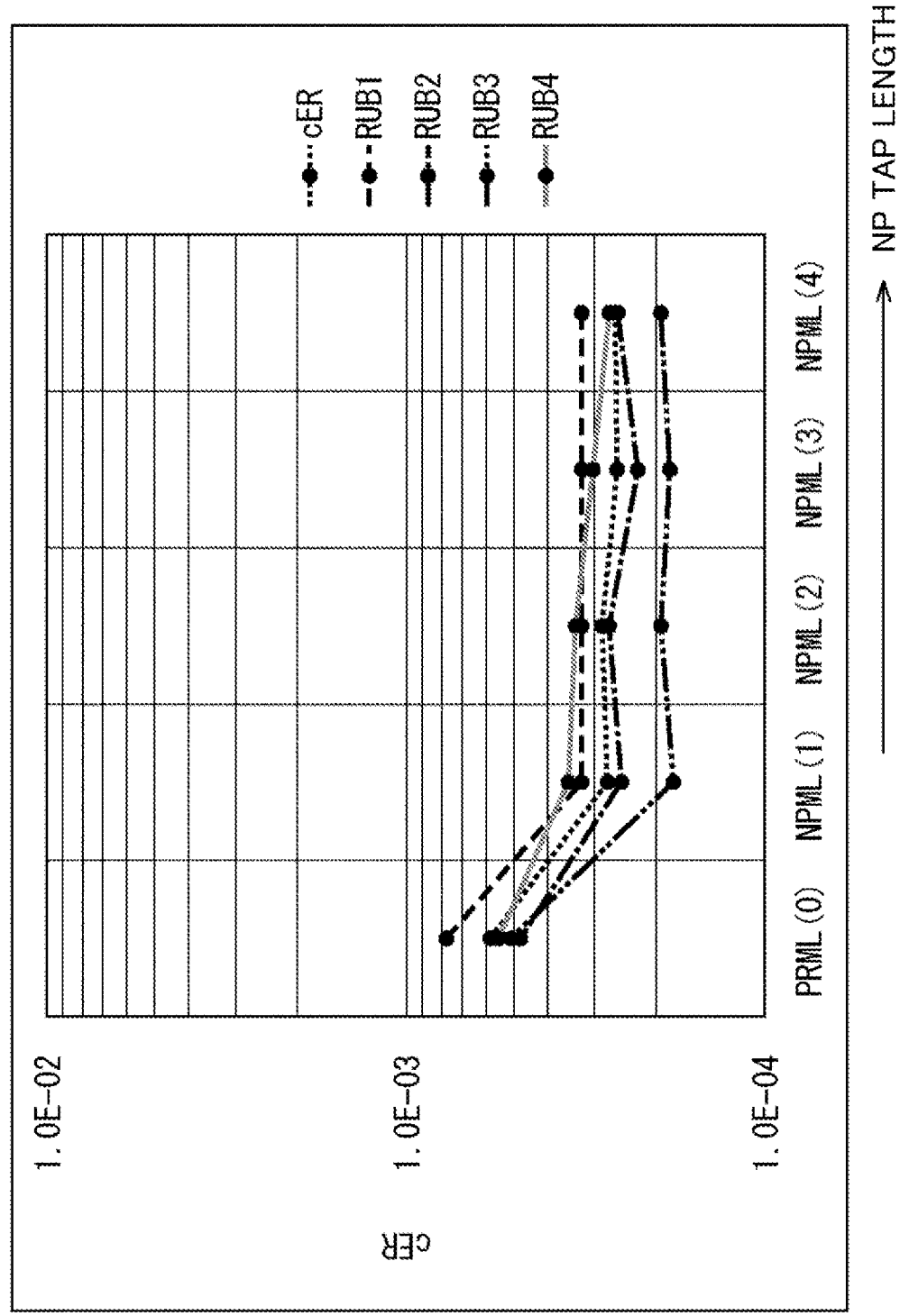
FIG. 40 is a diagram illustrating a cell error rate obtained through simulation.

FIG. 40 is a diagram illustrating a cell error rate obtained through simulation carried out by the inventors of the present specification.

In FIG. 40, the horizontal axis represents the number of taps N of the noise predictor 15 and the vertical axis represents a cell error rate (cER).

The simulation in which the cell error rate was obtained was carried out as in the case of FIG. 39.

FIG. 40 illustrates cell error rates of RUB1, RUB2, RUB3, and RUB4 which are four recording Ubit blocks (RUBs) and an average value (cER) of the error rates of the four RUB1 to RUB4.

Here, the RUB is a recording unit in which data is recorded on an optical disc in AD2 or the like.

In FIG. 40, in the case of N=1 (NPML (1)), the case of N=2 (NPML (2)), the case of N=3 (NPML (3)), and the case of N=4 (NPML (4)), it was confirmed that the degree of enhancement of the equalized error $e'_t$ is suppressed further than in the case of N=0 (PRML(0)), and the cell error rate was improved.

In the recording/reproducing device, the tap coefficient $p_{len}$ of the noise predictor 15 is adaptively updated, and thus the noise predictor 15 adaptively operates to whiten the crosstalk noise contained in the equalized signal $y'_t$ output by the multi-input adaptive equalization unit 14.

For example, the whitened coefficient updating unit 19 can update the tap coefficient $P_{len}$ of the noise predictor 15 using the equalized error $e'_t$ obtained by the equalized error calculation unit 18 so that energy of the crosstalk noise (the whitened error $w'_t$) is minimized (Expressions (14) to (16)). Thus, the whitening of the crosstalk noise is optimized.

For example, the whitened coefficient updating unit 19 can update the tap coefficient $P_{len}$ of the noise predictor 15 using the square error of the error signal E which is crosstalk noise (the whitened error $w'_t$) with respect to the minimum distance dmin in the Viterbi decoding is minimized (Expressions (20) to (22)). Thus, the processing of the noise predictor 15 can be optimized to correspond to the execution of the Viterbi decoding.

In the detection unit 16, the branch metric calculation is performed using the tap coefficient $P_{len}$ of the noise predictor 15 updated by the whitened coefficient updating unit 19 (Expression (9)). Thus, in the detection unit 16, the NPML corresponding to the whitened signal $z_t$ obtained via the noise predictor 15 is realized.

By performing calculation using the tap coefficient $p_{len}$ of the noise predictor 15 as the reference level used for the branch metric calculation of the Viterbi decoding and reading the whitened reference level MR4 stored in the whitened reference storage unit 390 from the whitened reference storage unit 390 using the quaternary code sequences $b_t$ to $b_{t-(M+N-1)}$ which are the provisional decoding results for use, it is possible to reduce a load on the branch metric calculation.

<Another Embodiment of Optical Disc Recording/Reproducing Device to which Present Technology is Applied>

Figure 41:
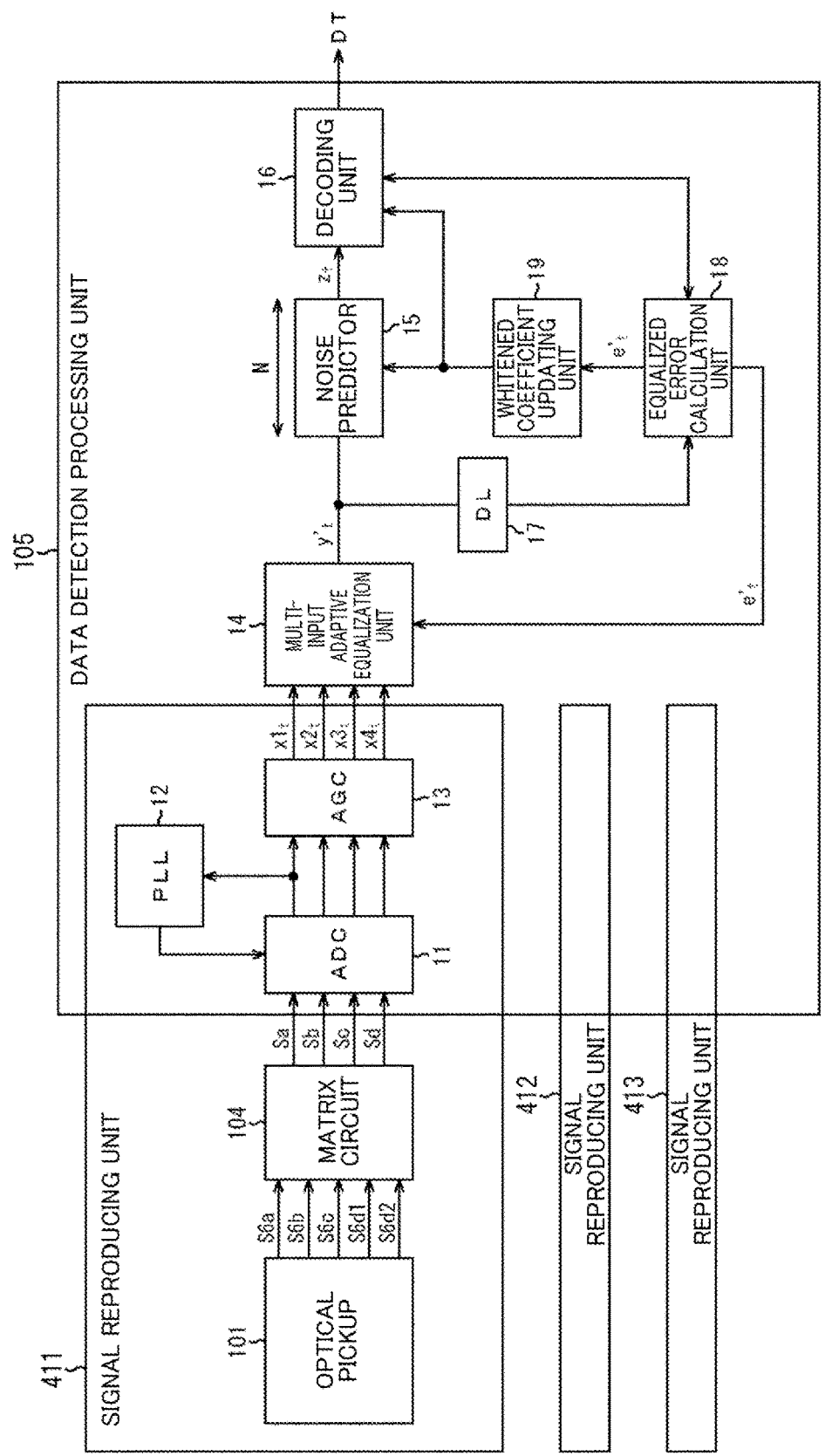
FIG. 41 is a block diagram illustrating an exemplary configuration of another embodiment of the optical disc recording/reproducing device to which the present technology is applied.

FIG. 41 is a block diagram illustrating an exemplary configuration of another embodiment of the recording/reproducing device (an optical disc recording/reproducing device) to which the present technology is applied.

In the drawing, the same reference numerals are given to portions corresponding to the case of FIG. 1. Hereinafter, description thereof will be appropriately omitted.

In FIG. 41, the configuration other than the optical pickup 101, the matrix circuit 104, and the data detection processing unit 105 in FIG. 1 are not illustrated.

In FIG. 1, the optical pickup 101, the metric circuit 104, and the ADC 11, the PLL 12, and the AGC 13 configuring the data detection processing unit 105 configures a signal reproducing unit 411 that reproduces (generates) a reproduced signal $x_{ct}$, as illustrated in FIG. 41.

The recording/reproducing device in FIG. 41 includes not only the signal reproducing unit 411 but also signal reproducing units 412 and 413 that have configurations similar to that of the signal reproducing unit 411.

Accordingly in the recording/reproducing device in FIG. 41, laser light is radiated from each of the three signal reproducing units 411 to 413 to the optical disc 100. In the three signal reproducing units 411 to 413, reflected light of the laser light from the optical disc 100 is received, and reproduced signals in accordance with a light reception amount of the reflected light are each generated and output. The reproduced signals output by the three signal reproducing units 411 to 413 are supplied to the multi-input adaptive equalization unit 14.

In the recording/reproducing device in FIG. 41, processing similar to the processing of the recording/reproducing device in FIG. 1 is performed on the reproduced signals output by the three signal reproducing units 411 to 413 after the multi-input adaptive equalization unit 14 of the data detection processing unit 105.

In FIG. 41, the three signal reproducing units 411 to 413 are provided. However, two or four or more signal reproducing units can be provided.

Figure 42:
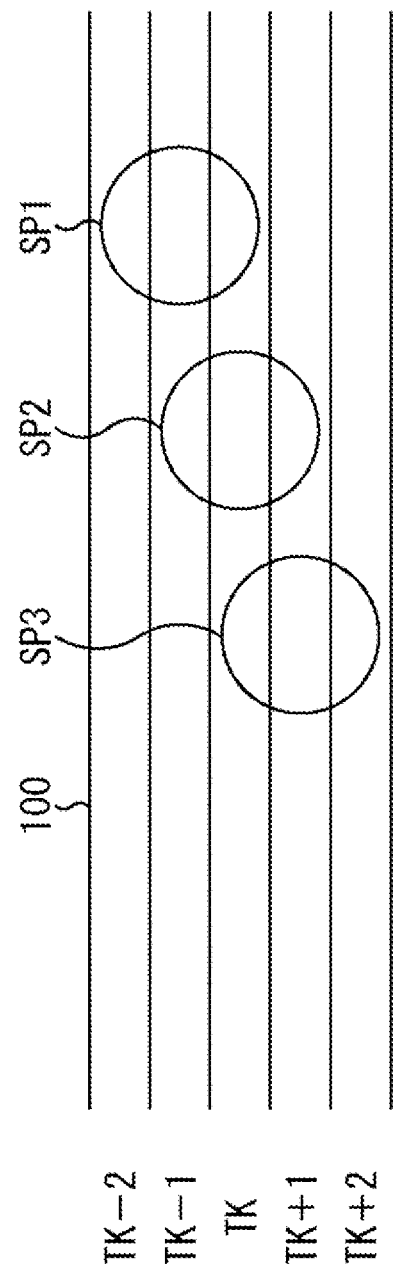
FIG. 42 is a diagram illustrating an example of irradiation of the optical disc 100 with laser light by three signal reproducing units 411 to 413.

FIG. 42 is a diagram illustrating an example of irradiation of the optical disc 100 with laser light by three signal reproducing units 411 to 413.

When the track TK of the optical disc 100 is a reproducing target track, the laser light is radiated to a plurality of adjacent tracks including the track TK.

For example, the laser light radiated by the signal reproducing unit 411 is radiated to the track TK and two adjacent tracks TK−1 and TK−2 adjacent on the inner circumferential side of the track TK so that a spot SP1 is formed.

The laser light radiated by the signal reproducing unit 412 is radiated to the track TK, the track TK−1 adjacent on the inner circumferential side of the track TK, and a track TK+1 adjacent on the outer circumferential side of the track TK so that a spot SP2 is formed.

Further, the laser light radiated by the signal reproducing unit 413 is radiated to the track TK and two adjacent tracks TK+1 and TK+2 adjacent on the outer circumferential side of the track TK so that a spot SP3 is formed.

After the multi-input adaptive equalization unit 14 of the data detection processing unit 105, as described above, processing can be performed on the reproduced signals generated in accordance with a light reception amount of the reflected light of the laser light radiated to each of the plurality of signal reproducing units 411 to 413.

As described above, the embodiments of the present technology have been described specifically. However, embodiments of the present technology are not limited to the above-described embodiments and various modifications can be made based on the technical ideas of the present technology. For example, numerical values of the wavelength, the track pitch, the recording line density of the above-described laser light source are exemplary and other numerical values may be used. Further, indexes other than the above-described indexes may be used as indexes for evaluating reproduction performance. Further, the present technology can be applied to a device that performs only one of recording and reproducing on an optical disc.

<Description of Computer to which Present Technology is Applied>

Next, the series of steps of processing of the multi-input adaptive equalization unit 14 to the detection unit 16, the equalized error calculation unit 18, and the whitened coefficient updating unit 19 described above can be performed by hardware or software. When the series of steps of processing is performed by software, a program of the software is installed on a general-purpose computer or the like.

Figure 43:
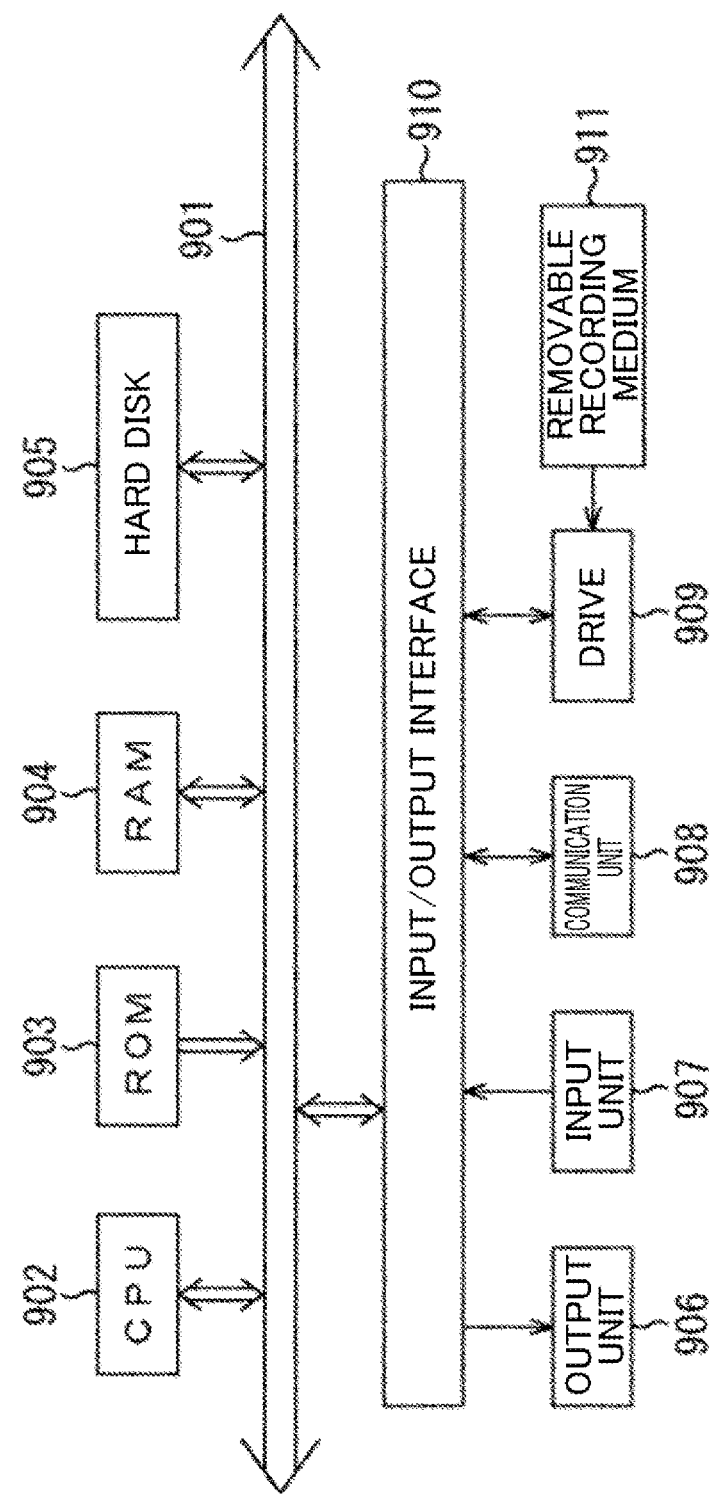
FIG. 43 is a block diagram illustrating an exemplary configuration of an embodiment of a computer to which the present technology is applied.

FIG. 43 is a block diagram illustrating an exemplary configuration of an embodiment of a computer in which a program executing the above-described series of steps of processing is installed.

The program can be recorded in advance on a hard disk 905 or a ROM 903 serving as a recording medium embedded in a computer.

Alternatively, the program can be stored (recorded) on a removable recording medium 911 driven by a drive 909. The removable recording medium 911 can be provided as so-called package software. Here, examples of the removable recording medium 911 include a flexible disc, a compact disc read-only memory (CD-ROM), a magneto-optical disc (MO) disc, a digital versatile disc (DVD), a magnetic disk, and a semiconductor memory.

The program can be installed from the above-described removable recording medium 911 and can also be downloaded to a computer via a communication network or a broadcasting network and can be installed in the embedded hard disk 905. That is, for example, the program can be transmitted wirelessly from a download site to a computer via a digital satellite broadcasting artificial satellite or can be transmitted to a computer in a wired manner via a network such as a local area network (LAN) or the Internet.

The computer contains a central processing unit (CPU) 902. An input/output interface 910 is connected to the CPU 902 via a bus 901.

When a user inputs an instruction by manipulating an input unit 907 through the input/output interface 910, the CPU 902 executes a program stored in a read-only memory (ROM) 903 in accordance with the instruction. Alternatively, the CPU 902 loads and executes the program stored in the hard disk 905 on a random access memory (RAM) 904.

Thus, the CPU 902 performs processing in accordance with the above-described flowchart or processing performed with the above-described block diagram configuration. The CPU 902 causes an output unit 906 to output a processing result, causes a communication unit 908 to transmits the processing result, and causes the hard disk 905 to record the processing result, for example, via the input/output interface 910 as necessary.

The input unit 907 is configured with a keyboard, a mouse, a microphone, and the like. The output unit 906 is configured with a liquid crystal display (LCD), a speaker, or the like.

Here, in the present specification, the processing performed by the computer in accordance with the program may not necessarily be performed chronologically in the order described in the flowchart. That is, the processing performed by the computer in accordance with the program also includes processing which is performed individually or in parallel (for example, parallel processing or processing by an object)

The program may be a program processed by one computer (processor) or may be distributed and processed by a plurality of computers. Further, the program may be a program transmitted to a remote computer to be executed.

Embodiments of the present technology are not limited to the above-described embodiments and various modifications can be made within the scope of the present technology without departing from the gist of the present technology.

For example, the present technology can be configured as cloud computing in which one function is shared and processed together by a plurality of devices via a network.

The advantageous effects described in the present specification are merely exemplary and are not limited, and other advantageous effects may be achieved.

The present technology can be configured as follows.

<1>

A signal processing device including:

an equalization unit configured to perform partial response (PR) equalization of a reproduced signal of multilevel codes of 3<=ML; and a decoding unit configured to perform maximum likelihood decoding of an equalized signal obtained through the PR equalization.

<2>

The signal processing device according to <1>, wherein the decoding unit limits a trellis state and a branch by an encoding rule of the multilevel codes and performs the maximum likelihood decoding.

<3>

The signal processing device according to <1> or <2>, further including: a storage unit configured to have a storage region in which a reference level of which a value is updated from an initial value obtained through convolution calculation with a PR is stored at the reference level used for branch metric calculation, and which is addressed with a storage value of a path memory storing a sequence of the multilevel codes corresponding to a path arriving at the trellis state, wherein the decoding unit performs the branch metric calculation using the reference level read from the storage unit.

<4>

The signal processing device according to <3>, wherein the storage unit is an equalized reference storage unit that stores an equalization reference level which is a reference level of the equalized signal, and wherein the equalization reference level is updated in accordance with an equalized error between the equalized signal and the equalization reference level.

<5>

The signal processing device according to <4>, wherein a filter coefficient used for the PR equalization is updated in accordance with the equalized error.

<6>

The signal processing device according to <3>, further including:

a noise predictor configured to whiten noise contained in the equalized signal, wherein the decoding unit performs the maximum likelihood decoding of a whitened signal which is a whitened equalized signal, and wherein a filter coefficient of the noise predictor updates a filter coefficient of the noise predictor in accordance with a whitened error between a whitened equalized error obtained by whitening the equalized error and an equalized error between the equalized signal and am equalization reference level which is a reference level of the equalized signal.

<7>

The signal processing device according to <6>, wherein the storage unit is a whitening reference storage unit that stores a whitening reference level which is a reference level of the whitened signal, and wherein the whitening reference level is updated in accordance with the filter coefficient of the noise predictor.

<8>

The signal processing device according to <6> or <7>, wherein the filter coefficient used for the PR equalization is updated in accordance with the equalized error.

<9>

The signal processing device according to <3>, wherein reading of the reference level from the storage unit is limited by an encoding rule of the multilevel code.

<10>

The signal processing device according to any one of <1> to <9>, wherein the reproduced signals are signals obtained by receiving reflected light of light radiated to a plurality of adjacent tracks of an optical recording medium on which the multilevel codes are recorded.

<11>

The signal processing device according to <10>, wherein the reproduced signal includes a plurality of reproduced signals obtained from signals obtained by receiving the reflected light.

<12>

A signal processing method including:

performing partial response (PR) equalization of a reproduced signal of multilevel codes of 3<=ML; and performing maximum likelihood decoding of an equalized signal obtained through the PR equalization.

<13>

A program causing a computer to function as:

an equalization unit configured to perform partial response (PR) equalization of a reproduced signal of multilevel codes of 3<=ML; and a decoding unit configured to perform maximum likelihood decoding of an equalized signal obtained through the PR equalization.

REFERENCE SIGNS LIST

1 Semiconductor laser
2 Collimator lens
3 Polarizing beam splitter
4 Objective lens
5 Lens
6 Photodetector
6a, 6b, 6c, 6d1, 6d2 Region
11 ADC
12 PLL
13 AGC
14 Multi-input adaptive equalization unit
15 Noise predictor
16 Detection unit
17 Delay unit
18 Equalized error calculation unit
19 Whitened coefficient updating unit
21 to 24 Adaptive equalizer
30-1 to 30-(L−1) Delay unit
31-0 to 31-(L−1) Multiplier
34 Adder
32-0 to 32-(L−1) Calculator
33-0 to 33-(L−1) Integrator
41-1 to 41-N Delay unit
42-1 to 42-N Multiplier
43 Adder
51-($v$) Storage region
52-($v$) Delay unit
53-($v$) Adder
54-($v$), 55 Switch
56-($u$) Storage region
57-($u$), 58 Switch
100 Optical disc
101 Optical pickup
102 Spindle motor
103 Thread mechanism
104 Matrix circuit
105 Data detection processing unit
106 Wobble signal processing circuit
107 Encoding/Decoding unit
108 Host I/F
109 Address decoder
110 System controller
111 Optical block servo circuit
112 Spindle servo circuit
113 Laser driver
114 Write strategy unit
115 Thread driver
116 ADIP demodulation processing unit
117 Spindle driver
118 Driver 200 Host device
301, 302 Delay unit
304 to 306 Multiplier
307 Adder
320 Viterbi decoder
330-*pq* ACS unit
350 Equalized reference storage unit
371-1 to 371-N Delay unit
372-1 to 372-N Multiplier
373 Adder
390 Whitened reference storage unit
411 to 413 Signal reproducing unit
901 Bus
902 CPU
903 ROM
904 RAM
905 Hard disk
906 Output unit
907 Input unit
908 Communication unit
909 Drive
910 Input/output interface
911 Removable recording medium

The invention claimed is:

1. A signal processing device comprising:
an equalization unit configured to perform partial response (PR) equalization of a reproduced signal of multilevel codes of 3<=ML; and
a decoding unit configured to perform maximum likelihood decoding of an equalized signal obtained through the PR equalization,
wherein the decoding unit limits a trellis state and a branch by an encoding rule of the multilevel codes and performs the maximum likelihood decoding.

2. The signal processing device according to claim 1, further comprising:
a storage unit configured to have a storage region in which a reference level of which a value is updated from an initial value obtained through convolution calculation with a PR is stored at the reference level used for branch metric calculation, and which is addressed with a storage value of a path memory storing a sequence of the multilevel codes corresponding to a path arriving at the trellis state,
wherein the decoding unit performs the branch metric calculation using the reference level read from the storage unit.

3. The signal processing device according to claim 2, wherein the storage unit is an equalized reference storage unit that stores an equalization reference level which is a reference level of the equalized signal, and
wherein the equalization reference level is updated in accordance with an equalized error between the equalized signal and the equalization reference level.

4. The signal processing device according to claim 3, wherein a filter coefficient used for the PR equalization is updated in accordance with the equalized error.

5. The signal processing device according to claim 2, further comprising:
a noise predictor configured to whiten noise contained in the equalized signal,
wherein the decoding unit performs the maximum likelihood decoding of a whitened signal which is a whitened equalized signal, and
wherein a filter coefficient of the noise predictor updates a filter coefficient of the noise predictor in accordance with a whitened error between a whitened equalized error obtained by whitening the equalized error and an equalized error between the equalized signal and am equalization reference level which is a reference level of the equalized signal.

6. The signal processing device according to claim 5, wherein the storage unit is a whitening reference storage unit that stores a whitening reference level which is a reference level of the whitened signal, and
wherein the whitening reference level is updated in accordance with the filter coefficient of the noise predictor.

7. The signal processing device according to claim 5, wherein the filter coefficient used for the PR equalization is updated in accordance with the equalized error.

8. The signal processing device according to claim 2, wherein reading of the reference level from the storage unit is limited by an encoding rule of the multilevel code.

9. The signal processing device according to claim 1, wherein the reproduced signals are signals obtained by receiving reflected light of light radiated to a plurality of adjacent tracks of an optical recording medium on which the multilevel codes are recorded.

10. The signal processing device according to claim 9, wherein the reproduced signal includes a plurality of reproduced signals obtained from signals obtained by receiving the reflected light.

11. A signal processing method comprising:
performing partial response (PR) equalization of a reproduced signal of multilevel codes of 3<=ML; and
performing maximum likelihood decoding of an equalized signal obtained through the PR equalization,
wherein a trellis state and a branch are limited by an encoding rule of the multilevel codes.

12. A non-transitory computer-readable medium having embodied thereon a program, which when executed by a computer causes the computer to execute a signal processing method, the method comprising:
performing partial response (PR) equalization of a reproduced signal of multilevel codes of 3<=ML; and
performing maximum likelihood decoding of an equalized signal obtained through the PR equalization,
wherein a trellis state and a branch are limited by an encoding rule of the multilevel codes.

* * * * *